(12) United States Patent
Shimazu et al.

(10) Patent No.: US 7,935,653 B2
(45) Date of Patent: May 3, 2011

(54) METAL OXIDE NANOPOROUS MATERIAL, COATING COMPOSITION TO OBTAIN THE SAME, AND METHODS OF MANUFACTURING THEM

(75) Inventors: Takashi Shimazu, Nagoya (JP); Ryusuke Tsuji, Niwa-gun (JP); Hideo Sobukawa, Nisshin (JP); Yoshiki Seno, Toyota (JP); Yoriko Hasegawa, Nisshin (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 860 days.

(21) Appl. No.: 11/628,493

(22) PCT Filed: Jun. 9, 2005

(86) PCT No.: PCT/JP2005/011003
§ 371 (c)(1),
(2), (4) Date: Dec. 5, 2006

(87) PCT Pub. No.: WO2005/121025
PCT Pub. Date: Dec. 22, 2005

(65) Prior Publication Data
US 2007/0215009 A1 Sep. 20, 2007

(30) Foreign Application Priority Data

Jun. 11, 2004 (JP) ................. 2004-173595
Oct. 19, 2004 (JP) ................. 2004-303805
Oct. 19, 2004 (JP) ................. 2004-303853
Oct. 19, 2004 (JP) ................. 2004-303957
Mar. 31, 2005 (JP) ................. 2005-103318

(51) Int. Cl.
B01J 23/00 (2006.01)
B01J 23/10 (2006.01)
B01J 23/58 (2006.01)
B01J 23/56 (2006.01)
B01J 23/70 (2006.01)
B01J 23/74 (2006.01)
B01J 23/02 (2006.01)
B01J 23/06 (2006.01)
B01J 23/04 (2006.01)
B01J 23/08 (2006.01)
C09D 1/00 (2006.01)
C09K 17/40 (2006.01)
C23C 16/40 (2006.01)

(52) U.S. Cl. ........ 502/302; 502/325; 502/328; 502/330; 502/332; 502/338; 502/340; 502/341; 502/344; 502/349; 502/350; 502/351; 502/355; 106/286.1; 106/286.3; 106/286.4; 106/286.5; 106/286.6; 106/286.7; 106/286.8; 106/287.17; 106/287.19

(58) Field of Classification Search .......... 502/302, 502/325, 328, 330, 332, 338, 340, 341, 344, 502/349–351, 355; 106/286.1, 286.3–286.8, 106/287.17, 287.19
See application file for complete search history.

(56) References Cited

U.S. PATENT DOCUMENTS

| | | | | |
|---|---|---|---|---|
| 4,757,045 A | * | 7/1988 | Turner et al. | 502/252 |
| 4,791,090 A | * | 12/1988 | Pereira et al. | 502/263 |
| 5,128,291 A | * | 7/1992 | Wax et al. | 502/8 |
| 5,962,367 A | * | 10/1999 | Shen et al. | 502/439 |
| 6,171,572 B1 | * | 1/2001 | Aozasa | 423/594.12 |
| 6,933,259 B2 | * | 8/2005 | Hatanaka et al. | 502/240 |
| 7,165,553 B2 | * | 1/2007 | Luan et al. | 131/334 |
| 7,166,263 B2 | * | 1/2007 | Vanderspurt et al. | 423/263 |
| 2006/0172886 A1 | * | 8/2006 | Shimazu et al. | 502/325 |

FOREIGN PATENT DOCUMENTS

| | | |
|---|---|---|
| EP | 1172139 A1 * | 1/2002 |
| EP | A-1175935 | 1/2002 |
| JP | A 7-300315 | 11/1995 |
| JP | A 10-045412 | 2/1998 |
| JP | A 10-182155 | 7/1998 |
| JP | A 2000-281342 | 10/2000 |
| JP | A 2000-327329 | 11/2000 |
| JP | A 2001-224962 | 8/2001 |
| JP | A 2002-001106 | 1/2002 |
| JP | A 2002-79097 | 3/2002 |
| JP | 2002-282689 * | 10/2002 |
| JP | A 2002-282689 | 10/2002 |
| JP | A 2002-331238 | 11/2002 |
| WO | WO-A-2004/043585 | 5/2004 |

OTHER PUBLICATIONS

Translations of Search Report for PCT/JP2005/011003.*
Translation of Written Opinion for PCT/JP2005/011003.*

* cited by examiner

*Primary Examiner* — Patricia L Hailey
(74) *Attorney, Agent, or Firm* — Oliff & Berridge, PLC

(57) ABSTRACT

A metal oxide nanoporous material comprises two or more kinds of first metal oxides selected from the group consisting of alumina, zirconia, titania, iron oxide, rare-earth oxides, alkali metal oxides and alkaline-earth metal oxides. The metal oxide nanoporous material has nanopores, each with a diameter of 10 nm or smaller, in which the metal oxides are dispersed homogeneously in the wall forming the nanopores.

37 Claims, 42 Drawing Sheets
(16 of 42 Drawing Sheet(s) Filed in Color)

METAL OXIDE NANOPOROUS MATERIAL, COATING COMPOSITION TO OBTAIN THE SAME, AND METHODS OF MANUFACTURING THEM

TECHNICAL FIELD

The present invention relates to a metal oxide nanoporous material which includes two or more kinds of metal oxides, and to a coating composition to obtain the nanoporous material. In addition, it relates to methods of manufacturing the nanoporous material and the coating composition.

BACKGROUND OF THE INVENTION

Conventionally, a variety of catalysts for purification of exhaust gas have been developed to purify harmful substances emitted from internal combustion engines of automobiles and the like. A catalyst with a honeycomb filter as a base material made to support a metal oxide and a noble metal is generally used as a catalyst for emission gas purification. Examples of such a metal oxide are alumina, zirconia, and ceria, while examples of such a noble metal are platinum, rhodium, and palladium.

As examples of such a metal oxide, ones in powder obtained by wet-milling are conventionally used. For example, Japanese Unexamined Patent Application Publication No. Hei 10-182155 (Document 1) and Japanese Unexamined Patent Application Publication No. 2002-79097 (Document 2) disclose a method of obtaining the powder of a composite metal oxide. In the method, an oxide precursor, having been prepared from a salt solution of aluminum, cerium, or zirconium by the coprecipitation method, is calcined in the air to obtain the powder of the composite metal oxide. In addition, Japanese Unexamined Patent Application Publication No. Hei 7-300315 (Document 3) discloses a method of obtaining the powder of a composite metal oxide. In the method, the powder of boehmite alumina is added to a mixture solution of a cerium salt aqueous solution and a zirconium salt aqueous solution, and stirred. The resultant solution is then dried and calcined to obtain the powder of the composite metal oxide.

In such cases described in the above documents 1 to 3, however, use of a conventional powder of metal oxide causes the following problem. When a base material such as a metal honeycomb filter, and a high-density honeycomb which has narrower tubular passages (for example, a micro-channel of 1200 cell/inch$^2$ or more) than that of an ordinary honeycomb filter is used, it is difficult for the base material to support such a conventional powder of metal oxide. This is because the adhesion of such a conventional powder of metal oxide to the base material (especially to metal base material) is not necessarily strong enough yet. This is also because the heat resistance thereof is not necessarily high enough yet. In addition, there is a limit in forming a thin-film coating on a base material using the conventional metal oxide powder.

DISCLOSURE OF THE INVENTION

The present invention has been made in consideration of the above problems that the conventional technology has. The present invention has an object of providing a metal oxide nanoporous material with such features as follows. The metal oxide nanoporous material has a high adhesion to various base materials such as a honeycomb filter, and has an excellent heat resistance. The metal oxide nanoporous material allows a coat formed on a base material to be made into a thin film. The metal oxide nanoporous material allows a coat to be formed with an excellent heat resistance and a high adhesion to such base materials as a metal honeycomb filter and a high-density honeycomb. In addition to providing such a metal oxide nanoporous material, providing a coating composition to obtain the metal oxide nanoporous material is also an object of the present invention. Furthermore, providing a method of manufacturing the metal oxide nanoporous material and a method of the coating composition is an object of the present invention as well.

As a result of intensive and extensive studies, the inventors of the present invention have found out the following facts, and have completed the present invention. Metal oxides, obtained using a colloidal solution of metal oxides as it is, or using a salt solution of metals as it is, are not homogeneous, not sufficiently adhesive, or not sufficiently resistant against heat. In contrast to such metal oxides, such surprising features as described later can be attained by metal oxides obtained by the following method. A colloidal solution of metal oxides or a salt solution of metals is mixed at a high shear rate, and then the mixture is subjected to a heat treatment without substantially allowing coprecipitation to occur. The metal oxides thus obtained have nanopores, each with a diameter 10 nm or smaller, and the metal oxides are homogeneously dispersed in the wall forming the nanopores, which gives the metal oxide such novelty that no conventional metal oxides have ever had. This results in an improvement in the adhesion to various base materials and an improvement in the heat resistance. In addition, a thin-film coating can be formed. As a result, a coating with an excellent heat resistance and a high adhesion to such a base material as a metal honeycomb filter and a high-density honeycomb can be obtained from the metal oxides.

The metal oxide nanoporous material of the present invention has the following characteristics. The metal oxide nanoporous material comprises at least two kinds of first metal oxides selected from the group consisting of alumina, zirconia, titania, iron oxide, rare-earth oxides, alkali metal oxides and alkaline-earth metal oxides. The nanoporous material has nanopores, each of which has a diameter of 10 nm or smaller, and the metal oxides are homogeneously dispersed in the wall forming the nanopores.

The metal oxide nanoporous material of the present invention preferably satisfies the following condition (I).

(I) Using a transmission electron microscope with a 200 kV accelerating voltage and a 1.0 nm diameter of electron beam, a spectrum is obtained, by energy dispersive X-ray spectroscopy, at each of measurement points located in regions where the tested sample has an approximately equal thickness. For every one of the metal elements of metal oxides that is contained in the nanoporous material in 10 at % or higher, the relative intensity ratio X, its mean value $X_m$ and the second moment $v_2$ around the mean value $X_m$ are calculated. The relative intensity ratio is calculated by converting, into a relative ratio, the integrated intensity of the peaks of X-ray fluorescence for each metal element in the obtained spectra. For all of the metal elements mentioned above, the obtained $X_m$ and $v_2$ satisfy the condition expressed in the following formula (1):

$$v_2/X_m^2 \leq 0.02 \tag{1}$$

[In the formula (1), $X_m$ is the mean value of the relative intensity ratios X, expressed as $X_m = (\Sigma X)/N$ (N is the number of measurement points); $v_2$ is the second moment around the mean value $X_m$, expressed as $v_2 = \{\Sigma(X-X_m)^2\}/N$; and $v_2/X_m^2$ is the second moment normalized by the mean value $X_m$ squared.]

The metal oxide nanoporous material of the present invention more preferably satisfies at least one of the following conditions (II) to (V).

(II) Using an X-ray microanalyzer with a 15 kV accelerating voltage and a 1 μm diameter of electron beam, a line analysis is performed in an arbitrary range of 0.5 mm or longer. For every one of the metal elements of metal oxides that is contained in the nanoporous material in 10 at % or higher, a K-value expressed in the following formula (2) is calculated:

K-value (%)=(X-ray intensity measured from the nanoporous material)/(X-ray intensity to be obtained on a pure element)

For all of the metal elements mentioned above, the K-value satisfies, at 65% or higher of all the measurement points, the condition expressed in the following formula (3):

Mathematical expression 1

$$\frac{|K - K_m|}{K_m} \leq 0.02 \quad (3)$$

[In formula (3), K is the K-value (%) at each of the measurement points; $K_m$ is the mean value of K-values of all of the measurement points. Note, however, that portions corresponding to cracks formed in the nanoporous material are excluded from the measurement points.]

(III) Using a scanning probe microscope with a tip of a 5 nm radius of curvature, height images on the surface of the nanoporous material are measured by tapping mode, arbitrarily, at intervals of not less than 3 nm but not more than 4 nm. The height image H(L) is obtained as a function of a scanning length L of 2 μm or longer in total. The height image H(L) satisfies, at 80% or more of the measurement points, the condition expressed in the following formula (4):

$$H(L) \leq 20 \text{ nm} \quad (4)$$

[In formula (4), H(L) is the height image (nm) at each of the measurement points (scanning distance=L). Note, however, that the mean value of height images H at all the measurement points is zero.]

Furthermore, the second derivative H"(L) is obtained by the following formulas (5) and (6):

Mathematical expression 2

$$H'(L) = \frac{dH}{dL} = \frac{H(L+\Delta L) - H(L)}{\Delta L} \quad (5)$$

$$H''(L) = \frac{d^2 H}{dL^2} = \frac{H'(L+\Delta L) - H'(L)}{\Delta L} \quad (6)$$

[In formulas (5) and (6), H(L) is the height image (nm) at a measurement point where the scanning length=L; H(L+ΔL) is the height image (nm) at a measurement point where the scanning length=L+ΔL; ΔL is the interval (nm) between measurement points; H'(L) is the first derivative of a height image H(L); H' (L+ΔL) is the first derivative of a height image H(L+ΔL); H"(L) is the second derivative of the height image H(L). Note, however, that ΔL is determined to be 4 nm by linear interpolation between measurement points.]

While the above-mentioned condition expressed in the formula (4) being satisfied, the second derivative H"(L) thus obtained satisfies, at 60% or less of the measurement points, the condition expressed in the following formula (7):

$$-0.05 \text{ nm}^{-1} \leq H''(L) \leq 0.05 \text{ nm}^{-1} \quad (7)$$

(IV) Suppose that, in an electron micrograph of a section of the nanoporous material, measurement lines of 400 μm or longer in total are arbitrarily drawn on the nanoporous material. As to the measurement lines, the condition to be satisfied is as follows. The length of the parts where the measurement lines cross void spaces formed in the nanoporous material is equal to or shorter than 10% of the total length of the measurement lines.

(V) Using a transmission electron microscope with a 200 kV accelerating voltage and a 1.0 nm diameter of electron beam, a spectrum is obtained, by energy dispersive X-ray spectroscopy, at 10 or more measurement points arbitrarily chosen. For every one of the metal elements of metal oxides that is contained in the nanoporous material in 10 at % or higher, the relative intensity ratio X, its mean value $X_m$ and the second moment $v_2$ around the mean value $X_m$ are calculated. The relative intensity ratio is calculated by converting, into a relative ratio, the integrated intensity of the peaks of X-ray fluorescence for each metal element in the obtained spectra. For all of the metal elements mentioned above, the obtained $X_m$ and $v_2$ satisfy the condition expressed in the following formula (8):

$$v_2/X_m^2 \leq 0.1 \quad (8)$$

[In the formula (8), $X_m$ is the mean value of the relative intensity ratios X, expressed as $X_m = (\Sigma X)/N$ (N is the number of measurement points); $v_2$ is the second moment around the mean value $X_m$, expressed as $v_2 = \{\Sigma(X-X_m)^2\}/N$; and $v_2/X_m^2$ is the second moment normalized by the mean value $X_m$ squared.]

The above-mentioned metal oxide nanoporous material of the present invention has nanopores each with a diameter preferably of 5 nm or smaller, and more preferably of 2 nm or smaller.

In addition, preferably, the metal oxide nanoporous material of the present invention has, additionally, a noble metal supported on the surface of the nanoporous material.

Moreover, the metal oxide nanoporous material of the present invention may further comprise powder of a second metal oxide with a mean particle size of 0.01 μm to 50 μm, the powder being contained in the nanoporous material. In such a case, the metal oxide nanoporous material of the present invention preferably has, additionally, a noble metal supported on the surface of the powder of the above-mentioned second metal oxide.

The metal oxide nanoporous material of the present invention may be a thin-film nanoporous material, or may be one in powder.

The above-mentioned metal oxide nanoporous material of the present invention is a novel one with nanopores and component homogeneity that no conventional porous material has ever had. The metal oxide nanoporous material has never been obtained until the following method of manufacturing a present invention is devised.

The method of manufacturing a metal oxide nanoporous material of the present invention is a method of manufacturing a metal oxide nanoporous material that includes two or more kinds of the first metal oxides selected from the group consisting of alumina, zirconia, titania, iron oxide, rare-earth oxides, alkali metal oxides, and alkaline-earth metal oxides. The method is characterized by including:

a step of preparing a source fluid composition containing a source material of the two or more kinds of the first metal oxides; and a step of obtaining the metal oxide nanoporous material which has nanopores each with a diameter of 10 nm or smaller, and in which the metal oxides are dispersed homogeneously in the wall forming the nanopores, by mixing the source fluid composition at a shear rate of 1000 sec$^{-1}$ or faster, followed by a heat treatment without substantially allowing coprecipitation to occur.

In the method of manufacturing the metal oxide nanoporous material of the present invention, preferably, the source material of the first metal oxides is at least one kind selected from the group consisting of colloidal particles of alumina, those of zirconia, those of titania, those of iron oxide, those of rare-earth oxides, those of alkali metal oxides, and those of alkaline-earth metal oxides, and a salt of aluminum, that of zirconium, that of titanium, that of iron, that of rare-earth elements, that of alkali metals and that of alkaline-earth metals.

In addition, more preferably, the source fluid composition is either (i) a colloidal solution containing at least one kind of colloidal particles selected from the group consisting of colloidal particles of alumina, those of zirconia, those of titania, those of iron oxide, those of rare-earth oxides, those of alkali metal oxides and those of alkaline-earth metal oxides, or (ii) a metal salt solution containing at least one kind of salt selected from the group consisting of a salt of aluminum, that of zirconium, that of titanium, that of iron, that of rare-earth elements, that of alkali metals and that of alkaline-earth metals.

In the method of manufacturing the metal oxide nanoporous material of the present invention, more preferably, the above-mentioned source fluid composition is mixed at a shear rate of 10000 sec$^{-1}$ or faster.

In addition, in the method of manufacturing the metal oxide nanoporous material of the present invention, (i) the metal oxide nanoporous material may be obtained in a thin film by mixing the above-mentioned source fluid composition at a shear rate of 1000 sec$^{-1}$ or faster, and applying it onto the base material without substantially allowing coprecipitation to occur, then followed by a heat treatment, or (ii) the metal oxide nanoporous material may be obtained in powder by mixing the above-mentioned source fluid composition at a shear rate of 1000 sec$^{-1}$ or faster, followed by a heat treatment and powdering without substantially allowing coprecipitation to occur.

The method of manufacturing the metal oxide nanoporous material of the present invention, preferably, further includes a step of making a noble metal supported on the surface of the nanoporous material.

Additionally, in the method of manufacturing the metal oxide nanoporous material of the present invention, the above-mentioned source fluid composition may further contain powder of a second metal oxide with a mean particle size of 0.01 μm to 50 μm. In such a case, it is preferable that the method further include a step of making a noble metal supported on the surface of the powder of the second metal oxide. In this case, more preferably, the method further includes a step of preparing a source fluid composition containing the source material of the second metal oxide, and a step of obtaining the powder of the second metal oxide by mixing the above-mentioned source fluid composition at a shear rate of 1000 sec$^{-1}$ or faster, followed by a heat treatment without substantially allowing coprecipitation to occur.

The coating composition of the present invention is a coating composition to obtain a metal oxide nanoporous material which comprises two or more kinds of first metal oxides selected from the group consisting of alumina, zirconia, titania, iron oxide, rare-earth oxides, alkali metal oxides, and alkaline-earth metal oxides, which has nanopores each with a diameter of 10 nm or smaller, and in which the metal oxides are dispersed homogeneously in the wall forming the nanopores. The coating composition is characterized by being obtained by mixing a source fluid composition containing a source material of the two or more kinds of first metal oxides at a shear rate of 1000 sec$^{-1}$ or faster.

The method of manufacturing the coating composition of the present invention is a method of manufacturing a coating composition to obtain a metal oxide nanoporous material which comprises two or more kinds of first metal oxides selected from the group consisting of alumina, zirconia, titania, iron oxide, rare-earth oxides, alkali metal oxides, and alkaline-earth metal oxides, which has nanopores each with a diameter of 10 nm or smaller, and in which the metal oxides are dispersed homogeneously in the wall forming the nanopores. The method of manufacturing the coating composition of the present invention is characterized by including a step of preparing a source fluid composition containing a source material of the two or more kinds of first metal oxides, and a step of obtaining the coating composition by mixing the above-mentioned source fluid composition at a shear rate of 1000 sec$^{-1}$ or faster.

In the coating composition and in the method of manufacturing the coating composition of the present invention, preferably, the source material of the first metal oxides is at least one kind selected from the group consisting of colloidal particles of alumina, those of zirconia, those of titania, those of iron oxide, those of rare-earth oxides, those of alkali metal oxides, and those of alkaline-earth metal oxides, and a salt of aluminum, that of zirconium, that of titan, that of iron, that of rare-earth elements, that of alkali metals and that of alkaline-earth metals.

In addition, more preferably, the source fluid composition is either (i) a colloidal solution containing at least one kind of colloidal particles selected from the group consisting of colloidal particles of alumina, those of zirconia, those of titania, those of iron oxide, those of rare-earth oxides, those of alkali metal oxides and those of alkaline-earth metal oxides, or (ii) a metal salt solution containing at least one kind of salt selected from the group consisting of a salt of aluminum, that of zirconium, that of titanium, that of iron, that of rare-earth elements, that of alkali metals and that of alkaline-earth metals.

In the coating composition and in the method of manufacturing the coating composition of the present invention, more preferably, the above-mentioned source fluid composition is mixed at a shear rate of 10000 sec$^{-1}$ or faster.

In the coating composition and in the method of manufacturing the coating composition of the present invention, the above-mentioned source fluid composition may further contain powder of a second metal oxide with a mean particle size of 0.01 μm to 50 μm. In such a case, a noble metal is preferably made to be supported on the surface of the powder of the second metal oxide.

The present invention makes it possible to provide a metal oxide nanoporous material with the following features. The metal oxide nanoporous material has a high adhesion to various base materials such as a honeycomb filter, and also has an excellent heat resistance. In addition, the metal oxide nanoporous material allows a coating formed on the base material to be in a thin film. Moreover, the metal oxide nanoporous material allows a coat to form with an excellent heat resistance and a high adhesion to such base materials as a metal honeycomb filter and a high-density honeycomb. Providing a coating composition to obtain such a metal oxide nanoporous material is also made possible by the present invention. Furthermore, providing methods of manufacturing the metal oxide nanoporous material and the coating composition is made possible as well by the present invention.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE PREFERRED EMBODIMENTS

Figure 1:
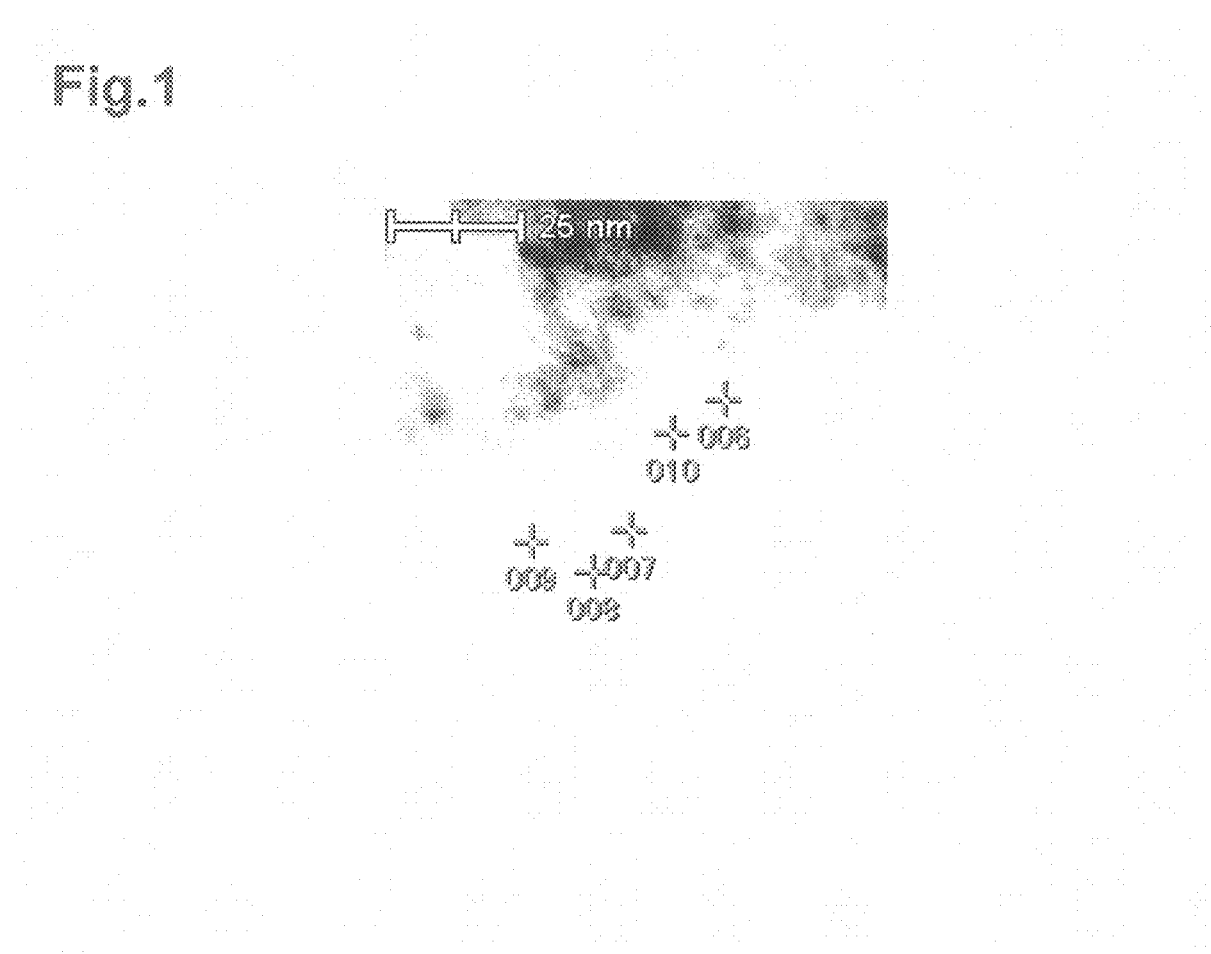
FIG. 1 is a transmission electron micrograph showing an example of a place where a satisfactory element analysis cannot be performed.

Details of the present invention are explained below based on a preferred embodiment.

First, explanations are given of a metal oxide nanoporous material of the present invention. A first metal oxides used in the present invention are two or more kinds of metal oxides selected from the group consisting of alumina, zirconia, titania, iron oxide, rare-earth oxides, alkali metal oxides, and alkaline-earth metal oxides. Rare-earth oxides include cerium oxide, lanthanum oxide, neodymium oxide, yttrium oxide, praseodymium oxide, and the like. Alkali metal oxides include lithium oxide, sodium oxide, potassium oxide, cesium oxide, and the like. Alkaline-earth metal oxides include barium oxide, strontium oxide, calcium oxide, magnesium oxide, and the like.

In view of the fact that the obtained metal oxide nanoporous material is to be useful as a catalyst for purification of exhaust gas, what is preferable for the metal oxide used in the present invention is a composite metal oxide of two or more kinds selected from the group consisting of alumina, zirconia, titania, iron oxide, ceria, lanthana, neodymia, yttria, barium oxide, lithium oxide, and potassium oxide. Especially preferable is a composite metal oxide that contains at least one kind of metal oxide selected from the group consisting of alumina, zirconia, ceria, and titania.

There is no limitation, in particular, on the combination of the two or more kinds of metal oxides. Nevertheless, in view of the fact that the obtained metal oxide nanoporous material is to be useful as a catalyst for purification of exhaust gas, preferable combinations are: alumina/ceria/zirconia; alumina/zirconia/titania; alumina/zirconia/lanthana; zirconia/lanthana; zirconia/neodymia; zirconia/yttria; zirconia/titania; ceria/zirconia; alumina/zirconia/yttria; ceria/zirconia/yttria; alumina/ceria; alumina/zirconia; alumina/titania; alumina/lanthana; alumina/ceria/zirconia/yttria; alumina/ceria/zirconia/neodymia; alumina/ceria/zirconia/lanthana; alumina/ceria/zirconia/lanthana/praseodymium oxide; alumina/ceria/zirconia/lanthana/neodymia; alumina/ceria/zirconia/lanthana/neodymia/yttria; alumina/iron oxide; ceria/iron oxide; alumina/ceria/iron oxide; zirconia/iron oxide; alumina/zirconia/iron oxide; and the like. Especially preferable are: alumina/ceria/zirconia; alumina/zirconia/titania; alumina/zirconia/lanthana; zirconia/lanthana; zirconia/neodymia; zirconia/yttria; zirconia/titania; ceria/zirconia; alumina/zirconia/yttria; ceria/zirconia/yttria; alumina/ceria; alumina/zirconia; and alumina/iron oxide.

In view of the fact that the obtained metal oxide nanoporous material is to be a preferable material for catalyst for purification of exhaust gas, especially for a catalyst used under oxygen excess conditions, preferable combinations of the two or more kinds of metal oxides are: alumina/potassium oxide; alumina/barium oxide; barium oxide/potassium oxide; barium oxide/sodium oxide; barium oxide/lithium oxide; barium oxide/potassium oxide/lithium oxide; titania/barium oxide; titania/barium oxide/potassium oxide; titania/barium oxide/sodium oxide; titania/barium oxide/lithium oxide; titania/barium oxide/potassium oxide/sodium oxide; titania/barium oxide/potassium oxide/lithium oxide; titania/barium oxide/potassium oxide/lithium oxide/sodium oxide; titania/barium oxide/potassium oxide/strontium oxide; and the like. Especially preferable are: alumina/potassium oxide; alumina/barium oxide; barium oxide/potassium oxide; barium oxide/lithium oxide; barium oxide/potassium oxide/lithium oxide; titania/barium oxide; titania/barium oxide/potassium oxide; and titania/barium oxide/lithium oxide.

Note that there is no limitation, in particular, on the composition of the metal oxides in the composite metal oxide of various kinds, and the composition is adjusted appropriately for the usage and the like.

The metal oxide nanoporous material of the present invention has the following characteristics. The metal oxide nanoporous material includes the above-mentioned first metal oxides. The metal oxide nanoporous material has nanopores, each with a diameter of 10 nm or smaller and the metal oxides are dispersed homogeneously in the wall forming the nanopores.

As is mentioned above, the metal oxide nanoporous material of the present invention has such extremely microscopic pores as having a diameter of 10 nm or smaller, preferably of 5 nm or smaller, and more preferably of 2 nm or smaller. With such microscopic pores, the metal oxide nanoporous material of the present invention has an improved adhesion to various base materials and an improved heat resistance in comparison to a metal oxide porous material that has no such microscopic pores. In addition, the metal oxide nanoporous material of the present invention has an improved specific surface area and provides more stable support for a noble metal and the like. These characteristics contribute to an improved performance as a catalyst support.

In the metal oxide nanoporous material of the present invention, the metal oxides are dispersed homogeneously in the wall forming the nanopores. In other words, in the metal oxide nanoporous material of the present invention, two or more kinds of metal oxides which compose the nanoporous material are thought to be homogeneously dispersed substantially at the atomic level (i.e. highly dispersed). This state is clearly different from the states of a conventional metal oxide porous material obtained by, for example, the coprecipitation method and the like. In the above-mentioned state of the conventional metal oxide porous material thus obtained, primary particles, with a diameter of about 100 nm, of each metal oxides are mixed with one another, and the surface of each primary particle of a first metal oxide is covered with the coat of a second metal oxide. Conventional metal oxides obtained by using a colloidal solution of a metal oxide as it is or a solution of a metal salt as it is can never attain such extremely high-level component homogeneity. Such extremely high-level component homogeneity has never been attained until the manufacturing method of the present invention described later is devised. In the method of manufacturing the metal oxide nanoporous material of the present invention, a colloidal solution containing two or more kinds of metal oxides, or a solution containing two or more kinds of metal salts is mixed at a high shear rate, followed by a heat treatment without substantially allowing the precipitation to occur. Surprisingly, the metal oxide nanoporous material of the present invention with such high-level component homogeneity has a significantly improved adhesion to various base materials and a significantly improved heat resistance in comparison to a conventional metal oxide porous material obtained by a coprecipitation method, or the like.

There is no limitation, in particular, on the form of the metal oxide nanoporous material of the present invention. The metal oxide nanoporous material may be a thin film, or may be in powder. The metal oxide nanoporous material in these forms may further be formed into a specified shape. In a case where the metal oxide nanoporous material of the present invention is a thin film, there is no limitation, in particular, on its thickness, and the thickness is adjusted appropriately for its usage and the like. Nevertheless, the metal oxide nanoporous material of the present invention, even in a case of being made thin, can form a homogeneous coating with an excellent adhesion to various base materials such as a metal honeycomb filter. For this reason, the thickness of the thin film, preferably, is approximately 1 µm to 300 µm, or more preferably is approximately 1 µm to 50 µm. Furthermore, as described above, the present invention can cause the coating of metal oxide to be formed into a thin film. As a result, a coating with a high-level adhesion and an excellent heat resistance can be formed on a high-density honeycomb on which it has been conventionally difficult to sufficiently form a coating. Taking this fact into consideration, the thickness of the thin film, which is particularly preferable, is approximately 1 µm to 30 µm.

Alternatively, in a case where the metal oxide nanoporous material of the present invention is in powder, there is no limitation, in particular, on its particle size. The particle size is adjusted appropriately for the usage and the like, but generally, a preferable particle size is 0.01 µm to 50 µm. It is difficult to fabricate a powder of such a nanoporous material with a mean particle size of less than 0.01 µm through such a method of manufacturing as by grinding the metal oxide. On the other hand, a powder of such a nanoporous material with a mean particle size of more than 50 µm tends to have problems because such a powder only produces a very thick coating, and renders its adhesion deteriorating.

The metal oxide nanoporous material of the present invention preferably satisfies the condition (I) described below.

Specifically, the first condition (I) that the metal oxide nanoporous material of the present invention preferably satisfies is as follows. Using a transmission electron microscope with a 200 kV accelerating voltage and a 1.0 nm diameter of electron beam, a spectrum is obtained, by energy dispersive X-ray spectroscopy, at each of measurement points located in regions where the tested sample has an approximately equal thickness. For every one of the metal elements of metal oxides that is contained in the nanoporous material in 10 at % or higher, the relative intensity ratio X, its mean value $X_m$ and the second moment $v_2$ around the mean value $X_m$ are calculated. The relative intensity ratio is calculated by converting, into a relative ratio, the integrated intensity of the peaks of X-ray fluorescence for each metal element in the obtained spectra. For all of the metal elements mentioned above, the obtained $X_m$ and $v_2$ satisfy the condition expressed in the following formula (1):

$$v_2/X_m^2 \leq 0.02 \quad (1)$$

In the formula (1), $X_m$ is the mean value of the relative intensity ratios X, expressed in the following formula:

$$X_m = (\Sigma X)/N$$

(N is the number of measurement points).

$v_2$ is the second moment around the mean value $X_m$, expressed in the following formula:

$$v_2 = \{\Sigma (X - X_m)^2\}/N.$$

Furthermore, $v_2/X_m^2$ is the second moment normalized by the mean value $X_m$ squared.

Note that there is no limitation, in particular, on the specific method of measurement such as this. However, it is preferable that the measurement be carried out, for example, following the measurement method shown below.

<Preparation of Sample>

A sample of a small amount of the metal oxide nanoporous material is obtained, and then is mixed with a dispersion medium (for example, ethanol) of 5 ml to 10 ml held in a container. The obtained mixture is put in a water bath of a ultrasonic washer, and is stirred by ultrasonic waves for a few minutes. Then, the container is taken out of the ultrasonic washer immediately. The dispersion of the test sample, specifically a couple of drips thereof, is dropped on a sample stage dedicated to a transmission electron microscope. The sample stage, called "microgrid," is made by applying a porous organic film onto a mesh, approximately of 3 mmΦ, made of copper foil. Once the dispersion completely evaporates, an observation by the transmission electron microscope is carried out.

<Observation Using Transmission Electron Microscope>

A transmission electron microscope (TEM) with an accelerating voltage of 200 kV having a field-emission electron gun (FEG) is employed for the observation. The TEM that can be employed for the measurement has to be equipped with a scanning transmission electron microscope (STEM) observation mode and with a detector for energy dispersive X-ray spectroscopy (EDX). Inserting the microgrid with the above-mentioned test sample dropped thereon into the sample chamber of the TEM. The sample sticking out to the pores of the organic film of the microgrid (i.e. the part not overlapping with the organic film) is to be subjected to the observation and to the element-analysis. At the time, part of the test sample, which has a thickness relatively thinner, is selected. Then, an electron beam narrowed to 1 nmΦ is irradiated for 30 seconds in the STEM observation mode, and the X-ray fluorescence emitted from the sample is detected by the EDX detector. With respect to the thickness of the sample, taking total counts of all the X-rays, which are obtained with the EDX detector, as a reference, a part where 10,000 counts to 60,000 counts are detected is defined as the region appropriate for the measurement. In other words, such a part is defined as the region where the test sample is considered to have an approximately uniform thickness.

<Favorability Discrimination of Measurement Region>

Figure 2:
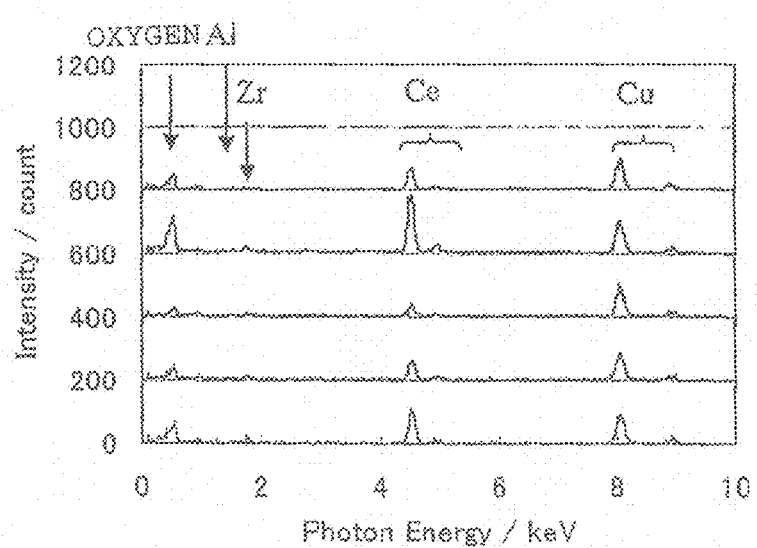
FIG. 2 is a graph showing an example of unsatisfactory measurement results of EDX spectra.
Figure 3:
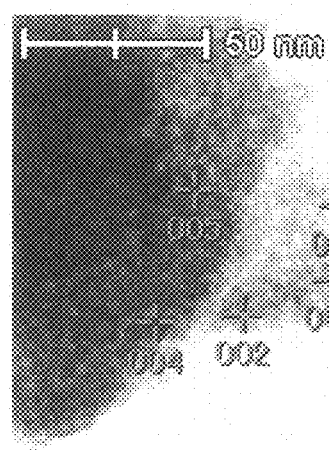
FIG. 3 is a transmission electron micrograph showing an example of the places where a satisfactory element analysis was performed.
Figure 4:
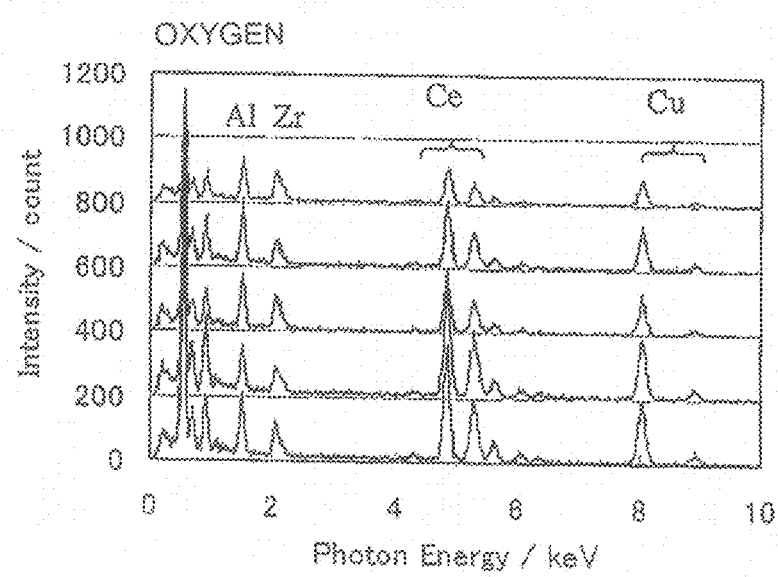
FIG. 4 is a graph showing an example of satisfactory measurement results of EDX spectra.

In some places, the element analysis cannot be performed satisfactorily. In such places, the measurement region is close to the cupper foil supporting the organic film of the microgrid, and thus some of the X-ray fluorescence emitted from the sample hit the cupper foil. The EDX detection results obtained from such places have such characteristics: (1) a low number of count in general; (2) a low number of count particularly in a low-energy region such as X-ray fluorescence of oxygen and the like; (3) a high number of count for cupper in contrast to those mentioned in (1) and (2). FIG. 1 is a transmission electron micrograph showing an example of such a place where a satisfactory element analysis cannot be performed (note that the reference numerals 006 to 010 in FIG. 1 indicate measurement points). FIG. 2 shows an example of unsatisfactory measurement results of EDX spectra. All of the measurement results obtained from such measurement places are excluded from the list of examination objects. The measurement continues while adding test samples at other pores of the organic film as newly chosen measurement objects. For example, in Examples to be described later, the measurement result obtained from the points where the ratio of total counts for oxygen to those for cupper is less than 2 in the obtained EDX spectra are excluded from the list of calculation objects. The calculation to be described later is based solely on the measurement results obtained from the places where the ratio of the total counts for oxygen to those for cupper is equal to or more than 2 in the EDX spectra. FIG. 3 is a transmission electron micrograph showing an example of the places where a satisfactory element analysis was performed (note that the reference numerals 001 to 005 in FIG. 3 indicate measurement points). FIG. 4 shows an example of satisfactory measurement results of EDX spectra.

<Calculation Based on Measurement Results>

In the present invention, EDX spectrum data are used as being unprocessed when determination is carried out as to whether or not the above-described conditions are satisfied. In other words, the calculation is not based on any values obtained by converting, according to some conversion formulas, the number of X-ray fluorescence counts into a weight ratio of the elements or the like, but is based on the very number of X-ray fluorescence counts. To begin with, from X-ray fluorescence peaks in the EDX spectra, a peak is chosen for each metal element of the principal metal elements, for example Al, Zr and Ce, which compose the sample according to the following criteria (1) and (2). Note that the principal metal elements here are the metal elements of all of the metal oxides which are contained in the sample, and which accounts for 10 at % or more of it. (1) The peak with more counts is chosen. (2) The peak with overlapping with other peaks are so small that it can be considered negligible. Subsequently, a certain energy width is set so that the width would be a necessary and sufficient width (0.2 keV to 0.3 keV, approximately) to cover all the peaks chosen in the above-mentioned manner. All of the X-ray fluorescence counts within the range are added up. The resultant value is defined as the integrated intensity of X-ray fluorescence peak for the metal element. Furthermore, based on the result, the following are sequentially calculated: X: the above described relative intensity ratio; $X_m$: its mean value, $v_2$: the second moment around the mean value $X_m$; $v_2/X_m^2$: the second moment normalized by the mean value $X_m$ squared. Then, a determination is carried out as to whether or not the condition expressed in the above-described formula (1) is satisfied.

The fact that the metal oxide nanoporous material of the present invention satisfies the condition expressed in the formula (1) indicates that the principal metal oxides that the nanoporous material includes are dispersed in the wall forming the nanopores in an extremely homogeneous way. Metal oxides obtained by using a colloidal solution of metal oxides as it is or a solution of metal salts as it is can never attain a extremely high-level component homogeneity such as this. Such extremely high-level component homogeneity has not been attained until the manufacturing method of the present invention described later is devised. Surprisingly, the metal oxide nanoporous material that satisfies the condition expressed in the above formula (1) has a significantly improved adhesion to various base materials and a significantly improved heat resistance in comparison to a conventional metal oxide porous material that does not satisfy the condition.

In addition, the metal oxide nanoporous material of the present invention preferably satisfies at least one of the conditions (II) (or more preferably (II')), (III), (IV), and (V), all of which will be described below. Particularly, on the one hand, the metal oxide nanoporous material obtained by using a colloidal solution as a source fluid composition to be described below preferably satisfies at least one of the conditions (II) (or more preferably (II')), (III), and (IV). On the other hand, the metal oxide nanoporous material obtained by using a metal salt solution as a source fluid composition to be described below preferably satisfies the condition (V).

The metal oxide nanoporous material of the present invention preferably satisfies the condition (II) described below.

Specifically, the second condition (II) that the metal oxide nanoporous material of the present invention preferably satisfies is as follows. Using an X-ray microanalyzer with a 15 kV accelerating voltage and a 1 μm diameter of electron beam, a line analysis is performed in an arbitrary range of 0.5 mm or longer. For every one of the metal elements of metal oxides contained in the nanoporous material in 10 at % or higher, a K-value expressed in the following formula (2) is calculated:

K-value (%)=(X-ray intensity measured from the porous material)/(X-ray intensity to be obtained on a pure element)

For all of the metal elements mentioned above, the K-value satisfies, at 65% or higher (especially preferable, at 75% or higher) of all of the measurement points, the condition expressed in the following formula (3):

Mathematical expression 3

$$\frac{|K - K_m|}{K_m} \leq 0.02 \qquad (3)$$

In addition, the second prime condition (II') that the metal oxide nanoporous material of the present invention more preferably satisfies is as follows. Using an X-ray microanalyzer with a 15 kV accelerating voltage and a 1 µm diameter of electron beam, a line analysis is performed in an arbitrary range of 0.5 mm or longer. For every one of the metal elements of metal oxides contained in the nanoporous material in 5 at % or higher, the K-value expressed in the above-mentioned formula (2) satisfies, at 40% or higher of all of the measurement points, the condition expressed in the above-mentioned formula (3).

In the above-mentioned formula (3), K is the K-value (%) at each measurement point, and $K_m$ is the mean value of K-values of all the measurement points. When the K-values are obtained, portions corresponding to cracks formed in the nanoporous material are excluded from the measurement points that are actually subjected to the line analysis. Note that, as a method of identifying the cracks, the following methods are preferably employed: a method in which a portion to be identified as a crack is a portion where, in the result of X-ray microanalyzer, the component of the base material is detected in a certain predetermined amount or more; and a method in which a crack is identified based on the optical or electron microscopic observation. In addition, there is no limitation on the X-ray microanalyzer used here, and an ordinary one of wavelength dispersive type may be used.

The fact that the metal oxide nanoporous material of the present invention satisfies the above-described condition (II) (or more preferably (II')) indicates that the principal metal oxides that the metal oxide nanoporous material includes are dispersed in the nanoporous material in an extremely homogeneous way. Metal oxides obtained by using a colloidal solution of metal oxides as it is or a solution of metal salts as it is can never attain an extremely high-level component homogeneity such as this. Such extremely high-level component homogeneity has not been attained until the manufacturing method of the present invention described later is devised. Surprisingly, the metal oxide nanoporous material that satisfies the above-described condition (II) (or more preferably (II')) has a significantly improved adhesion to various base materials and a significantly improved heat resistance in comparison to a conventional metal oxide porous material that does not satisfy the condition (II).

The metal oxide nanoporous material of the present invention preferably satisfies the condition (III) described below.

Specifically, the third condition (III) that the metal oxide nanoporous material of the present invention preferably satisfies is as follows. Using a scanning probe microscope (SPM) with a tip of a 5 nm radius of curvature, height images on the surface of the nanoporous material are measured in tapping mode, arbitrarily, at intervals of 3 nm or larger but less than 4 nm. The height image H(L) is obtained as a function of a scanning length L of 2 µm or longer in total. The height image H(L) satisfies, at 80% or higher (especially preferable, at 90% or higher) of all of the measurement points, the condition expressed in the following formula (4):

$$H(L) \leq 20 \text{ nm} \qquad (4)$$

[In formula (4), H(L) is the height image (nm) at each of the measurement points (scanning distance=L). Note, however, that the mean value of height images H at all the measurement points is zero.]

Furthermore, the second derivative H"(L) is obtained by the following formulas (5) and (6):

Mathematical expression 4

$$H'(L) = \frac{dH}{dL} = \frac{H(L+\Delta L) - H(L)}{\Delta L} \qquad (5)$$

$$H''(L) = \frac{d^2 H}{dL^2} = \frac{H'(L+\Delta L) - H'(L)}{\Delta L} \qquad (6)$$

[In formulas (5) and (6), H(L) is the height image (nm) at a measurement point where the scanning length=L; H(L+ΔL) is the height image (nm) at a measurement point where the scanning length=L+ΔL; ΔL is the interval (nm) between measurement points; H' (L) is the first derivative of a height image H(L); H' (L+ΔL) is the first derivative of a height image H(L+ΔL); H"(L) is the second derivative of the height image H(L). Note, however, that ΔL is determined to be 4 nm by linear interpolation between measurement points.]

While the above-mentioned condition expressed in the formula (4) being satisfied, the second derivative H"(L) thus obtained satisfies, at 60% or lower (especially preferable, at 55% or lower) of all of the measurement points, the condition expressed in the following formula (7):

$$-0.05 \text{ nm}^{-1} \leq H''(L) \leq 0.05 \text{ nm}^{-1} \qquad (7)$$

Note that no smoothing process is carried out when the above-mentioned second derivative H"(L) is obtained.

The fact that the metal oxide nanoporous material of the present invention satisfies the above-described former part of the condition (III) indicates that the surface is in a state of an uneven distribution of height in small areas, and that the surface is in a finely irregular state. On the other hand, the fact that the metal oxide nanoporous material of the present invention satisfies the above-described latter part of the condition (III) indicates that the second derivative includes a relatively large value. It also indicates that each of the faces of concavity and of convexity on the irregular surface is not smooth. In fact, it indicates that each of the concave and convex faces is in an even more finely irregular surface state. Metal oxides obtained by using a colloidal solution of metal oxides as it is or a solution of metal salts as it is can never attain such a unique surface profile as this. Such a unique surface profile as this has never been attained until the manufacturing method of the present invention to be described later is devised. Surprisingly, the metal oxide nanoporous material that satisfies the above-described condition (III) has a significantly improved adhesion to various base materials and a significantly improved heat resistance in comparison to a conventional metal oxide porous material that does not satisfy the condition (III).

The metal oxide nanoporous material of the present invention preferably satisfies the condition (IV) described below.

Specifically, the fourth condition (IV) that the metal oxide nanoporous material of the present invention preferably satisfies is as follows. Suppose that, in an electron micrograph of a section of the nanoporous material, measurement lines of 400 μm or longer in total are arbitrarily drawn on the nanoporous material. As to the measurement lines, the condition to be satisfied is as follows. The length of the parts where the above-mentioned measurement lines cross void spaces (except nanoporous) formed in the nanoporous material is equal to or shorter than 10% (especially preferable, equal to or shorter than 5%) of the total length of the above-mentioned measurement lines.

The fact that the metal oxide nanoporous material of the present invention satisfies the above-described condition (IV) indicates that a certain and appropriate degree of continuity is secured in the metal oxides which the nanoporous material includes, and that void spaces existing in the nanoporous material occupy a small proportion of the nanoporous material. A conventional metal oxide obtained by using slurry can never be such a metal oxide nanoporous material as this one in which an appropriate degree of continuity is ensured, and which has a sectional aspect with a small proportion of void spaces. Such a metal oxide nanoporous material as this has never been attained until the manufacturing method of the present invention to be described later is devised. Surprisingly, the metal oxide nanoporous material that satisfies the above-described condition (IV) has a significantly improved adhesion to various base materials and a significantly improved heat resistance in comparison to a conventional metal oxide porous material that does not satisfy the condition (IV).

The metal oxide nanoporous material of the present invention preferably satisfies the condition (V) described below.

Specifically, the fifth condition (V) that the metal oxide nanoporous material of the present invention preferably satisfies is as follows. Using a transmission electron microscope with a 200 kV accelerating voltage and a 1.0 nm diameter of electron beam, a spectrum is obtained, by energy dispersive X-ray spectroscopy, at 10 or more measurement points arbitrarily chosen. For every one of the metal elements of metal oxides that is contained in the nanoporous material in 10 at % or higher, the relative intensity ratio X, its mean value $X_m$, and the second moment $v_2$ around the mean value $X_m$ are calculated. The relative intensity ratio X is calculated by converting, into a relative ratio, the integrated intensity of the peaks of X-ray fluorescence for each metal element in the obtained spectra. For all of the metal elements mentioned above, the obtained $X_m$ and $v_2$ satisfy the condition expressed in the following formula (8):

$$v_2/X_m^2 \leq 0.1 \qquad (8)$$

In the above-mentioned formula (8), $X_m$ is the mean value of the relative intensity ratios X, expressed in the formula below:

$$X_m = (\Sigma X)/N$$

(N is the number of measurement points).
In addition, $v_2$ is the second moment around the mean value $X_m$, expressed in the formula below:

$$v_2 = \{\Sigma(X-X_m)^2\}/N.$$

Furthermore, $v_2/X_m^2$ is the second moment normalized by the mean value $X_m$ squared.

Note that most of the details (Preparation of Sample, Observation Using Transmission Electron Microscope, Favorability Discrimination of Measurement Region, and Calculation Based on Measurement Results) of the determination method of this condition (V) are similar to those of the above-mentioned condition (I), but the following difference exists between the two. In the determination of the condition (V), not as in the case of the determination method of condition (I), measurement values to be used are not limited to ones obtained from measurement points located in regions where the test sample is considered to have an approximately uniform thickness. Ten or more measurement points arbitrarily chosen may be used. For this reason, at transmission electron microscopic observation, with respect to the thickness of the sample, taking total counts of all the X-rays obtained by the EDX detector as a reference, a part where 10,000 counts to 15,000 counts are detected can be defined, and can be used, as the region appropriate for the measurement.

The fact that the metal oxide nanoporous material of the present invention satisfies the above-described condition (V) indicates that the principal metal oxides that the nanoporous material includes are dispersed in the nanoporous material in an extremely homogeneous way. Metal oxides obtained by using a colloidal solution of metal oxides as it is or a solution of metal salts as it is can never attain such an extremely high-level component homogeneity as this. Such an extremely high-level component homogeneity as this has never been attained until the manufacturing method of the present invention to be described later is devised. Surprisingly, the metal oxide nanoporous material that satisfies the above-described condition (V) has a significantly improved adhesion to various base materials and a significantly improved heat resistance in comparison to a conventional metal oxide porous material that does not satisfy the condition.

The metal oxide nanoporous material of the present invention preferably satisfies one of the above-described conditions (I) to (V), and more preferably, two or more of the conditions (I) to (V). When plural conditions are satisfied, the principal metal oxides that the nanoporous material includes are dispersed in the nanoporous material (in the wall forming nanopores) in an extremely homogeneous way. In this way, the adhesion to various base materials and the heat resistance of the metal oxide nanoporous material can be improved synergistically.

The metal oxide nanoporous material of the present invention has been explained hereinbefore. The metal oxide nanoporous material of the present invention may further comprise a noble metal carried on the surface thereof. Examples of such a noble metal are platinum, rhodium, palladium, osmium, iridium, and gold. In view of the fact that the obtained metal oxide nanoporous material is to be useful as a catalyst and the like for purification of exhaust gas, preferable are platinum, rhodium and palladium. In addition, there is no limitation on the amount of supported noble metal, and the amount is adjusted appropriately for the usage and the like of the metal oxide nanoporous material to be obtained. Nevertheless, in general, the amount is approximately 0.1 parts by mass to 10 parts by mass with respect to 100 parts by mass of the first metal oxides.

In addition, a second metal oxide in powder with a mean particle size of 0.01 μm to 50 μm may be mixed with the metal oxide nanoporous material of the present invention. Examples of such a second metal oxide are alumina, zirconia, ceria, titania, silica, lanthana and yttria. It is difficult to fabricate a powder of such a metal oxide with a mean particle size of less than 0.01 μm through a method of manufacturing by grinding the metal oxide. On the other hand, a powder such as one with a mean particle size of more than 50 μm tends to have problems because such a powder only produces a very thick coating, and renders its adhesion deteriorating. Moreover, there is no limitation, in particular, on the amount of such a second-metal-oxide powder added to the metal oxide nanoporous material, but what is preferable is approximately 30% by mass to 70% by mass of the metal oxide nanoporous material to be obtained.

Furthermore, the powder of the second metal oxide may be made to support a noble metal. Examples of such a noble metal are platinum, rhodium, palladium, osmium, iridium, and gold. In view of the fact that the obtained metal oxide nanoporous material is to be useful as a catalyst and the like for purification of exhaust gas, preferable are platinum, rhodium and palladium. In addition, there is no limitation, in particular, on the amount of supported noble metal, and the amount is adjusted appropriately for the usage and the like of the metal oxide nanoporous material to be obtained. Nevertheless, in general, the amount is approximately 0.1 parts by mass to 10 parts by mass with respect to 100 parts by mass of the second metal oxide.

Now, what follows is an explanation of the manufacturing method of the metal oxide nanoporous material of the present invention. Also an explanation of the coating composition of the present invention and an explanation of the manufacturing method of the coating composition will be given. Specifically, the manufacturing method of the metal oxide nanoporous material of the present invention is a method of manufacturing the metal oxide nanoporous material that includes:

a step of preparing a source fluid composition containing a source material of the two or more kinds of first metal oxides, and a step of obtaining a metal oxide nanoporous material which has nanopores, each with a diameter of 10 nm or smaller, and in which the metal oxides are dispersed homogeneously in the wall forming the nanopores, by mixing the source fluid composition at a shear rate of $1000\ \text{sec}^{-1}$ or faster, followed by a heat treatment without substantially allowing precipitation to occur.

Additionally, the coating composition of the present invention is a coating composition to obtain the metal oxide nanoporous material of the present invention, which is characterized by being obtained by mixing a source fluid composition containing a source material of the two or more kinds of the first metal oxides at a shear rate of $1000\ \text{sec}^{-1}$ or faster.

Moreover, the manufacturing method of the coating composition of the present invention is a manufacturing method of a coating composition to obtain the metal oxide nanoporous material of the present invention, the method being characterized by including:

a step of preparing a source fluid composition containing a source material of the two or more kinds of the first metal oxides; and a step of obtaining the coating composition by mixing the source fluid composition at a shear rate of $1000\ \text{sec}^{-1}$ or faster.

An example of a preferable source material of the first metal oxide used in the present invention is at least one kind selected from the group consisting of colloidal particles of alumina, those of zirconia, those of titania, those of iron oxide, those of rare-earth oxides, those of alkali metal oxides and those of alkaline-earth metal oxides, and a salt of aluminum, that of zirconium, that of titanium, that of iron, that of rare-earth elements, that of alkali metals and that of alkaline-earth metals.

In addition, a preferable source fluid composition according to the present invention is:

(i) a colloidal solution containing at least one kind selected from the group consisting of colloidal particles of alumina, those of zirconia, those of titania, those of iron oxide, those of rare-earth oxides, those of alkali metal oxides and those of alkaline-earth metal oxides; or (ii) a metal salt solution containing at least one kind selected from the group consisting of a salt of aluminum, that of zirconium, that of titanium, that of iron, that of rare-earth elements, that of alkali metals and that of alkaline-earth metals.

First, the colloidal solution according to the present invention will be explained. The colloidal particles of the metal oxide used in the present invention are colloidal particles with a mean particle size of 5 nm to 200 nm, and preferably, colloidal particles with a mean particle size of 5 nm to 100 nm. Colloidal particles with a mean particle size of less than 5 nm are hardly available because it is impossible in principle to fabricate a colloidal particle under the size of a single particle of the metal oxide. On the other hand, colloidal particles with a mean particle size of over 200 nm cause various problems such as deterioration in miscibility and dispersibility, deterioration in adhesion and deterioration in reactivity.

Note that there is no limitation, in particular, on the shape of such a colloidal particle, and an acicular particle, a rod-like particle, a feather-like particle, a spherical particle, an amorphous particle, and the like can be used. In addition, there is no limitation, in particular, on the solvent to adjust the concentration of the colloidal solution. Water, alcohol and the like can be used as the solvent. It is, however, selected in consideration of the amount of metal oxide made to be supported per time, and the like.

Moreover, in a case where a nanoporous material made of two or more kinds of metal oxides is obtained in the present invention, part of the metal oxides may be contained, as a solution of its constituent elements, in the colloidal solution. Preferably used as a solution of this kind is a solution of a salt of a metal (nitrate, acetate, chloride, sulfate, sulfite, inorganic complex salt, and the like), solved in a solvent such as water and alcohol, the metal being a constituent element.

Subsequently, the metal salt solution according to the present invention will be explained. The salt of the metal used as a source material in the present invention is a salt of component that is to be oxidized through the heat treatment explained later to become the above-described metal oxide. Specifically, salts of two or more kinds of metals selected from the group consisting of aluminum, zirconium, titanium, iron, rare-earth elements, alkali metals and alkaline-earth metals are used. Preferable conditions for the two or more kinds of metals and for the combination thereof are similar to the above-described preferable conditions of the metal oxides and their combination.

In addition, preferably used as the two or more kinds of metal salts are water-soluble salts, such as nitrate, acetate, chloride, sulfate, sulfite, and inorganic complex salt, of above-mentioned metals (for example, aluminum nitrate, zirconium oxynitrate, cerium nitrate, zirconium acetate, zirconium oxysulfate, titanium tetrachloride, ammonium titanyl oxalate, titanyl sulfate, and yttrium nitrate).

Moreover, there is no limitation, in particular, on the solvent to prepare a metal-salt solution containing the two or more kinds of metal salts according to the present invention, and various solvents such as water and alcohol (for example, either a sole solvent of, or a mixture solvent of, methanol, ethanol, ethylene glycol and the like) can be used. Nevertheless, in view of the improvement in adhesion to a metal base material, a mixed solution of water and alcohol is preferable, and more preferable is a mixed solvent of water and alcohol with an alcohol content of 40% by mass to 100% by mass (especially preferable, of 55% by mass to 80% by mass).

Furthermore, there is no limitation, in particular, on the pH value of the metal salt solution according to the present invention. In view of the fact that metal ions exist more stably in the solution, a preferable solution is a metal solution with a pH value of 3.0 to 6.0.

In the present invention, additionally, the source fluid composition may further contain the above-described second-metal-oxide powder with a mean particle size of 0.01 μm to 50 μm (preferably, 0.01 μm to 10 μm). Note that what can preferably be used as the second metal oxide is the same one that is used as the first metal oxide. Moreover, a powder obtained in the following manner is preferably used as the powder of the second metal oxide. A solution containing a metal salt to be oxidized to be the second metal oxide is dried, and then the resultant product is ground. Furthermore, the mean particle size of the powder is preferably not more than the thickness of the coating intended to be obtained.

Additionally, in a case where such a second-metal-oxide powder is used, the above-described noble metal can be made to be supported on its surface in advance. There is no limitation on the way in which such a noble metal is made to be supported, and the following method is a preferable example. The powder is soaked in a solution where a salt (nitrate, chloride, acetate, or the like) of a noble metal or a noble-metal complex is solved in a solvent such as water and alcohol. Then, after the solvent is removed, the resultant product is calcined and ground. Note that the preferable drying conditions for removing the solvent in the step of making the noble metal to be supported are with a temperature of 30° C. to 150° C. and for a time of 10 minutes or shorter. In addition, the preferable calcining conditions are in an oxidizing atmosphere (for example, in the air), with a temperature of 250° C. to 300° C., and for a time approximately of 30 minutes to 60 minutes. Moreover, such a step of making the noble metal to be supported may be repeated until the amount of supported noble metal reaches the desired amount.

In the manufacturing method of the metal oxide nanoporous material of the present invention, the coating composition is obtained by mixing the above-described source fluid composition according to the present invention at a shear rate of 1000 sec$^{-1}$ or faster, more preferably at a shear rate of 10000 sec$^{-1}$ or faster, or especially preferably at a shear rate of 20000 sec$^{-1}$ or faster. A shear rate of slower than 1000 sec$^{-1}$ renders the above-described component homogeneity of the obtained metal oxide nanoporous material unsatisfactory, and the improvement in the adhesion and the heat resistance of the nanoporous material insufficient. Note that there is no limitation, in particular, on the upper limit of the shear rate, but a shear rate of 200000 sec$^{-1}$ or slower is preferable.

Note that there is no limitation, in particular, on the apparatus used here, as long as the apparatus is capable of mixing at such a high shear rate. A homogenizer, however, is preferably used. In addition, there is no limitation, in particular, on the mixing time at a high shear rate as such, but in general, the source fluid composition is mixed approximately for 1 minute to 20 minutes (preferably, for 1 minute to 5 minutes).

The concentration of the source fluid composition (solid-content concentration) mixed at a high shear rate as such is appropriately adjusted in response to the shape (thickness or particle size) of the targeted metal oxide nanoporous material, the viscosity suitable for the method of application or of powdering, and the like. Generally, the solid-content concentration is adjusted to approximately 5% by mass to 50% by mass, and preferably to approximately 10% by mass to 15% by mass.

In addition, a deaeration may be performed in the present invention, by stirring gently (for example at 20 rpm to 100 rpm) the obtained coating composition approximately for 1 minute to 2 minutes for the purpose of sufficiently removing the bubbles entrained in the obtained coating composition.

In the coating composition of the present invention, obtained by the method explained thus far, components in the above-mentioned source fluid composition are dispersed in an extremely homogeneous manner. A heat treatment on such a source fluid composition, while not substantially allowing coprecipitation to occur, produces the above-described metal oxide nanoporous material of the present invention. A coating of a metal oxide with a high adhesion to the various base materials such as a honeycomb filter and an excellent heat resistance can be formed on the base material. Additionally, the coating formed on the base material can be made a thin film. As a result, the present invention makes it possible to form a homogeneous coating of metal oxide nanoporous material with an excellent heat resistance and a high-level adhesion to the base material such as a metal honeycomb filter or a high-density honeycomb.

As described thus far, in the present invention, a heat treatment of the source fluid composition is required, while not substantially allowing coprecipitation to occur. Here, "not substantially allowing coprecipitation to occur" signifies that a metal element in the source fluid composition is solidified to be a metal oxide by heat treatment, substantially not having become a hydroxide in its course. More specifically, the expression signifies a case where the ratio of hydroxides in the metal component in the source fluid composition is equal to or less than 50 at % (or more preferably, equal to or less than 30 at %) before the heat treatment.

In the manufacturing method of the metal oxide nanoporous material, the targeted metal oxide is obtained by mixing the above-described source fluid composition at such a high shear rate as described above, followed by heat treatment without substantially allowing coprecipitation to occur. In a case where a metal salt solution is used as the source fluid composition, the above-described metal oxide nanoporous material of the present invention can be obtained by oxidizing the metal component in the source fluid composition to be a metal oxide through the heat treatment.

In the present invention, the heat treatment carried out after the above-described mixing of the above-mentioned source fluid composition is preferably rapid. There is no limitation, in particular, on the specific method of such a heat treatment, but the method preferably employed is drying rapidly the above-mentioned source fluid composition after the above-described mixing thereof, followed by calcination when necessary.

In the present invention, a shorter period of time is desirable from the point where the above-described mixing of the source fluid composition at the above-described high shear rate is completed to the point where the above-mentioned heat treatment begins. Preferably, it is approximately within 60 minutes, or more preferably, it is approximately within 30 minutes. When it takes more than the above-mentioned upper limit of time, it is difficult to obtain a metal oxide nanoporous material with a sufficiently improved adhesion and a sufficiently improved heat resistance. This is because, in such a case, the effect of the stirring at a high shear rate deteriorates, and because the metal oxide is agglomerated before and during the heat treatment.

In addition, the calcination step to be described later may serve also as the drying step, but the calcination of the source fluid composition is preferably preceded by a process of removing the solvent and a rapid drying process. Preferable drying conditions at the time are that the drying is done at a temperature of 60° C. to 180° C. (especially preferable is a temperature at 100° C. to 150° C.) within 10 minutes (especially preferable is within 5 minutes). A drying temperature below the above-mentioned lower limit tends to make it difficult to attain the sufficient rapid drying. In contrast, a drying temperature over the above-mentioned upper limit makes the drying rate in the early phase of the drying too rapid, and the moisture vaporizes more rapidly than the film is formed. This causes fractures or cracks, and results in significant deterioration in adhesion that tends to occur. Furthermore, a drying time longer than the above-mentioned upper limit lowers the effect of the stirring at a high shear rate, and the metal oxide is agglomerated during the drying step. This tends to make it difficult to obtain a metal oxide nanoporous material with its adhesion and its heat resistance being sufficiently improved. Note that the source fluid composition is dried until its moisture content is 200% by mass or lower (especially preferable, 100% by mass or lower) in the rapid drying step.

Moreover, preferable calcining conditions are that calcination is performed in oxidizing atmosphere (for example, in the air) at a temperature of 250° C. to 600° C. (especially preferable, at a temperature of 350° C. to 500° C.) for 20 minutes to 70 minutes (especially preferable, for 30 minutes to 60 minutes). A calcining temperature below the above-mentioned lower limit causes the calcination to be insufficiently attained. This tends to make it difficult to obtain a metal oxide nanoporous material with its adhesion and its heat resistance being sufficiently improved. In contrast, a calcining temperature over the above-mentioned upper limit tends to bring about a lowered performance of sintering due to the high temperature and to the oxidizing atmosphere. Furthermore, a calcining time shorter than the above-mentioned lower limit causes the calcination be insufficiently attained. This tends to make it difficult to obtain a metal oxide nanoporous material with its adhesion and its heat resistance being sufficiently improved. In contrast, a longer calcining time over the above-mentioned upper limit lowers the effect of the stirring at a high shear rate, and the metal oxide is agglomerated during the calcining step. This tends to make it difficult to obtain a metal oxide nanoporous material with its adhesion and its heat resistance being sufficiently improved.

Note that the metal oxide nanoporous material of the present invention in a thin film or in powder can be obtained preferably by the manufacturing method of the present invention.

In a case of obtaining a thin-film metal oxide nanoporous material, the preferable method to be employed is a method in which the above-mentioned source fluid composition is mixed at the above-mentioned high shear rate without substantially allowing coprecipitation to occur, followed by being applied onto a base material, and then by being subjected to a heat treatment.

There is no limitation, in particular, on the base material to be used here, and the base material is selected appropriately, for example, in response to the usage of the metal oxide nanoporous material to be obtained. In a case where the metal oxide nanoporous material to be obtained is used as a catalyst and the like for purification of exhaust gas, examples of preferable base materials to be employed are a monolith support base material (such as a honeycomb filter and a high-density honeycomb), a foam-filter base material, a pellet base material, and a plate base material. In addition, there is no limitation either, in particular, on what the base material is made of. In a case where the metal oxide nanoporous material to be obtained is used as a catalyst and the like for purification of exhaust gas, examples of preferable base materials to be employed are a base material made of such ceramics as cordierite, silicon carbide and mullite, and a base material made of such a metal as a stainless steel containing chromium and aluminum. Note that, in a case of employing a metal base material, a pretreatment by heat at 300° C. to 1000° C. for 1 hour to 10 hours, approximately, to form an oxide layer on the surface of the metal base material is preferable, because such a treatment tends to further improve the adhesion.

In the manufacturing method of the metal oxide nanoporous material of the present invention, there is no limitation, in particular, on the amount of the source fluid composition applied onto the base material, and the amount is adjusted appropriately, for example, in response to the usage of the metal oxide nanoporous material to be obtained. Nevertheless, what is preferable is an approximately 10 g to 300 g metal oxide forming the thin film per liter of volume of the base material.

In addition, there is no limitation, in particular, on the specific method of applying the above-mentioned source fluid composition to the base material. Examples of preferable methods to be employed are a method in which the base material is dipped in the above-mentioned source fluid composition, and a method in which a coating of the source fluid composition is formed on the surface of the base material by, for example, spraying.

The step of applying the above-mentioned source fluid composition onto the base material may be repeated until the supported amount reaches a desired amount. In this case, preliminary calcination is preferably carried out, after the above-mentioned source fluid composition is applied onto the base material, and is dried. Especially preferable conditions for the preliminary calcination at the time are that the base material with the above-mentioned source fluid composition being applied and dried is calcined preliminarily in an oxidizing atmosphere (such as in the air) at a temperature of 250° C. to 300° C. for 30 minutes to 60 minutes.

Alternatively, in a case of obtaining a metal oxide nanoporous material in powder, the preferable method to be employed is a method in which the above-mentioned source fluid composition is mixed at the above-mentioned high shear rate without substantially allowing coprecipitation to occur, followed by a heat treatment and a powdering process. There is no limitation, in particular, on the method of powdering the above-mentioned source fluid composition. Nevertheless, a preferable method to be used is a method in which powder of the metal oxide nanoporous material is obtained by drying, and calcining when necessary, the above-mentioned coating composition, followed by grinding.

Moreover, in the manufacturing method of the metal oxide nanoporous material of the present invention, the above-mentioned noble metal may be made to be supported on the surface of the metal oxide nanoporous material obtained in the way described above. There is no limitation, in particular, on the concrete method of making the noble metal to be supported. Nevertheless, an example of the preferable method to be used is the following method. The above-mentioned powder is soaked in a solution of a salt (for example, nitrate, chloride, and acetate) of a noble metal or a noble-metal complex dissolved in such a solvent as water and alcohol. Thereafter, the solvent is removed, followed by calcining and grinding. Note that preferable drying conditions at the time of removing the solvent in the above-mentioned step of making a noble metal to be supported are, approximately, at a temperature of 30° C. to 150° C. and for a time within 10 minutes. In addition, preferable calcining conditions are in an oxidizing atmosphere (for example, in the air), approximately at a temperature of 250° C. to 300° C. and for a time within 30 minutes to 60 minutes. Furthermore, such a step of making the noble metal to be supported may be repeated until the supported amount reaches the desired supported amount.

By such a manufacturing method of the present invention as explained above, the above-described metal oxide nanoporous material of the present invention can be obtained. Use of the metal oxide nanoporous material of the present invention makes it possible to form a coating of metal oxide with an excellent heat resistance and with a high adhesion to various base materials such as a honeycomb filter. In addition, the coating formed on the base material can be made a thin film as well. For this reason, the present invention makes it possible to form a coating of metal oxide nanoporous material with an excellent heat resistance and with a high-level adhesion to base materials, such as a metal honeycomb filter and a high-density honeycomb, the coating being homogeneously formed on such a base material.

Note that, in a case where the metal oxide nanoporous material of the present invention is in a thin film, a coating of the metal oxide nanoporous material can be formed directly on various base materials. In contrast, in a case where the metal oxide nanoporous material of the present invention is in powder, the following method can be employed for the purpose of forming a coating of metal oxide nanoporous material on various base materials.

Specifically, first, slurry is obtained by mixing the powder of the metal oxide nanoporous material of the present invention together with a solvent at a shear rate of 1000 sec$^{-1}$ or faster, or preferably at a shear rate of 10000 sec$^{-1}$ or faster. A shear rate below 1000 sec$^{-1}$ tends to cause insufficient improvements in adhesion and in heat resistance of the coating to be obtained of the metal oxide nanoporous material. Note that there is no limitation, in particular, on the apparatus used here as long as it is capable of mixing at such a high shear rate, but a homogenizer is preferably used. In addition, there is no limitation, in particular, on the mixing time at such a high shear rate, but the mixing takes generally approximately 1 minute to 20 minutes, and preferably 1 minute to 5 minutes, approximately.

In addition, in this step of preparing slurry, it is preferable to mix the above-described second-metal-oxide powder as a powder carrier with a mean particle size of 0.01 μm to 50 μm, and a solution of a second metal salt or a colloid of a third metal oxide as a binder, together with the powder of the metal oxide nanoporous material of the present invention and the above-mentioned solvent.

An example of such a second metal salt solution as a binder is a solution in which a salt (sulfate, nitrate, hydrochloride, acetate or the like) of aluminum, zirconium, cerium, titanium, silicon or the like is dissolved in a solvent such as water and alcohol. In addition, an example of a colloid of the third metal oxide is a colloid of alumina, zirconia, ceria, titania, silica or the like. Moreover, there is no limitation, in particular, on the amount of the binder component added. However, a solid content in the binder component added is preferably equal to 1% by mass to 30% by mass, approximately, of the metal oxide forming the coating to be obtained.

The concentration of the mixture (solid-content concentration) mixed at a high shear rate in such a step of preparing slurry is adjusted appropriately in response to, for example, the targeted thickness of the coating and the viscosity suitable for the application method. Nevertheless, in general, the solid-content concentration is equal to 20% by mass to 60% by mass, approximately. In addition, there is no limitation, in particular, on the solvent to adjust the concentration of the mixture. Water, alcohol or the like can be used, but water is preferable.

A deaeration process may additionally be carried out by stirring gently (for example at 20 rpm to 100 rpm) the obtained slurry for 1 minute to 2 minutes, approximately. The purpose is to remove sufficiently the bubbles entrained in the obtained slurry. Subsequently, a coated material is obtained by heat treatment on the slurry having been applied to the base material. There is no limitation, in particular, on the base material used here, and the base material is selected appropriately, for example, in response to the usage of the obtained coated material.

In addition, there is no limitation, in particular, on the amount of slurry applied to the base material, and the amount of applied slurry is adjusted appropriately, for example, in response to the usage of the obtained coated material. Nevertheless, what is preferable is an approximately 10 g to 300 g metal oxide forming the coating per liter of volume of the base material. Moreover, there is no limitation, in particular, on the concrete method of applying the above-mentioned slurry to the base material. Examples of preferable methods to be employed are a method in which the base material is soaked in the slurry, and a method in which the slurry is coated on the surface of the base material by, for example, spraying. Note that the step of heat treatment on the slurry applied on the base material may be similar to the above-described step of heat treatment on the source fluid composition. In this step also, a shorter period of time is desirable from the point where the slurry has been obtained to the point where the heat treatment begins on the slurry which has been applied to the base material. A period of time approximately of 60 minutes or shorter is preferable, and a period approximately of time of 30 minutes or shorter is more preferable.

Note that there is no limitation, in particular, on the thickness of the metal oxide coating formed by using the metal oxide nanoporous material of the present invention, and the thickness is adjusted appropriately in response to, for example, its usage. Nevertheless, in the present invention, even in a case where the coating is made to be thin, a homogeneous coating can be formed, with excellent adhesion, on various base materials such as a metal honeycomb filter. For this reason, a preferable thickness of coating is 1 μm to 300 μm, approximately. A more preferable thickness is 1 μm to 150 μm, approximately, and an especially preferable thickness is 1 μm to 50 μm, approximately. In addition, as has just been mentioned, the present invention makes it possible to make a thin-film coating of metal oxide nanoporous material. As a result, a coating can be formed, with a high-level adhesion and with an excellent heat resistance, on a high-density honeycomb, on which it is difficult to form a sufficient coating, conventionally. From this view point, an especially preferable thickness of the coating is 1 μm to 30 μm, approximately.

Moreover, a noble metal may be made to be supported on the surface of the coated material thus obtained, and the step for this purpose is similar to the above-described step of making a noble metal to be supported on the surface of the metal oxide nanoporous material. Note that, in a case where a noble metal is supported in advance by the above-mentioned metal oxide nanoporous material, the noble metal used in this step may be either the same as the one supported by the nanoporous material, or a different one. In addition, this step may be repeated until the supported amount of the noble metal reaches the desired amount.

EXAMPLES

The present invention will be explained below more specifically using examples and comparative examples, but the present invention is not limited to the following examples.

Note that T. K. ROBOMICS® (Tokushu Kika Kogyo Co., Ltd.), with its mixing section being T.K. HOMO MIXER MARK II Model 2.5, was used as the homogenizer.

In addition, the following were used as alumina ($Al_2O_3$) colloid, titania ($TiO_2$) colloid, Al solution, Zr solution, Ce solution, and Rh solution:

$Al_2O_3$ colloid: mean particle size 5 nm to 20 nm, acicular particle, nitrate water solution (solid-content concentration: 25% by mass);

$TiO_2$ colloid: mean particle size 10 nm to 11 nm, pH 3 water solution (solid-content concentration: 15.2% by mass);

Al solution: aluminum nitrate water solution (solid-content concentration: 5.44% by mass);

Zr solution: zirconium oxynitrate water solution (solid-content concentration: 18% by mass);

Ce solution: cerium nitrate water solution (solid-content concentration: 28% by mass);

Rh solution: rhodium nitrate water solution (solid-content concentration: 3% by mass).

Note that the "solid-content concentration" here signifies the mass ratio (%) of each metal oxide to the corresponding solution. Each metal oxide is produced by vaporizing the solvent from the corresponding solution, and then drying and calcining the resultant product.

Moreover, as the source materials (salts as source materials) of lanthana ($La_2O_3$), yttria ($Y_2O_3$), potassium oxide ($K_2O$), barium oxide (BaO) and iron oxide (FeO) lanthanum nitrate, yttrium nitrate, potassium acetate, barium acetate and iron nitrate were used, respectively. A required amount of each salt as a source material was obtained, and then dissolved in ion exchanged water to be a solution (La solution, Y solution, K solution, Ba solution, and Fe solution). Each of the solutions was used, with no special adjustment of its solid-content concentration, as a solution containing the required amount of the corresponding salt as source material.

Furthermore, as the base material for evaluating the component homogeneity, the surface profile, the adhesion, and the heat resistance, a metal plate of stainless steel containing chromium and aluminum (Fe-20Cr-5Al, 50 mm×50 mm×0.3 mm) was used. Note that, on the surface of the metal plate, a coating of oxide layer was formed by preceding heat treatment at 1000° C. for an hour. As the base material for evaluating the cross-sectional aspect, a 400-mesh honeycomb cordierite base material and a 1500-mesh honeycomb cordierite base material were used. As the base material for evaluating activity maintenance in reforming, a high-density honeycomb of 1200 cell/$inch^2$ made of metal (Fe-20Cr-5Al) was used.

Examples and Comparative Examples Using Colloidal Solution (1)

Example 1

A colloidal solution with a solid-content concentration of 12% by mass was prepared by diluting, with methanol, the mixture of $Al_2O_3$ colloid, Zr solution and Ce solution. These were mixed so that a mass ratio of $Al_2O_3$:$ZrO_2$:$CeO_2$=35:30:35 would be attained in the metal oxide thin film to be obtained. Subsequently, the obtained colloidal solution was mixed with the homogenizer at a shear rate of 20000 $sec^{-1}$ for 2 minutes, followed by removing entrained bubbles at a gently stirring rate (20 rpm) for approximately a minute to obtain a coating composition.

Subsequently, each of the above-mentioned base materials was immediately dipped in the coating composition obtained as mentioned above for 1 second to 10 seconds. The base materials were taken out, and then the excess coating composition was removed from the surface of each of the base materials with gravity and by shaking. The base materials were placed horizontally, and then dried gently at room temperature for 5 minutes to 10 minutes. Another drying process followed, using hot air (at 60° C. to 100° C.) which blew at 2 m/s to 5 m/s for 5 minutes to 10 minutes. Furthermore, a preliminary calcination was carried out in the air atmosphere at 250° C. for approximately 30 minutes, followed by a cooling process with a room-temperature wind blowing at 2 m/s to 5 m/s for 5 minutes to 10 minutes. These processes, being repeated twice and being followed by a subsequent calcination in the air atmosphere at 500° C. for approximately 60 minutes, produced base materials supporting a thin-film metal oxide (a coated material).

An observation of the metal oxide coating in the obtained coated material by use of a transmission electron microscope (TEM) indicated that the thickness of the coating layer was approximately 4 μm, and that a very homogeneous metal oxide thin film was formed.

Comparative Example 1

Base materials supporting metal oxide thin film were obtained in a similar way to Example 1 except that a gentle stirring (at a shear rate of 10 $sec^{-1}$ or slower) by a propeller replaced the mixing by the homogenizer.

Comparative Example 2

Base materials supporting metal oxide thin film were obtained in a similar way to Example 1 except that the $Al_2O_3$ colloid alone was used with no Zr solution or Ce solution, and that a gentle stirring (at a shear rate of 10 $sec^{-1}$ or slower) by a propeller replaced the mixing by the homogenizer.

Example 2

Moisture was removed by heating the $Al_2O_3$ colloid up to 150° C., and the nitrate composition was removed by further heating the $Al_2O_3$ colloid up to 500° C. The resultant product was ground using a mortar. Thus obtained was $Al_2O_3$ in powder of mean particle size of approximately 150 μm. Subsequently, the obtained $Al_2O_3$ powder was soaked in the Rh solution for an hour, and was subjected to a suction filtration by a filtration filter, and then the residue of filtration was collected. The $Al_2O_3$ powder as the residue was calcined in the air atmosphere at 300° C. for approximately 60 minutes, and then was ground using a mortar to cause the mean particle size to be approximately 70 μm. Thereafter, $Al_2O_3$ powder (the amount of supported noble metal: 3% by mass) was obtained with its mean particle size being adjusted, using an attriter (by wet-milling), to 1 μm or smaller.

A colloidal solution with a solid-content concentration of 12% by mass was prepared by diluting, with methanol, the mixture of $Al_2O_3$ powder obtained as above, Zr solution and Ce solution. These were mixed so that a mass ratio of $Al_2O_3$:$ZrO_2$:$CeO_2$=35:30:35 would be attained in the coating to be obtained. Subsequently, the obtained colloidal solution was mixed by use of the homogenizer at a shear rate of 20000 $sec^{-1}$ for 2 minutes, followed by removing entrained bubbles at a gently stirring rate (20 rpm) for approximately a minute to obtain a coating composition.

Subsequently, metal plates with an oxide layer formed on the surface of each of the plates by a preceding heat treatment at 1000° C. for an hour were immediately dipped in the coating composition obtained as mentioned above for 1 second to 10 seconds. The metal plates were taken out, and then the excess coating composition was removed from the surface of each of the metal plates with gravity and by shaking. The plates were placed horizontally, and then dried gently at room temperature for 5 minutes to 10 minutes. Another drying process followed, using hot air (at 60° C. to 100° C.) which blew at 2 m/s to 5 m/s for 5 minutes to 10 minutes. Furthermore, a preliminary calcination was carried out in the air atmosphere at 250° C. for approximately 30 minutes, followed by a cooling process with a room-temperature wind blowing at 2 m/s to 5 m/s for 5 minutes to 10 minutes. These processes, being repeated twice and being followed by a subsequent calcination in the air atmosphere at 500° C. for approximately 60 minutes, produced test plates each of which was a coated material with a coating metal oxide of approximately 0.2 g.

An observation of the metal oxide coating in the obtained coated material by use of a transmission electron microscope (TEM) indicated that the thickness of the coating layer was approximately 4 µm, and that a very homogeneous metal oxide coating layer was formed.

Example 3

A colloidal solution with a solid-content concentration of 12% by mass was prepared by diluting, with methanol, the mixture of $Al_2O_3$ colloid, Zr solution and Ce solution. These were mixed so that a mass ratio of $Al_2O_3$:$ZrO_2$:$CeO_2$=35:30:35 would be attained in the coating to be obtained. Subsequently, the obtained colloidal solution was mixed with the homogenizer at a shear rate of 20000 $sec^{-1}$ for 2 minutes, followed by removing entrained bubbles at a gently stirring rate (20 rpm) for approximately a minute to obtain a coating composition.

Subsequently, moisture was removed by heating the obtained coating composition up to 150° C., and the nitrate composition was removed by further heating the coating composition up to 250° C. The resultant product was ground using a mortar. Thus obtained was powder of mean particle size of approximately 70 µm. Subsequently, the obtained powder was soaked in the Rh solution for an hour, and was subjected to a suction filtration by a filtration filter, and then the residue of filtration was collected. The powder as the residue was calcined in the air atmosphere at 300° C. for approximately 60 minutes, and then was ground using a mortar to cause the mean particle size to be approximately 70 µm (the amount of supported noble metal: 3% by mass).

Subsequently, a mixture with a solid-content concentration of 50% by mass was prepared by mixing 100 g of the obtained power, 100 g of alumina powder (mean particle size: 50 µm) as a powder carrier, and 100 g of alumina colloid (mean particle size: 5 nm to 20 nm; solid-content concentration: 25% by mass) as a binder and 150 g of water. The obtained mixture was mixed by the homogenizer at a shear rate of 20000 $sec^{-1}$ for 2 minutes, and then was subjected to an attriter (wet-milling) to adjust its particle to be 1 µm or smaller. Furthermore, the obtained mixture was mixed by the homogenizer at a shear rate of 20000 $sec^{-1}$ for 2 minutes, followed by a gentle stirring (at a rate of 20 rpm) for approximately a minute to remove entrained bubbles. Thus, slurry was obtained.

Subsequently, metal plates with an oxide layer formed on the surface of each of the plates by a preceding heat treatment at 1000° C. for an hour were immediately dipped in the slurry obtained as mentioned above for a second. The metal plates were taken out, and then the excess slurry was removed from the surface of each of the metal plates with gravity and by shaking. The plates were placed horizontally, and then dried gently at room temperature for 5 minutes to 10 minutes. Another drying process followed, using hot air (at 60° C. to 100° C.) which blew at 2 m/s to 5 m/s for 5 minutes to 10 minutes. Furthermore, a preliminary calcination was carried out in the air atmosphere at 250° C. for approximately 30 minutes, followed by a cooling process with a room-temperature wind blowing at 2 m/s to 5 m/s for 5 minutes to 10 minutes. These processes, being repeated twice and being followed by a subsequent calcination in the air atmosphere at 500° C. for approximately 60 minutes, produced test plates each of which was a coated material with a coating metal oxide of approximately 0.5 g.

An observation of the metal oxide coating in the obtained coated material by use of a transmission electron microscope (TEM) indicated that the thickness of the coating layer was approximately 10 µm, and that a very homogeneous metal oxide coating layer was formed.

Comparative Example 3

Coated materials were obtained in a similar way to Example 3 except that a gentle stirring (at a shear rate of 10 $sec^{-1}$ or slower) by a propeller replaced the mixing by the homogenizer.

Examples and Comparative Examples Using Metal Salt Solution (1)

Example 4

A metal salt solution with a solid-content concentration of 10% by mass was prepared by mixing 55.2 g of Al solution, 16.7 g of Zr solution, and 14.3 g of Ce solution with 13.9 g of methanol. These were mixed so that a mass ratio of $Al_2O_3$:$ZrO_2$:$CeO_2$=30:30:40 would be attained in the coating to be obtained. Subsequently, the obtained metal salt solution was mixed by use of the homogenizer at a shear rate of 20000 $sec^{-1}$ for 2 minutes, followed by a gentle stirring (at a rate of 20 rpm) for approximately a minute to remove entrained bubbles. Thus, a coating composition was obtained.

Subsequently, the obtained coating composition was applied to a high-temperature plate heated up to 300° C. to 350° C. to be dried (to remove the solvent) and to be calcined (to remove nitrate composition and to oxidize metal composition) for 30 minutes. A grinding using a mortar followed, and thus a metal oxide powder with a mean particle size of approximately 70 µm was obtained.

Comparative Example 4

A metal oxide powder was obtained in a similar way to Example 4 except that a gentle stirring (at a shear rate of 10 $sec^{-1}$ or slower) of the above-mentioned metal-salt solution by a propeller replaced the mixing by the homogenizer.

Example 5

A composite metal oxide powder was obtained in a similar way to Example 4 except that the above-mentioned coating composition is dried and calcined in the air atmosphere at 500° C. for 3 hours to 4 hours.

Comparative Example 5

A composite metal oxide powder was obtained in a similar way to Example 5 except that a gentle stirring (at a shear rate of 10 sec$^{-1}$ or slower) of the above-mentioned metal salt solution by a propeller replaced the mixing by the homogenizer.

Example 6

A metal salt solution with a solid-content concentration of 10% by mass was prepared by mixing 55.2 g of Al solution, 16.7 g of Zr solution, and 14.3 g of Ce solution with 13.9 g of methanol. These were mixed so that a mass ratio of $Al_2O_3$:$ZrO_2$:$CeO_2$=30:30:40 would be attained in the coating to be obtained. Subsequently, the obtained metal salt solution was mixed by use of the homogenizer at a shear rate of 20000 sec$^{-1}$ for 2 minutes, followed by a gentle stirring (at a rate of 20 rpm) for approximately a minute to remove entrained bubbles. Thus, a coating composition was obtained.

Subsequently, metal plates with an oxide layer formed on the surface of each of the plates by a preceding heat treatment at 1000° C. for an hour were immediately dipped in the coating composition obtained as mentioned above for 1 second to 10 seconds. The metal plates were taken out, and then the excess coating composition was removed from the surface of each of the metal plates with gravity and by shaking. The plates were placed horizontally, and then dried gently at room temperature for 5 minutes to 10 minutes. Another drying process followed, using hot air (at 60° C. to 100° C.) which blew at 2 m/s to 5 m/s for 5 minutes to 10 minutes. Furthermore, a preliminary calcination was carried out in the air atmosphere at 250° C. for approximately 30 minutes, followed by a cooling process with a room-temperature wind blowing at 2 m/s to 5 m/s for 5 minutes to 10 minutes. These processes, being repeated twice and being followed by a subsequent calcination in the air atmosphere at 500° C. for approximately 60 minutes, produced test plates each of which was a coated material with a coating metal oxide of approximately 0.2 g.

An observation of the metal oxide coating in the obtained coated material by use of a transmission electron microscope (TEM) indicated that the thickness of the coating layer was approximately 4 μm, and that a very homogeneous metal oxide thin film was formed.

Subsequently, the obtained coated materials were dipped in the Rh solution for an hour. The coated materials were taken out, and then the excess solution was removed from the surface of each of the coated materials with gravity and by shaking. The plates were placed horizontally, and then dried gently at room temperature for 5 minutes to 10 minutes. Another drying process followed, using hot air (at 60° C. to 100° C.) which blew at 2 m/s to 5 m/s for 5 minutes to 10 minutes. Furthermore, a calcination was carried out in the air atmosphere at 300° C. for approximately 60 minutes, followed by a cooling process with a room-temperature wind blowing at 2 m/s to 5 m/s for 5 minutes to 10 minutes. These processes, being repeated three times, produced coated materials each of which had a supported noble metal of 0.1 g.

Comparative Example 6

Coated materials were obtained in a similar way to Example 6 except that a gentle stirring (at a shear rate of 10 sec$^{-1}$ or slower) by a propeller replaced the mixing by the homogenizer.

Example 7

Al solution of 55.2 g was applied to a high-temperature plate heated up to 300° C. to 350° C. to be dried (to remove the solvent) and to be calcined (to remove nitrate composition and to oxidize metal composition) for 30 minutes. A grinding using a mortar followed, and thus $Al_2O_3$ powder with a mean particle size of approximately 150 μm was obtained. Subsequently, the obtained $Al_2O_3$ powder was soaked in the Rh solution for an hour, and was subjected to a suction filtration by a filtration filter, and then the residue of filtration was collected. The $Al_2O_3$ power as the residue was calcined in the air atmosphere at 300° C. for approximately 60 minutes, and then was ground using a mortar to cause the mean particle size to be approximately 70 μm. Thereafter, $Al_2O_3$ power (the amount of supported noble metal: 3% by mass) was obtained with its mean particle size being adjusted, using an attriter (by wet-milling), to 1 μm or smaller.

A metal salt solution with a solid-content concentration of 10% by mass was prepared by mixing $Al_2O_3$ powder obtained as mentioned above, 16.7 g of Zr solution, and 14.3 g of Ce solution with 13.9 g of methanol. These were mixed so that a mass ratio of $Al_2O_3$:$ZrO_2$:$CeO_2$=30:30:40 would be attained in the coating to be obtained. Subsequently, the obtained metal salt solution was mixed by use of the homogenizer at a shear rate of 20000 sec$^{-1}$ for 2 minutes, followed by a gentle stirring (at a rate of 20 rpm) for approximately a minute to remove entrained bubbles. Thus, a coating composition was obtained.

Subsequently, metal plates with an oxide layer formed on the surface of each of the plates by a preceding heat treatment at 1000° C. for an hour were immediately dipped in the coating composition obtained as mentioned above for 1 second to 10 seconds. The metal plates were taken out, and then the excess coating composition was removed from the surface of each of the metal plates with gravity and by shaking. The plates were placed horizontally, and then dried gently at room temperature for 5 minutes to 10 minutes. Another drying process followed, using hot air (at 60° C. to 100° C.) which blew at 2 m/s to 5 m/s for 5 minutes to 10 minutes. Furthermore, a preliminary calcination was carried out in the air atmosphere at 250° C. for approximately 30 minutes, followed by a cooling process with a room-temperature wind blowing at 2 m/s to 5 m/s for 5 minutes to 10 minutes. These processes, being repeated twice and being followed by a subsequent calcination in the air atmosphere at 500° C. for approximately 60 minutes, produced test plates each of which was a coated material with a coating metal oxide of approximately 0.2 g.

An observation of the metal oxide coating in the obtained coated material by use of a transmission electron microscope (TEM) indicated that the thickness of the coating layer was approximately 4 μm and that a very homogeneous metal oxide coating layer was formed.

Example 8

A metal salt solution with a solid-content concentration of 10% by mass was prepared by mixing 55.2 g of Al solution, 16.7 g of Zr solution, and 14.3 g of Ce solution with 13.9 g of methanol. These were mixed so that a mass ratio of $Al_2O_3$:$ZrO_2$:$CeO_2$=30:30:40 would be attained in the coating to be obtained. Subsequently, the obtained metal salt solution was mixed by use of the homogenizer at a shear rate of 20000 sec$^{-1}$ for 2 minutes, followed by a gentle stirring (at a rate of 20 rpm) for approximately a minute to remove entrained bubbles. Thus, a coating composition was obtained.

Subsequently, the obtained coating composition was applied to a high-temperature plate heated up to 300° C. to 350° C. to be dried (to remove the solvent) and to be calcined (to remove nitrate composition and to oxidize metal composition) for 30 minutes. A grinding using a mortar followed, and thus a composite metal oxide powder with a mean particle size of approximately 70 μm was obtained.

Subsequently, the obtained composite metal oxide powder was soaked in the Rh solution for an hour, and was subjected to a suction filtration by a filtration filter, and then the residue of filtration was collected. The powder as the residue was calcined in the air atmosphere at 300° C. for approximately 60 minutes, and then was ground using a mortar so that a noble metal supporting powder (the amount of supported noble metal: 3% by mass) of a mean particle size of approximately 70 μm was obtained.

Subsequently, a mixture with a solid-content concentration of 50% by mass was prepared by mixing 100 g of the obtained noble metal supporting power, 100 g of alumina powder (mean particle size: 50 μm) as a powder carrier, 100 g of alumina colloid (mean particle size: 5 nm to 20 nm; solid-content concentration: 25% by mass) as a binder and 150 g of water. The obtained mixture was mixed by the homogenizer at a shear rate of 20000 sec$^{-1}$ for 2 minutes, and then was subjected to an attriter (wet-milling) to adjust its particle to be 1 μm or smaller. Furthermore, the obtained mixture was mixed by the homogenizer at a shear rate of 20000 sec$^{-1}$ for 2 minutes, followed by a gentle stirring (at a rate of 20 rpm) for approximately a minute to remove entrained bubbles. Thus, slurry was obtained.

Subsequently, metal plates with an oxide layer formed on the surface of each of the plates by a preceding heat treatment at 1000° C. for an hour were immediately dipped in the slurry obtained as mentioned above for a second. The metal plates were taken out, and then the excess slurry was removed from the surface of each of the metal plates with gravity and by shaking. The plates were placed horizontally, and then dried gently at room temperature for 5 minutes to 10 minutes. Another drying process followed, using hot air (at 60° C. to 100° C.) which blew at 2 m/s to 5 m/s for 5 minutes to 10 minutes. Furthermore, a preliminary calcination was carried out in the air atmosphere at 250° C. for approximately 30 minutes, followed by a cooling process with a room-temperature wind blowing at 2 m/s to 5 m/s for 5 minutes to 10 minutes. These processes, being repeated twice and being followed by a subsequent calcination in the air atmosphere at 500° C. for approximately 60 minutes, produced test plates each of which was a coated material with a coating metal oxide of approximately 0.5 g.

An observation of the metal oxide coating in the obtained coated material by use of a transmission electron microscope (TEM) indicated that the thickness of the coating layer was approximately 10 μm, and that a very homogeneous metal oxide coating layer was formed.

Comparative Example 7

A composite metal oxide powder was obtained in a similar way to Example 8 except that a gentle stirring (at a shear rate of 10 sec$^{-1}$ or slower) of the above-mentioned metal-salt solution by a propeller replaced the mixing by the homogenizer. Subsequently a coated material was obtained using the obtained composite metal oxide powder in a similar way to Example 8 except that a gentle stirring (at a shear rate of 10 sec$^{-1}$ or slower) of the above-mentioned mixture by a propeller replaced the mixing by the homogenizer.

Example 9

A composite metal oxide powder was obtained in a similar way to Example 8 except that the above-mentioned coating composition is dried and calcined in the air atmosphere at 500° C. for 3 hours to 4 hours. Subsequently, using the obtained metal oxide powder, a coated material was obtained in a similar way to Example 8.

Comparative Example 8

A composite metal oxide powder was obtained in a similar way to Example 9 except that a gentle stirring (at a shear rate of 10 sec$^{-1}$ or slower) of the above-mentioned metal-salt solution by a propeller replaced the mixing by the homogenizer. Subsequently, a coated material was obtained using the obtained composite metal oxide powder in a similar way to Example 9 except that the gentle stirring (at a shear rate of 10 sec$^{-1}$ or slower) of the above-mentioned mixture by a propeller replaced the mixing by the homogenizer.

Example 10

Only Ce solution and Zr solution were used, while not using the above-mentioned Al solution, so that a mass ratio of $ZrO_2$:$CeO_2$=75:25 would be attained in the coating to be obtained. In addition, a coated material was obtained in a similar way to Example 6 except that a step of making a noble metal (Rh) to be supported was not carried out. An observation of the metal oxide coating in the obtained coated material by use of a transmission electron microscope (TEM) indicated that the thickness of the coating layer was approximately 4 μm, and that a very homogeneous coating layer of metal oxides ($ZrO_2$ and CeO) was formed.

Example 11

A metal salt solution with a solid-content concentration of 10% by mass was prepared by mixing 55.2 g of Al solution, 16.7 g of Zr solution, and 14.3 g of Ce solution with 13.9 g of methanol. These were mixed so that a mass ratio of $Al_2O_3$:$ZrO_2$:$CeO_2$=30:30:40 would be attained in the coating to be obtained. Subsequently, the obtained metal salt solution was mixed by use of the homogenizer at a shear rate of 20000 sec$^{-1}$ for 2 minutes, followed by a gentle stirring (at a rate of 20 rpm) for approximately a minute to remove entrained bubbles. Thus, a coating composition was obtained.

Subsequently, metal plates with an oxide layer formed on the surface of each of the plates by a preceding heat treatment at 1000° C. for an hour were immediately dipped in the coating composition obtained as mentioned above for a second to 10 seconds. The metal plates were taken out, and then the excess coating composition was removed from the surface of each of the metal plates with gravity and by shaking. The plates were placed horizontally, and then dried gently at room temperature for 5 minutes to 10 minutes. Another drying process followed, using hot air (at 60° C. to 100° C.) which blew at 2 m/s to 5 m/s for 5 minutes to 10 minutes. Furthermore, a preliminary calcination was carried out in the air atmosphere at 250° C. for approximately 30 minutes, followed by a cooling process with a room-temperature wind blowing at 2 m/s to 5 m/s for 5 minutes to 10 minutes. A subsequent calcination in the air atmosphere at 500° C. for approximately 60 minutes, produced base materials (coated materials), each supporting a metal oxide thin film.

An observation of the metal oxide coating in the obtained coated material by use of a transmission electron microscope (TEM) indicated that the thickness of the coating layer was approximately 4 μm, and that a very homogeneous metal oxide thin film was formed.

Example 12

Base materials (coated materials), each supporting a metal oxide thin film, were obtained in a similar way to Example 11 except that the shear rate at the time of the mixing by homogenizer was 10000 sec$^{-1}$.

Example 13

Base materials (coated materials), each supporting a metal oxide thin film, were obtained in a similar way to Example 11 except that the shear rate at the time of the mixing by homogenizer was 4000 sec$^{-1}$.

Comparative Example 9

Base materials (coated materials), each supporting a metal oxide thin film, were obtained in a similar way to Example 11 except that a gentle stirring (at a shear rate of 10 sec$^{-1}$ or slower) by a propeller replaced the mixing by the homogenizer.

Comparative Example by Conventional Coprecipitation Method

Comparative Example 10

Base materials (coated materials), each supporting a metal oxide thin film, were obtained in a similar way to Example 1 except the following. A conventional alumina/ceria/zirconia composite oxide powder obtained by a coprecipitation method as described in Example 1 of Japanese Unexamined Patent Application Publication No. Hei 10-182155 (Document 1) was used. The above-mentioned colloidal solution was replaced with slurry with a solid-content concentration of 70% by mass. In the slurry, the conventional alumina/ceria/zirconia composite oxide powder, boehmite and aluminum nitrate were mixed so that the mass ratio of a mass ratio of $Al_2O_3:ZrO_2:CeO_2=35:30:35$ would be attained in the metal oxide thin film to be obtained. A gentle stirring (at a shear rate of 10 sec$^{-1}$ or slower) by a propeller replaced the mixing by the homogenizer, and the calcining was carried out at 700° C.

Comparative Example 11

A conventional alumina/ceria/zirconia composite oxide powder was obtained by a coprecipitation method as described in Example 1 of Japanese Unexamined Patent Application Publication No. Hei 10-182155 (Document 1).

Examples and Comparative Examples Using Colloidal Solution (2)

Example 14

Base materials (coated materials), each supporting a metal oxide thin film, were obtained in a similar way to Example 1 except that $Al_2O_3$ colloid, Zr solution and Ce solution were mixed so that a mass ratio of $Al_2O_3:ZrO_2:CeO_2=40:40:20$ would be attained in the metal oxide thin film to be obtained.

Example 15

Base materials (coated materials), each supporting a metal oxide thin film, were obtained in a similar way to Example 14 except that the shear rate at the time of the mixing by homogenizer was 10000 sec$^{-1}$.

Example 16

Base materials (coated materials), each supporting a metal oxide thin film, were obtained in a similar way to Example 14 except that the shear rate at the time of the mixing by homogenizer was 4000 sec$^{-1}$.

Comparative Example 12

Base materials (coated materials), each supporting a metal oxide thin film, were obtained in a similar way to Example 14 except that a gentle stirring (at a shear rate of 10 sec$^{-1}$ or slower) by a propeller replaced the mixing by the homogenizer.

Example 17

A colloidal solution with a solid-content concentration of 12% by mass was prepared by diluting, with methanol, the mixture of $Al_2O_3$ colloid, Zr solution and Ce solution. These were mixed so that a mass ratio of $Al_2O_3:ZrO_2:CeO_2=40:40:20$ would be attained in the metal oxide powder to be obtained. Subsequently, the obtained colloidal solution was mixed by use of the homogenizer at a shear rate of 20000 sec$^{-1}$ for 2 minutes, followed by removing entrained bubbles at a gently stirring rate (20 rpm) for approximately a minute to obtain a coating composition. Moisture was removed by heating the coating composition up to 150° C., and the nitrate composition was removed by further heating the coating composition up to 250° C. The resultant product was ground using a mortar. Thus obtained was metal oxide in powder of mean particle size of approximately 70 μm.

Comparative Example 13

A metal oxide powder was obtained in a similar way to Example 17 except that a gentle stirring (at a shear rate of 10 sec$^{-1}$ or slower) of the above-mentioned metal-salt solution by a propeller replaced the mixing by the homogenizer.

Example 18

Base materials (coated materials), each supporting a metal oxide thin film, were obtained in a similar way to Example 1 except that $Al_2O_3$ colloid, Zr solution and La solution were mixed so that a mass ratio of $Al_2O_3:ZrO_2:La_2O_3=40:40:20$ would be attained in the metal oxide thin film to be obtained.

Comparative Example 14

Base materials (coated materials), each supporting a metal oxide thin film, were obtained in a similar way to Example 18 except that a gentle stirring (at a shear rate of 10 sec$^{-1}$ or slower) by a propeller replaced the mixing by the homogenizer.

Example 19

Base materials (coated materials), each supporting a metal oxide thin film, were obtained in a similar way to Example 1 except that $Al_2O_3$ colloid, Zr solution and Y solution were mixed so that a mass ratio of $Al_2O_3:ZrO_2:Y_2O_3=40:40:20$ would be attained in the metal oxide thin film to be obtained.

Comparative Example 15

Base materials (coated materials), each supporting a metal oxide thin film, were obtained in a similar way to Example 19 except that a gentle stirring (at a shear rate of 10 sec$^{-1}$ or slower) by a propeller replaced the mixing by the homogenizer.

Example 20

Base materials (coated materials), each supporting a metal oxide thin film, were obtained in a similar way to Example 1 except that $Al_2O_3$ colloid and K solution were mixed so that a mass ratio of $Al_2O_3:K_2O$=60:40 would be attained in the metal oxide thin film to be obtained.

Comparative Example 16

Base materials (coated materials), each supporting a metal oxide thin film, were obtained in a similar way to Example 20 except that a gentle stirring (at a shear rate of 10 sec$^{-1}$ or slower) by a propeller replaced the mixing by the homogenizer.

Example 21

Base materials (coated materials), each supporting a metal oxide thin film, were obtained in a similar way to Example 1 except that $Al_2O_3$ colloid and Ba solution were mixed so that a mass ratio of $Al_2O_3:BaO$=60:40 would be attained in the metal oxide thin film to be obtained.

Comparative Example 17

Base materials (coated materials), each supporting a metal oxide thin film, were obtained in a similar way to Example 21 except that a gentle stirring (at a shear rate of 10 sec$^{-1}$ or slower) by a propeller replaced the mixing by the homogenizer.

Example 22

Base materials (coated materials), each supporting a metal oxide thin film, were obtained in a similar way to Example 1 except that $Al_2O_3$ colloid, Zr solution and $TiO_2$ colloid were mixed so that a mass ratio of $Al_2O_3:ZrO_2:TiO_2$=40:40:20 would be attained in the metal oxide thin film to be obtained.

Comparative Example 18

Base materials (coated materials), each supporting a metal oxide thin film, were obtained in a similar way to Example 22 except that a gentle stirring (at a shear rate of 10 sec$^{-1}$ or slower) by a propeller replaced the mixing by the homogenizer.

Example 23

Base materials (coated materials), each supporting a metal oxide thin film, were obtained in a similar way to Example 1 except that $Al_2O_3$ colloid and Fe solution were mixed so that a mass ratio of $Al_2O_3:FeO$=60:40 would be attained in the metal oxide thin film to be obtained.

Comparative Example 19

Base materials (coated materials), each supporting a metal oxide thin film, were obtained in a similar way to Example 23 except that a gentle stirring (at a shear rate of 10 sec$^{-1}$ or slower) by a propeller replaced the mixing by the homogenizer.

Examples and Comparative Examples Using Metal Salt Solution (2)

Example 24

Base materials (coated materials), each supporting a metal oxide thin film, were obtained in a similar way to Example 6 except that Al solution, Zr solution and Ce solution were mixed so that a mass ratio of $Al_2O_3:ZrO_2:CeO_2$=40:40:20 would be attained in the metal oxide thin film to be obtained.

Comparative Example 20

Base materials (coated materials), each supporting a metal oxide thin film, were obtained in a similar way to Example 24 except that a gentle stirring (at a shear rate of 10 sec$^{-1}$ or slower) by a propeller replaced the mixing by the homogenizer.

<Evaluation of Component Homogeneity 1: Condition (I)>

The component homogeneity was evaluated, in the way described below, on each of the metal oxide thin films obtained by the methods described in Example 1 and Comparative Example 1, and on each of the metal oxide powders obtained by the methods described in Example 4, Comparative Example 4 and Comparative Example 11. Following the above-described measuring method for the condition (I), a spectrum of each of these metal oxide thin films and metal oxide powders was obtained by energy dispersive X-ray spectroscopy using a transmission electron microscope (JEM-2010FEF, JEOL Ltd.) with an accelerating voltage of 200 kV and an electron beam diameter of 1.0 nm. Then, the integrated peak intensity of X-ray fluorescence was obtained for each of Al, Zr, and Ce contained in each thin film.

With respect to the thickness of the sample, the appropriate regions for observation by transmission electron microscope were selected as follows. The regions of the sample to be tested had to have a thickness deemed to be approximately uniform. They were selected on the basis of the total number of X-ray counts obtained by an EDX detector, and the regions of 10000 counts to 60000 counts were selected as the regions appropriate for the measurement.

On the basis of the measurement results, the following values were calculated sequentially: X: the relative ratio of the above-described intensities; $X_m$: its mean value; $v_2$: the second moment around the mean value $X_m$; $v_2/X_m^2$: the second moment $v_2$ normalized by the mean value $X_m$ squared. Then, each sample was determined as to whether or not each sample satisfied the condition expressed by the formula (1).

The values of $v_2/X_m^2$—second moment normalized by the mean value $X_m$ squared—thus obtained are shown in Table 1.

TABLE 1

| | Second Moment Normalized by Square Mean Value | | |
|---|---|---|---|
| | Al | Zr | Ce |
| Example 1 | 0.013 | 0.008 | 0.010 |
| Example 4 | 0.004 | 0.014 | 0.017 |
| Comparative Example 1 | 0.028 | 0.016 | 0.007 |
| Comparative Example 4 | 0.016 | 0.027 | 0.001 |
| Comparative Example 11 | 0.322 | 0.106 | 0.142 |

The results shown in Table 1 clearly indicate the following. In the metal oxide thin film obtained in Example 1 and in the metal oxide powder obtained in Example 4, in both cases the method of the present invention being employed, all the metal elements contained in each metal oxide satisfied the condition expressed by the above-mentioned formula (1), and the metal oxide were dispersed in an extremely homogeneous manner. In contrast, in the metal oxide thin film obtained in Comparative Example 1 and in the metal oxide powder obtained in the Comparative Example 4, in both cases no mixing at a high shear rate being carried out, none of the metal elements contained in each metal oxide satisfied the condition expressed by the above-mentioned formula (1). Furthermore, the metal oxide powder obtained in the Comparative Example 11 where the conventional alumina/ceria/zirconia composite oxide powder obtained by the conventional coprecipitation method was used, few of the metal elements contained in the powder satisfied the condition expressed by the above-mentioned formula (1).

<Evaluation of Component Homogeneity 2: Condition (II)>

Figure 5:
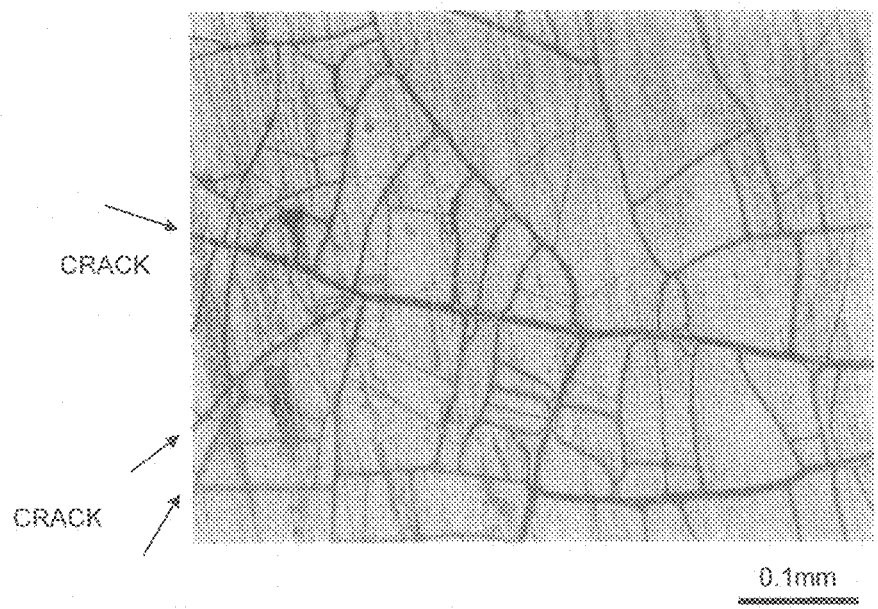
FIG. 5 is an optical micrograph showing the surface state of the metal oxide thin film obtained in Example 1.
Figure 6:
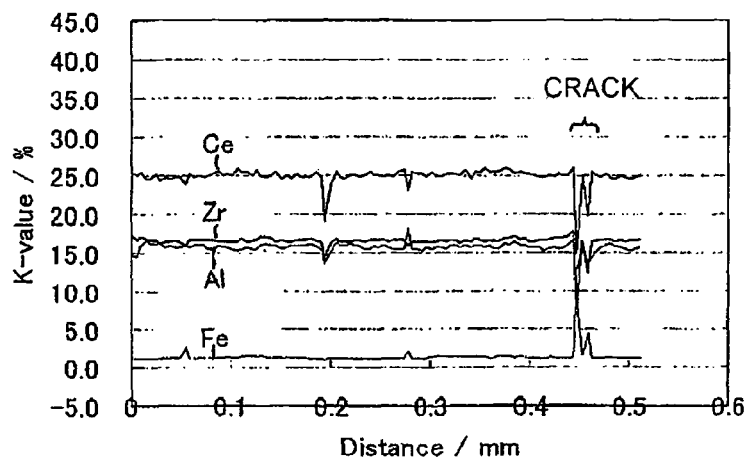
FIG. 6 is a graph showing actual measurement data of K-values measured on a measurement line 1 of the metal oxide thin film obtained in Example 1.
Figure 7:
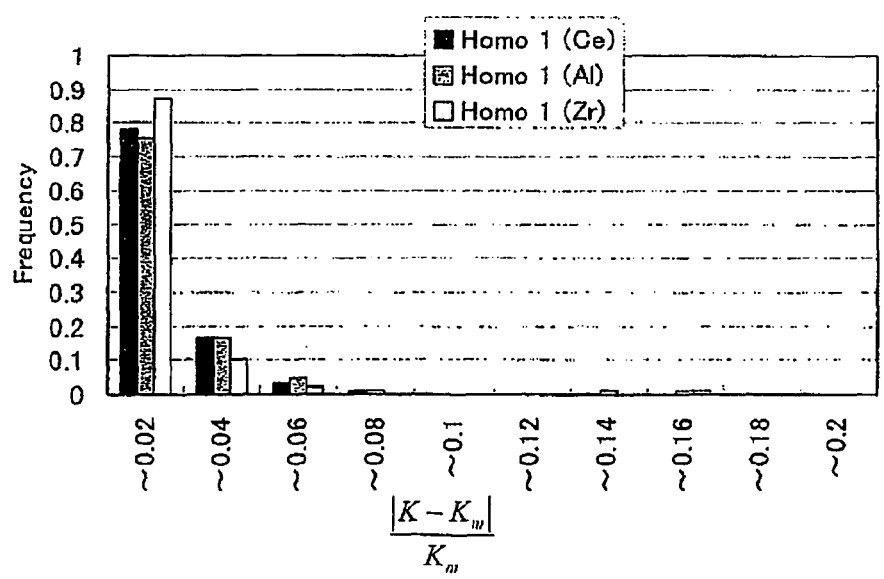
FIG. 7 is a graph showing the distribution of $\{|K-K_m|/K_m\}$ on the measurement line 1 of the metal oxide thin film obtained in Example 1.
Figure 8:
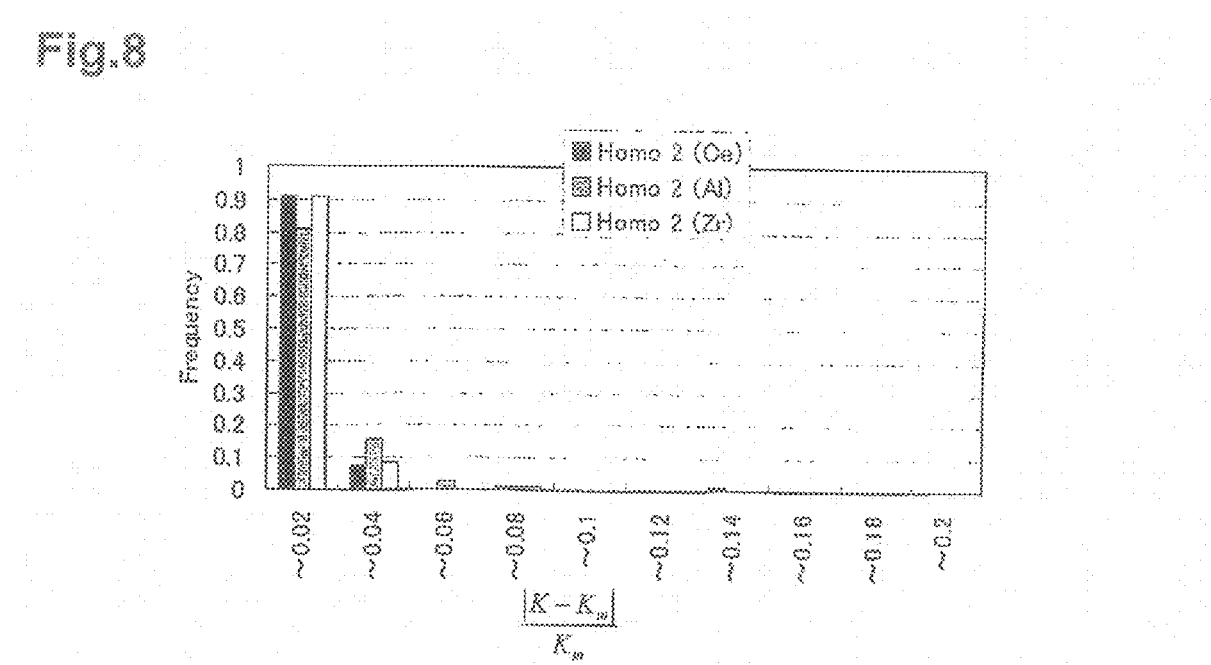
FIG. 8 is a graph showing the distribution of $\{|K-K_m|/K_m\}$ on a measurement line 2 of the metal oxide thin film obtained in Example 1.

The component homogeneity was evaluated, in the way described below, firstly, on the metal oxide thin film (film thickness: approximately 5 μm) formed on the surface of the metal plate by the method described in Example 1. Two measurement lines (measurement line 1 and measurement line 2), each with a length of 0.5 mm, were arbitrarily drawn on the surface of the metal oxide thin film obtained in Example 1. The optical micrograph of the surface is shown in FIG. 5. Using an X-ray microanalyzer (JXA-8200, JEOL Ltd.) with an accelerating voltage of 15 kV and an electron beam diameter of 1 μm, line analysis was carried out at measurement points on the measurement lines with respect to Al, Zr and Ce contained in the thin film and Fe contained in the base material. The value of K (K-value) at each measurement point, the mean value ($K_m$) of all the K-values at all the measurement points, and the value $\{|K-K_m|/K_m\}$ at each of the measuring points were obtained. Note that the parts corresponding to the cracks were determined by whether or not Fe contained in the base material was detected. The results obtained for the measurement line 1 (Homo 1) are shown in FIG. 6 (actual measurement data of K-value), in FIG. 7 (distribution of $\{|K-K_m|/K_m\}$) and in Table 2. The results obtained for the measurement line 2 (Homo 2) are shown in FIG. 8 (distribution of $\{|K-K_m|/K_m\}$) and in Table 3.

TABLE 2

|    | Mean Value $K_m$ K-value (%) | Proportion (%) of $|K - K_m|/K_m \leq 0.02$ |
|----|------------------------------|---------------------------------------------|
| Ce | 25.0                         | 78.2                                        |
| Al | 15.7                         | 75.2                                        |
| Zr | 16.6                         | 87.1                                        |

TABLE 3

|    | Mean Value $K_m$ K-value (%) | Proportion (%) of $|K - K_m|/K_m \leq 0.02$ |
|----|------------------------------|---------------------------------------------|
| Ce | 25.1                         | 90.8                                        |
| Al | 16.2                         | 80.7                                        |
| Zr | 16.7                         | 90.8                                        |

The results shown in Tables 2 and 3 clearly indicate the following fact concerning the metal oxide thin film obtained in Example 1 by mixing the colloidal solution at a high shear rate, applying to the base material, and then drying and calcining rapidly. All of the metal elements contained in the thin film satisfied the condition expressed by the above-mentioned formula (3) at 65% or more of all the measurement points, and the metal oxides were dispersed in an extreme homogeneous manner in the thin film.

Figure 9:
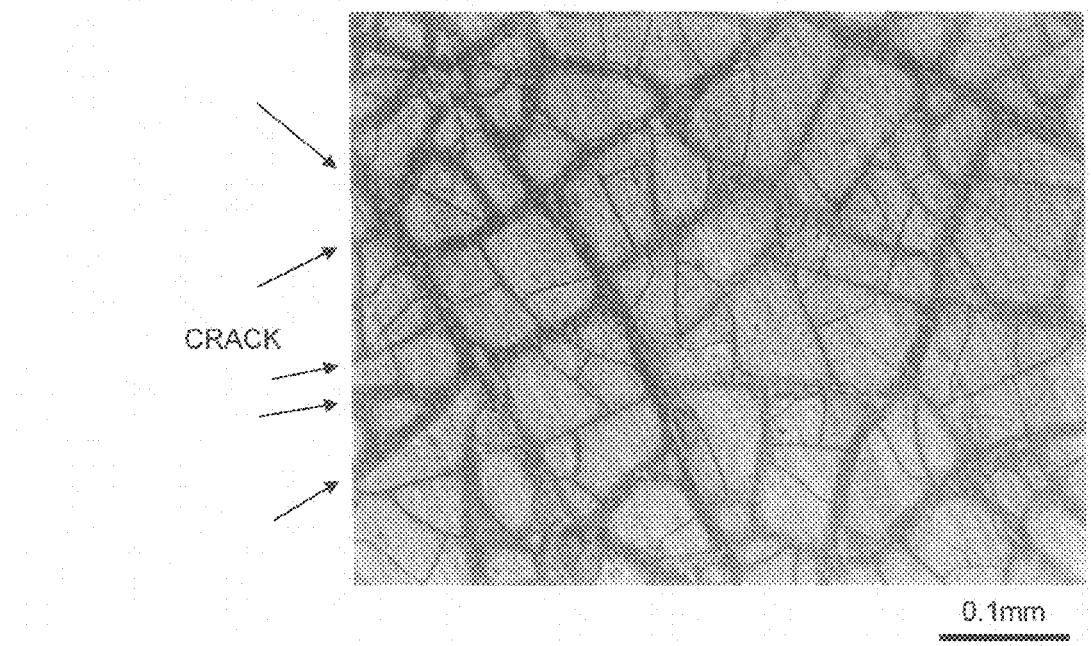
FIG. 9 is an optical micrograph showing the surface state of the metal oxide thin film obtained in Comparative Example 1.
Figure 10:
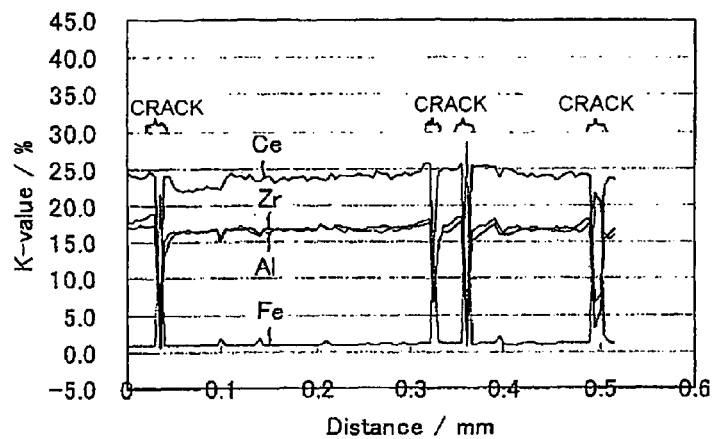
FIG. 10 is a graph showing actual measurement data of the K-values measured on the measurement line 1 of the metal oxide thin film obtained in Comparative Example 1.
Figure 11:
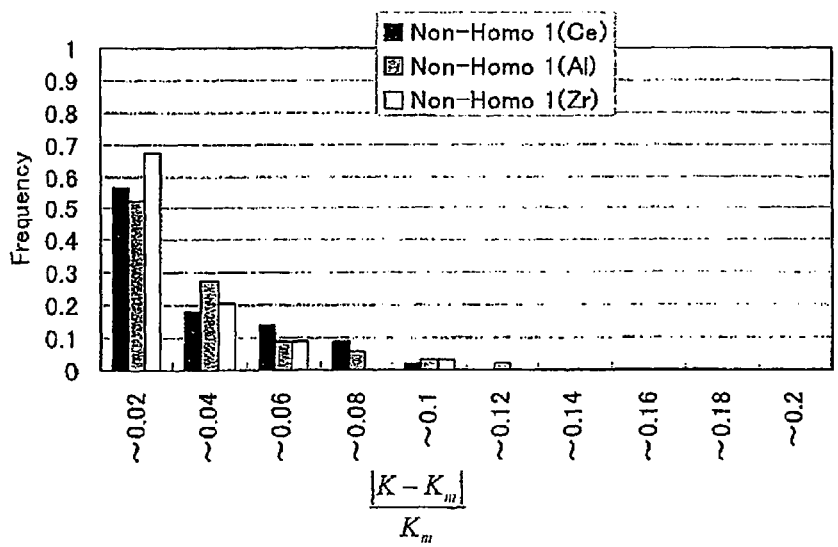
FIG. 11 is a graph showing the distribution of $\{|K-K_m|/K_m\}$ on the measurement line 1 of the metal oxide thin film obtained in Comparative Example 1.
Figure 12:
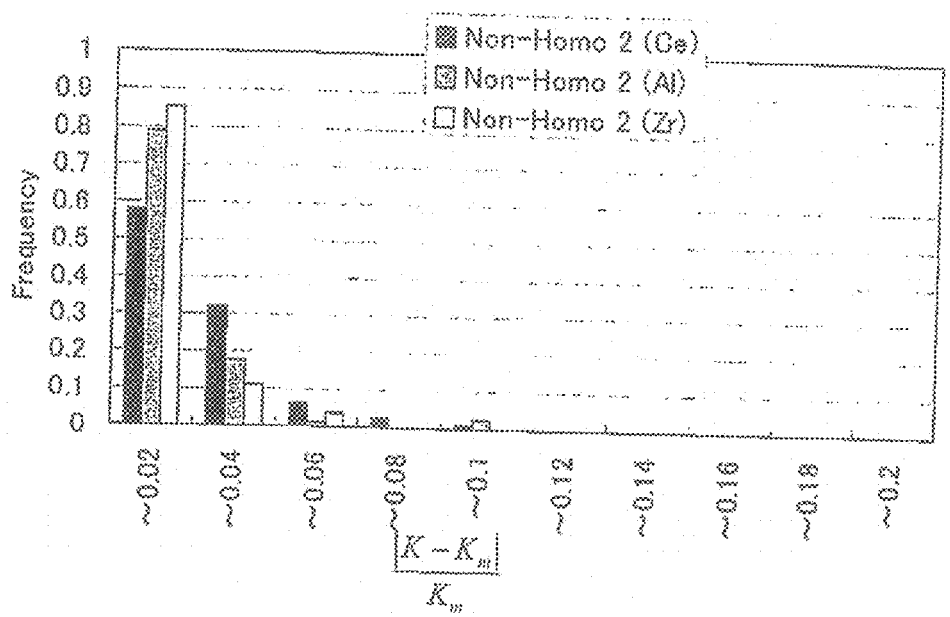
FIG. 12 is a graph showing the distribution of $\{|K-K_m|/K_m\}$ on the measurement line 2 of the metal oxide thin film obtained in Comparative Example 1.

The component homogeneity was evaluated, in a way similar to that mentioned above, secondly, on the metal oxide thin film (film thickness: approximately 5 μm) formed on the surface of the metal plate by the method described in Comparative Example 1. Two measurement lines (measurement line 1 and measurement line 2), each with a length of 0.5 mm, were arbitrarily drawn on the surface of the metal oxide thin film obtained in Comparative Example 1. The optical micrograph of the surface is shown in FIG. 9. Line analysis was carried out, in a similar way to that mentioned above, with respect to Al, Zr and Ce contained in the thin film and Fe contained in the base material. The value of K (K-value) at each measurement point, the mean value ($K_m$) of all the K-values at all the measurement points, and the value $\{|K-K_m|/K_m\}$ at each of the measuring points were obtained. The results obtained for the measurement line 1 (Non-Homo 1) are shown in FIG. 10 (actual measurement data of K-value), in FIG. 11 (a distribution of $\{|K-K_m|/K_m\}$) and in Table 4. The results obtained for the measurement line 2 (Non-Homo 2) are shown in FIG. 12 (a distribution of $\{|K-K_m|/K_m\}$) and in Table 5.

TABLE 4

|    | Mean Value $K_m$ K-value (%) | Proportion (%) of $|K - K_m|/K_m \leq 0.02$ |
|----|------------------------------|---------------------------------------------|
| Ce | 23.9                         | 56.8                                        |
| Al | 16.8                         | 52.3                                        |
| Zr | 16.5                         | 67.0                                        |

TABLE 5

|    | Mean Value $K_m$ K-value (%) | Proportion (%) of $|K - K_m|/K_m \leq 0.02$ |
|----|------------------------------|---------------------------------------------|
| Ce | 23.3                         | 58.0                                        |
| Al | 16.5                         | 79.0                                        |
| Zr | 16.5                         | 85.2                                        |

The results shown in Tables 4 and 5 clearly indicate the following fact concerning the metal oxide thin film obtained in Comparative Example 1 by using the colloidal solution as it was. At least part of the metal elements contained in the thin film satisfied the condition expressed by the above-mentioned formula (3) only at less than 65% of all the measurement points.

Figure 13:
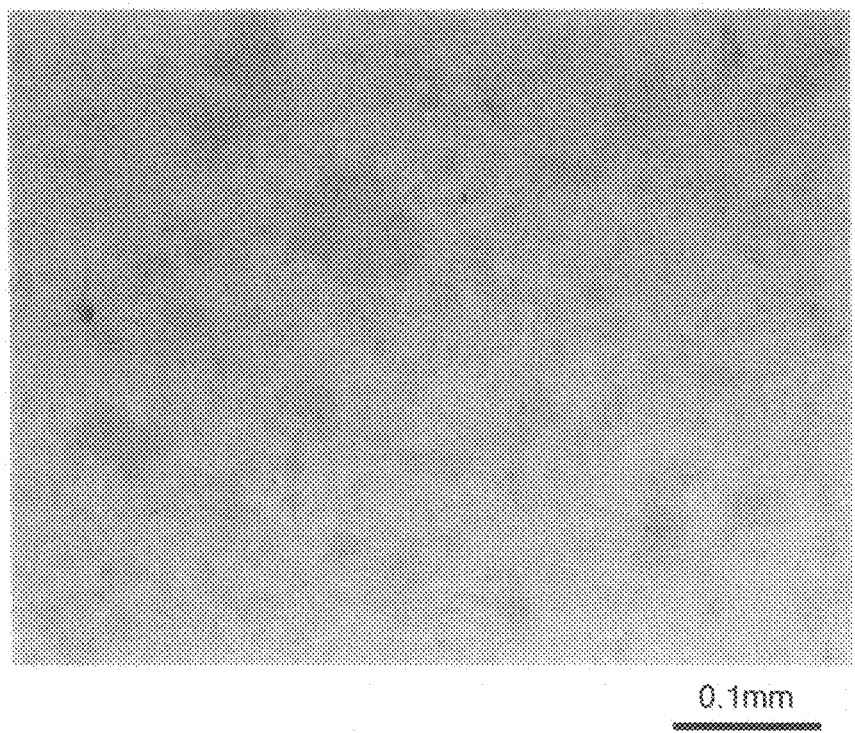
FIG. 13 is an optical micrograph showing the surface state of the metal oxide thin film obtained in Comparative Example 10.
Figure 14:
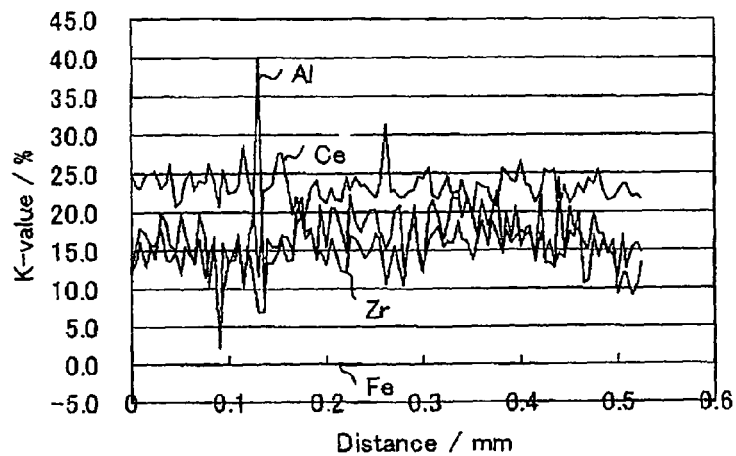
FIG. 14 is a graph showing actual measurement data of the K-values measured on the measurement line 1 of the metal oxide thin film obtained in Comparative Example 10.
Figure 15:
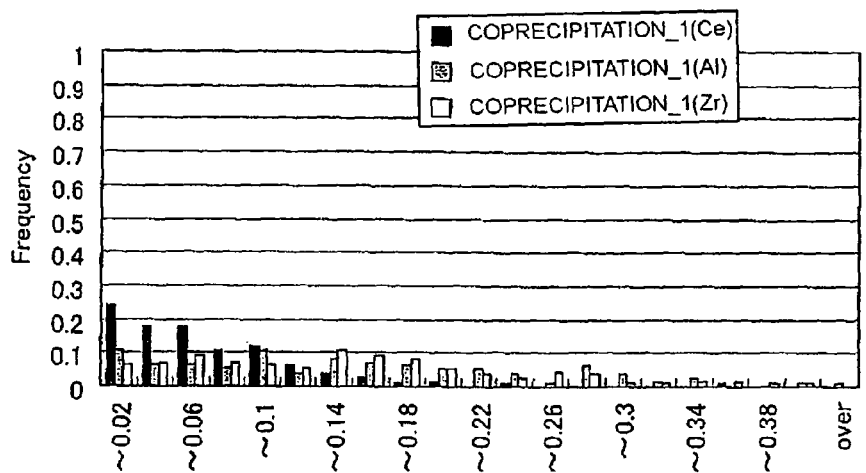
FIG. 15 is a graph showing the distribution of $\{|K-K_m|/K_m\}$ on the measurement line 1 of the metal oxide thin film obtained in Comparative Example 10.
Figure 16:
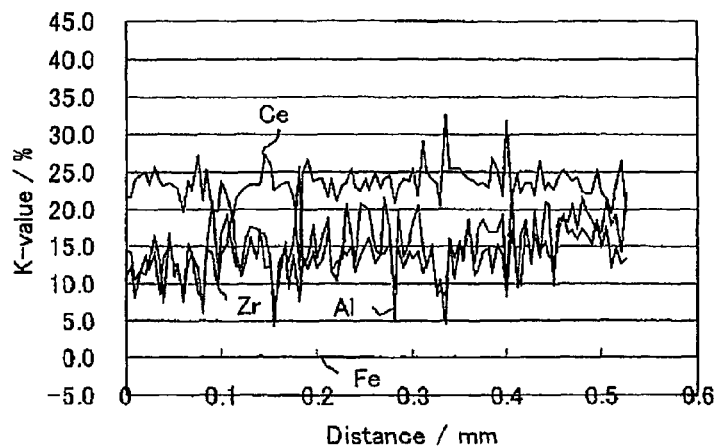
FIG. 16 is a graph showing actual measurement data of the K-values measured on the measurement line 2 of the metal oxide thin film obtained in Comparative Example 10.
Figure 17:
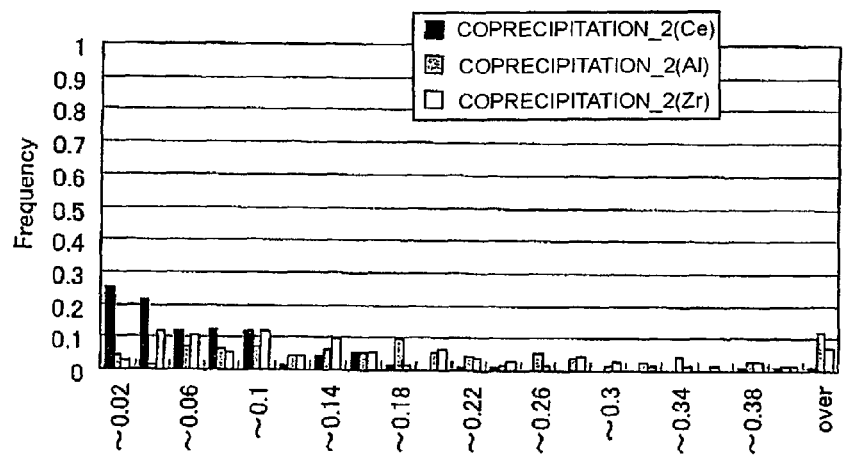
FIG. 17 is a graph showing the distribution of $\{|K-K_m|/K_m\}$ on the measurement line 3 of the metal oxide thin film obtained in Comparative Example 10.

The component homogeneity was evaluated, in a way similar to that mentioned above, thirdly, on the metal oxide thin film (film thickness: approximately 40 μm) formed on the surface of the metal plate by the method described in Comparative Example 10. Note that the metal oxide thin film formed on the surface of the above-mentioned metal plate by the method described in Comparative Example 10 had a clearly inferior adhesion to the base material, and that a film thickness of approximately 40 μm was needed to form a coating that covered the base material. Two measurement lines (measurement line 1 and measurement line 2), each with a length of 0.5 mm, were arbitrarily drawn on the surface of the metal oxide thin film obtained in Comparative Example 10. The optical microscopic photograph of the surface is shown in FIG. 13. Line analysis was carried out, in a similar way to that mentioned above, with respect to Al, Zr and Ce contained in the thin film and Fe contained in the base material. The value of K (K-value) at each measurement point, the mean value ($K_m$) of all the K-values at all the measurement points, and the value $\{|K-K_m|/K_m\}$ at each of the measuring points were obtained. The results obtained for the measurement line 1 (Coprecipitation-1) are shown in FIG. 14 (actual measurement data of K-value), in FIG. 15 (distribution of $\{|K-K_m|/K_m\}$) and in Table 6. The results obtained for the measurement line 2 (Coprecipitation-2) are shown in FIG. 16 (actual measurement data of K-value), in FIG. 17 (a distribution of $\{|K-K_m|/K_m\}$) and in Table 7.

TABLE 6

|    | Mean Value $K_m$ K-value (%) | Proportion (%) of $|K - K_m|/K_m \leqq 0.02$ |
| --- | --- | --- |
| Ce | 23.2 | 24.1 |
| Al | 17.0 | 10.7 |
| Zr | 14.4 | 6.3 |

TABLE 7

|    | Mean Value $K_m$ K-value (%) | Proportion (%) of $|K - K_m|/K_m \leqq 0.02$ |
| --- | --- | --- |
| Ce | 23.5 | 25.0 |
| Al | 15.5 | 4.5 |
| Zr | 13.5 | 2.7 |

The results shown in Tables 6 and 7 clearly indicate the following fact concerning the metal oxide thin film obtained in Comparative Example 10 by using, as it was, the slurry containing the conventional alumina/ceria/zirconia composite oxide powder obtained by the coprecipitation method. All of the metal elements contained in the thin film satisfied the condition expressed by the above-mentioned formula (3) only at less than 65% of all the measurement points.

<Evaluation of Surface Profile: Condition (III)>

Figure 18:
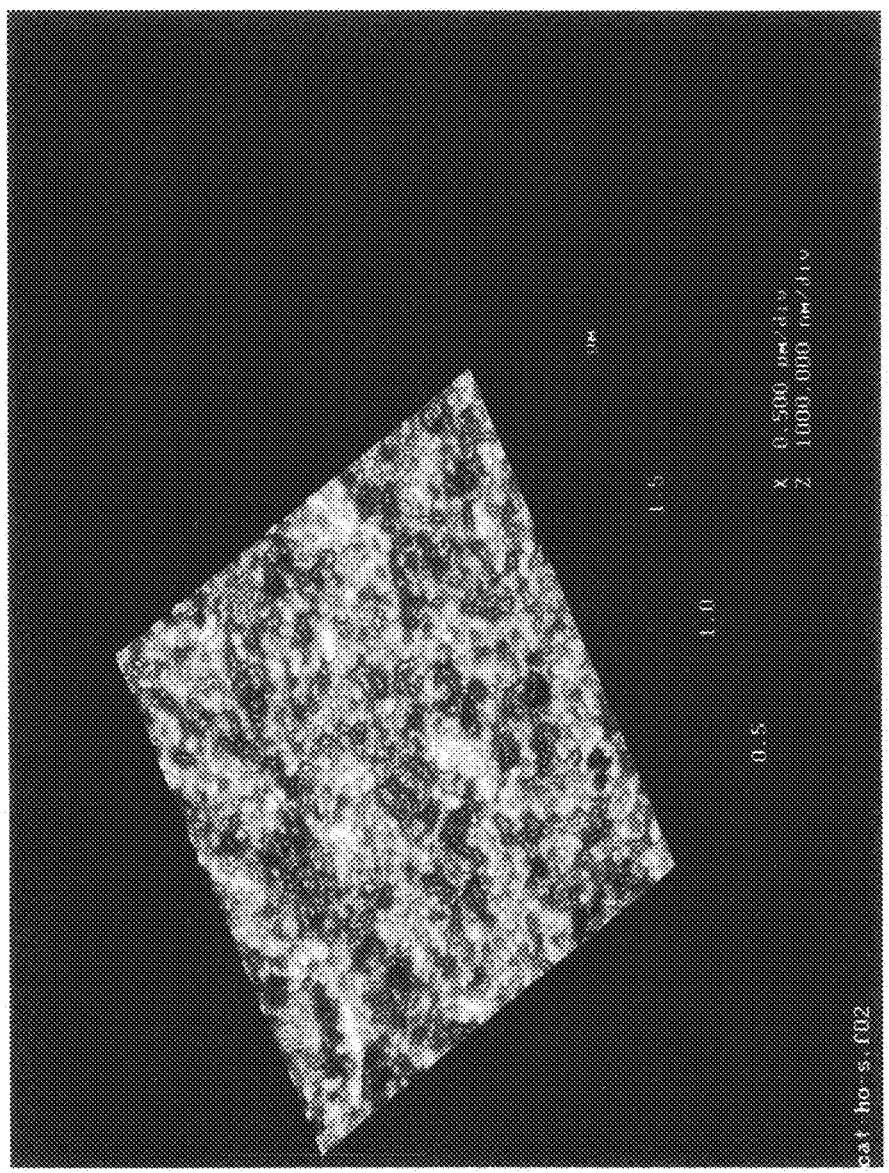
FIG. 18 is a scanning probe micrograph showing the surface state of the metal oxide thin film obtained in Example 1.
Figure 19:
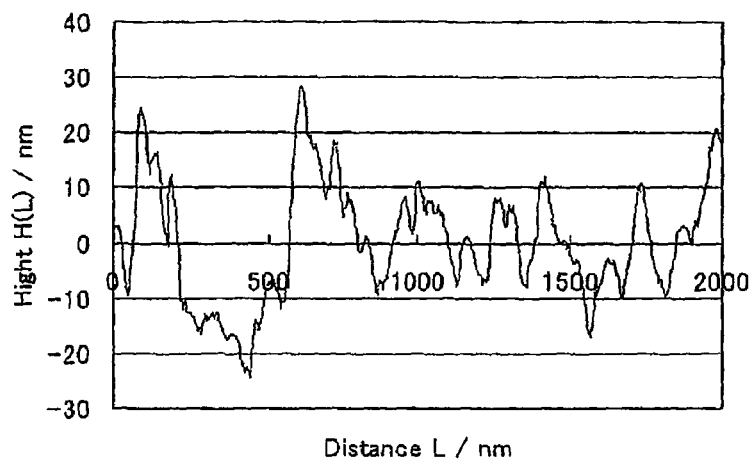
FIG. 19 is a graph showing actual measurement data of a height image H(L) of the metal oxide thin film obtained in Example 1.
Figure 20:
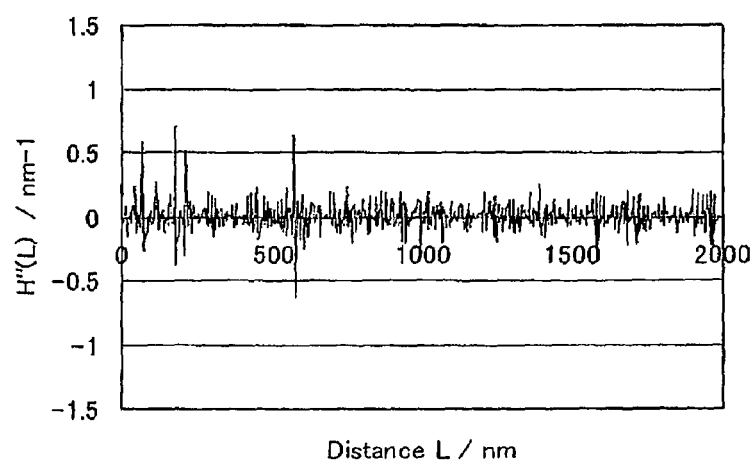
FIG. 20 is a graph showing actual measurement data of a second derivative H"(L) of the metal oxide thin film obtained in Example 1.

Surface Profile was evaluated, in the way described below, firstly, on the metal oxide thin film (film thickness: approximately 5 μm) formed on the surface of the above-mentioned metal plate by the method described in Example 1. A measurement line of 2 μm was arbitrarily drawn on the surface of the metal oxide thin film obtained in Example 1. FIG. 18 shows a scanning probe micrograph of the surface. Using a scanning probe microscope (Nanoscope IIIa by Digital Instruments with Q-Control module by NanoAnalytics GmbH) with a super-sharp tip of a 5 nm curvature radius, the height image of the surface of the thin film was measured by TappingMode (measured at 512 points at 3.91 nm intervals). The height image H(L) and its second derivative H" (L) were obtained respectively as functions of the scanning length L. The results thus obtained are shown in FIG. 19 (actual measurement data of the height image H(L)), in FIG. 20 (actual measurement data of the second derivative H" (L)), in FIG. 21 (a distribution of the height image H(L)) and in FIG. 22 (a distribution of the second derivative H" (L)).

Figure 21:
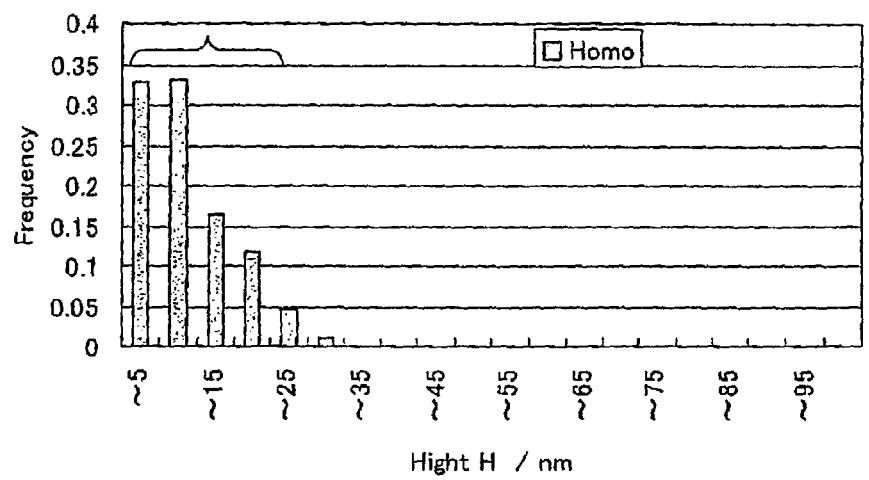
FIG. 21 is a graph showing the distribution of the height image H(L) of the metal oxide thin film obtained in Example 1.
Figure 22:
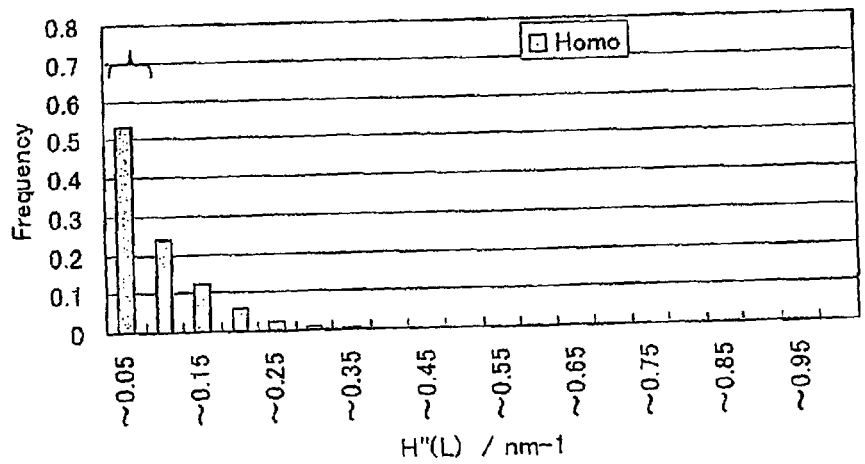
FIG. 22 is a graph showing the distribution of the second derivative H"(L) of the metal oxide thin film obtained in Example 1.

The results shown in FIG. 21 clearly indicate the following. In the metal oxide thin film obtained in Example 1—obtained by mixing a colloidal solution at a high shear rate, and by applying it onto a base material followed by a rapid drying process and a rapid calcining process—the height image H(L) was 20 nm or lower at 94% of all the measurement points, and the thin film had a fine uneven surface. In addition, the results shown in FIG. 22 clearly indicate the following. In the metal oxide thin film obtained in Example 1, the absolute value of the second derivative H" (L) was 0.05 nm$^{-1}$ or smaller at 54% of all the measurement points, and each of the convexities and concavities on the surface of the thin film further had multiple, extremely fine bumps.

Figure 23:
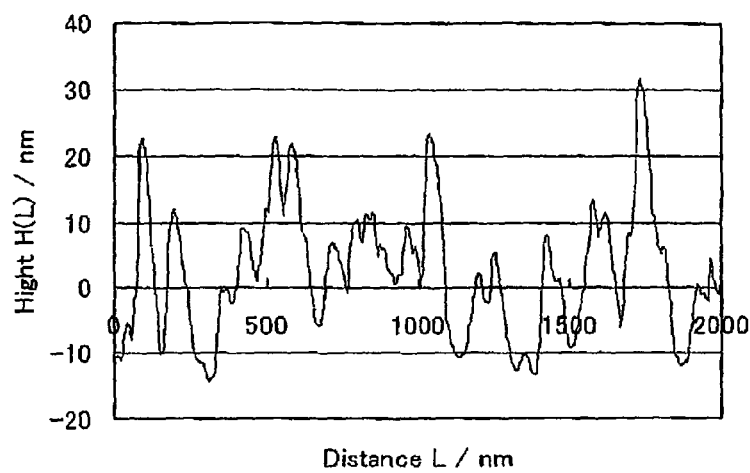
FIG. 23 is a graph showing actual measurement data of the height image H(L) of the metal oxide thin film obtained in Comparative Example 1.
Figure 24:
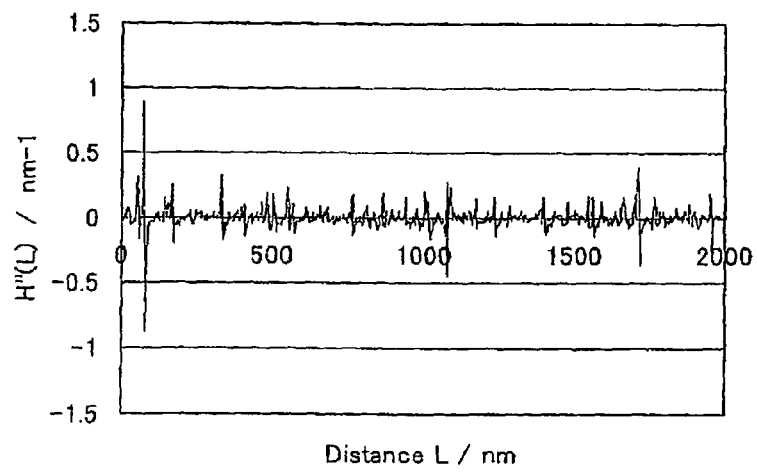
FIG. 24 is a graph showing actual measurement data of the second derivative H"(L) of the metal oxide thin film obtained in Comparative Example 1.

Surface Profile was evaluated, in a way similar to the above-mentioned one, secondly, on the metal oxide thin film (film thickness: approximately 5 μm) formed on the surface of the above-mentioned metal plate by the method described in Comparative Example 1. The height image of the surface of the metal oxide thin film obtained in Comparative Example 1 was measured in the same way as that mentioned above, and the height image H(L) and its second derivative H" (L) were obtained as functions of the scanning length L. The results thus obtained are shown in FIG. 23 (actual measurement data of the height image H(L)), in FIG. 24 (actual measurement data of the second derivative H" (L)), in FIG. 25 (a distribution of the height image H(L)) and in FIG. 26 (a distribution of the second derivative H" (L)).

Figure 25:
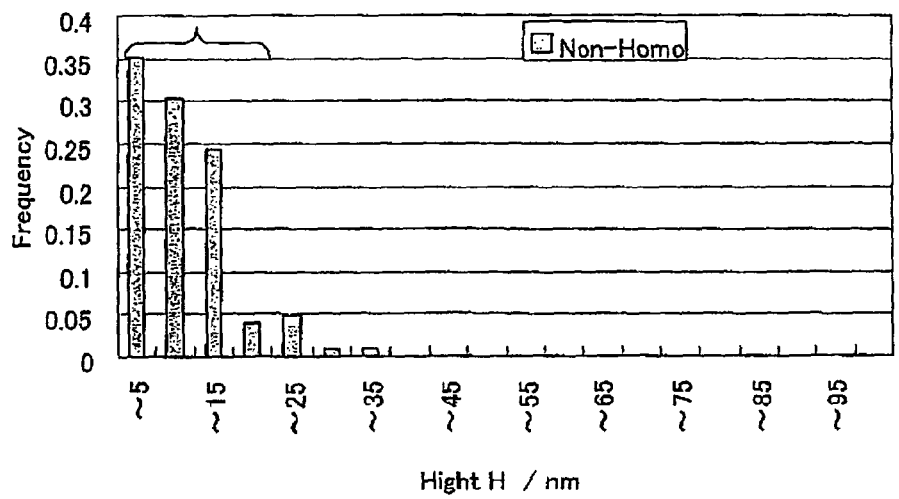
FIG. 25 is a graph showing the distribution of the height image H(L) of the metal oxide thin film obtained in Comparative Example 1.
Figure 26:
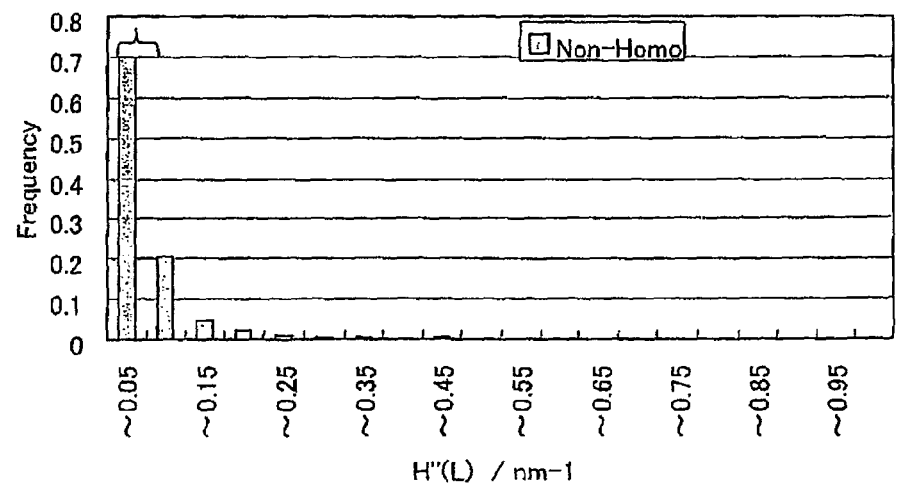
FIG. 26 is a graph showing the distribution of the second derivative H"(L) of the metal oxide thin film obtained in Comparative Example 1.

The results shown in FIGS. 25 and 26 clearly indicate the following. In the metal oxide thin film obtained in Comparative Example 1—obtained by using a colloidal solution as it was—although the height image H(L) was 20 nm or lower at 94% of all the measurement points, the absolute value of the second derivative H" (L) was 0.05 nm$^{-1}$ or smaller at 70% of all the measurement points. This indicates that the convexities and concavities on the surface of the thin film were relatively smooth.

Figure 27:
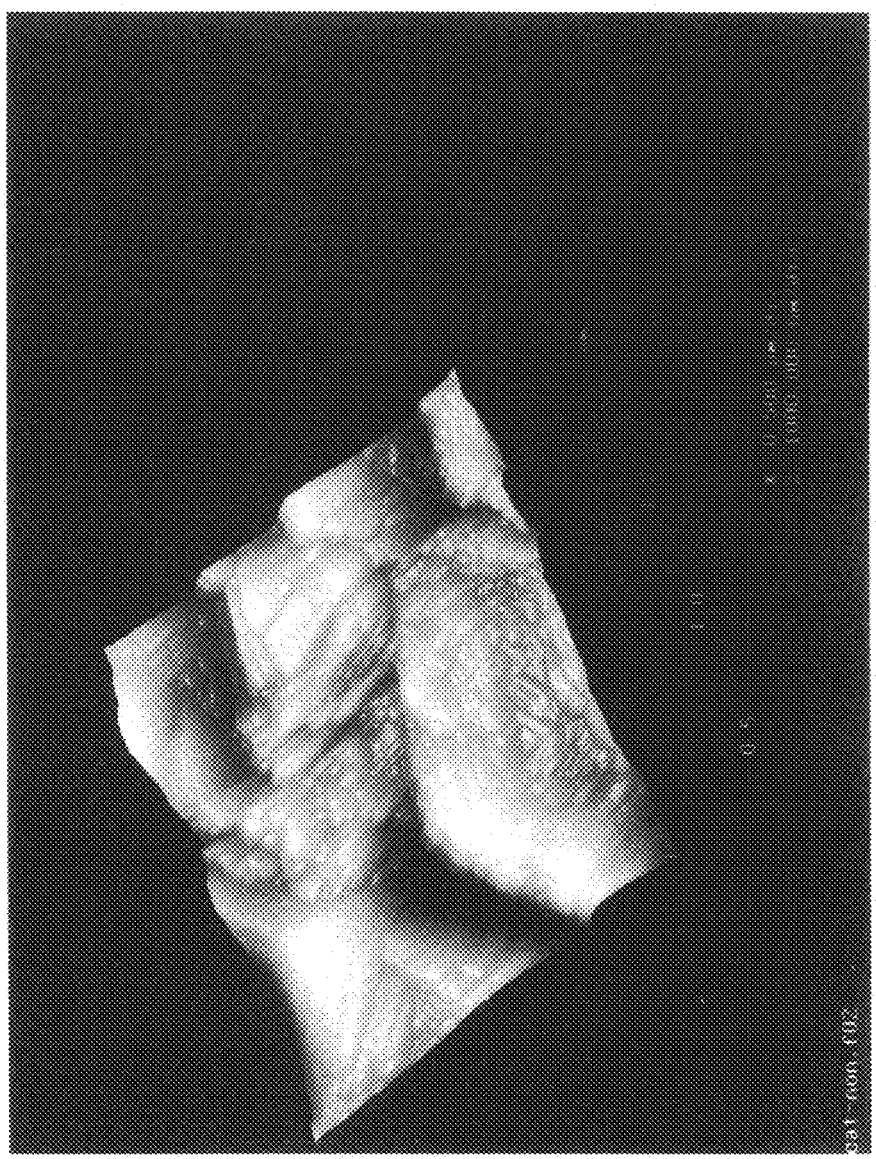
FIG. 27 is a scanning probe micrograph showing the surface state of the metal oxide thin film obtained in Comparative Example 10.
Figure 28:
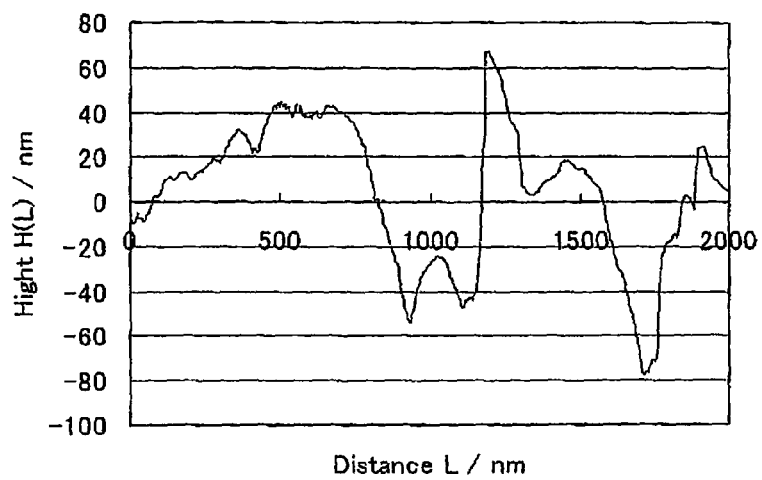
FIG. 28 is a graph showing actual measurement data of the height image H(L) of the metal oxide thin film obtained in Comparative Example 10.
Figure 29:
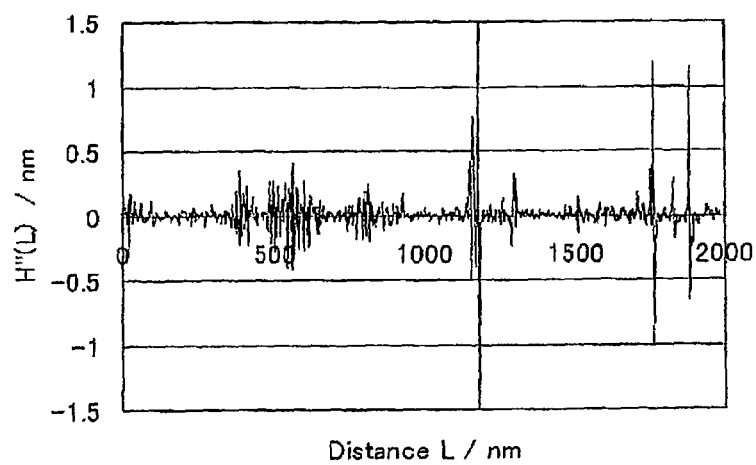
FIG. 29 is a graph showing actual measurement data of the second derivative H"(L) of the metal oxide thin film obtained in Comparative Example 10.

Surface Profile was evaluated, in a way similar to the above-mentioned one, thirdly, on the metal oxide thin film (film thickness: approximately 40 μm) formed on the surface of the above-mentioned metal plate by the method described in Comparative Example 10. The height image of the surface of the metal oxide thin film obtained in Comparative Example 10—FIG. 27 shows a scanning probe micrograph of the surface thereof—was measured in the same way as that mentioned above. The height image H(L) and its second derivative H" (L) were obtained respectively as functions of the scanning length L. The results thus obtained are shown in FIG. 28 (actual measurement data of the height image H(L)), in FIG. 29 (actual measurement data of second derivative H" (L)), in FIG. 30 (a distribution of the height image H(L)) and in FIG. 31 (a distribution of the second derivative H" (L)).

Figure 30:
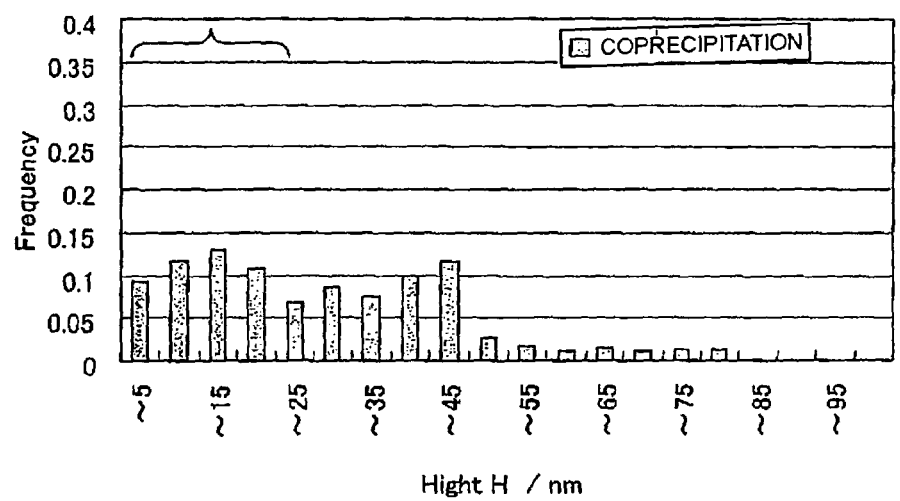
FIG. 30 is a graph showing the distribution of the height image H(L) of the metal oxide thin film obtained in Comparative Example 10.
Figure 31:
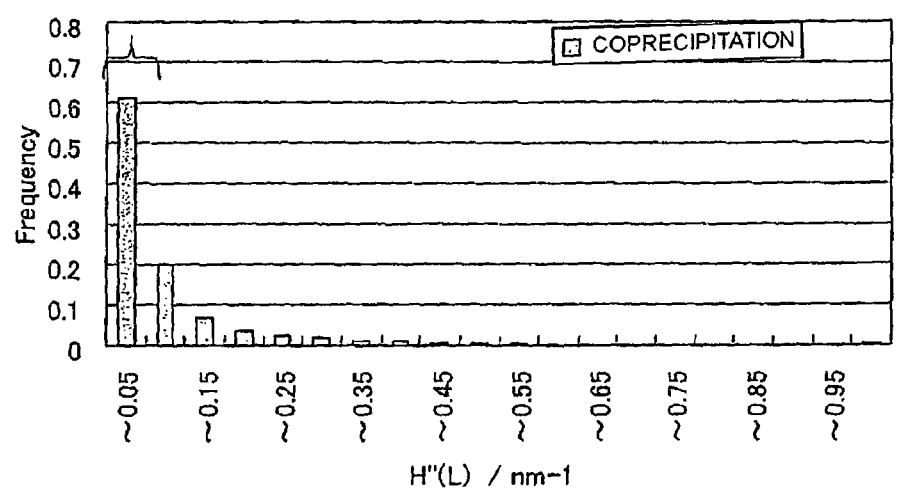
FIG. 31 is a graph showing the distribution of the second derivative H"(L) of the metal oxide thin film obtained in Comparative Example 10.

The results shown in FIGS. 30 and 31 clearly indicate the following. In the metal oxide thin film obtained in Comparative Example 10—obtained by using, as it was, a slurry containing a conventional alumina/ceria/zirconia compound metal oxide powder obtained by the coprecipitation method—the height image H(L) was 20 nm or lower at 44% of all the measurement points, and the absolute value of the second derivative H" (L) was 0.05 nm$^{-1}$ or smaller at 61% of all the measurement points. This indicates that the convexities and concavities on the surface of the thin film were relatively smooth and large.

<Evaluation of Sectional Aspect: Condition (IV)>

Figure 32:
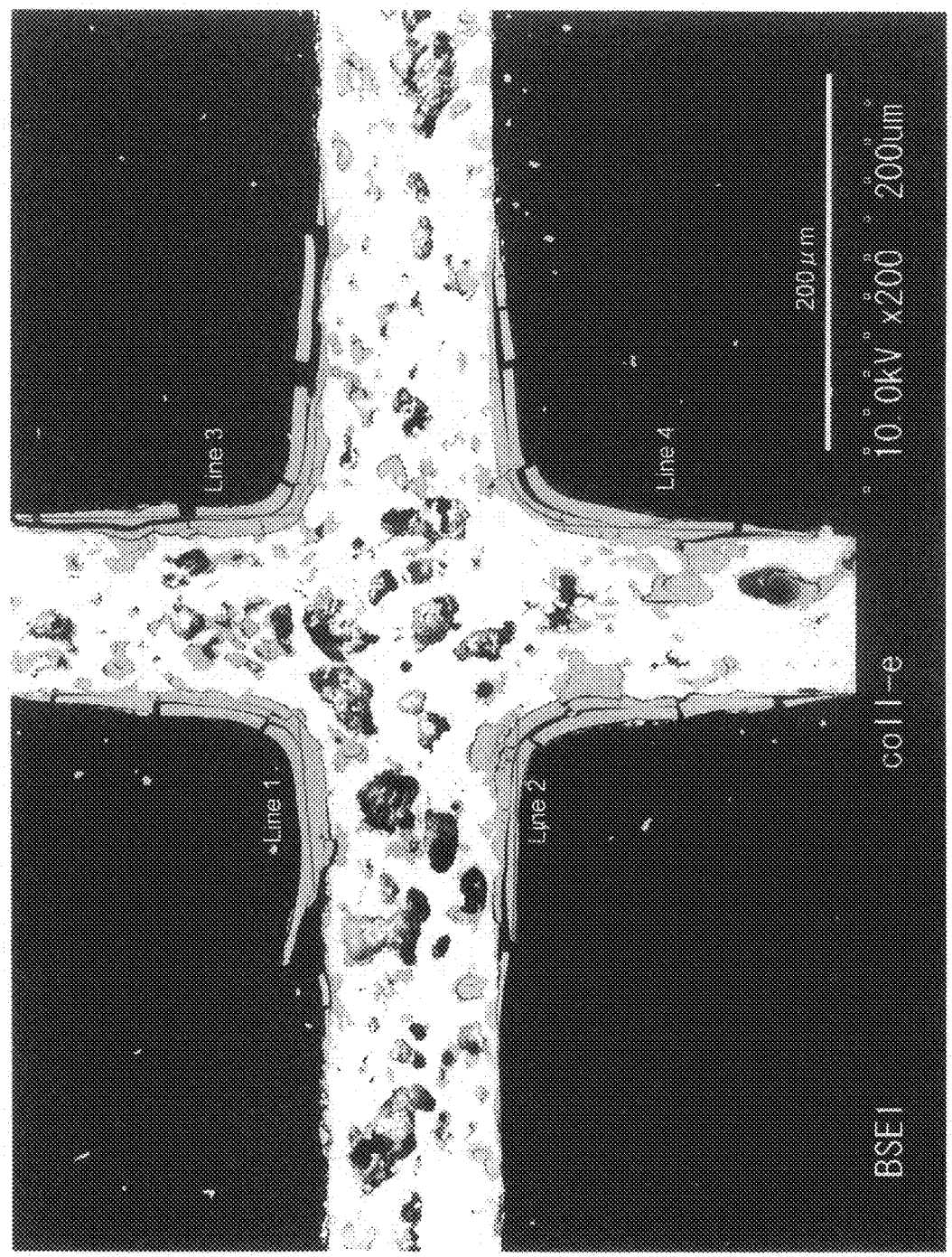
FIG. 32 is an electron micrograph showing a section (at an end portion of a 400-mesh substrate) of the metal oxide thin film obtained in Example 1.
Figure 33:
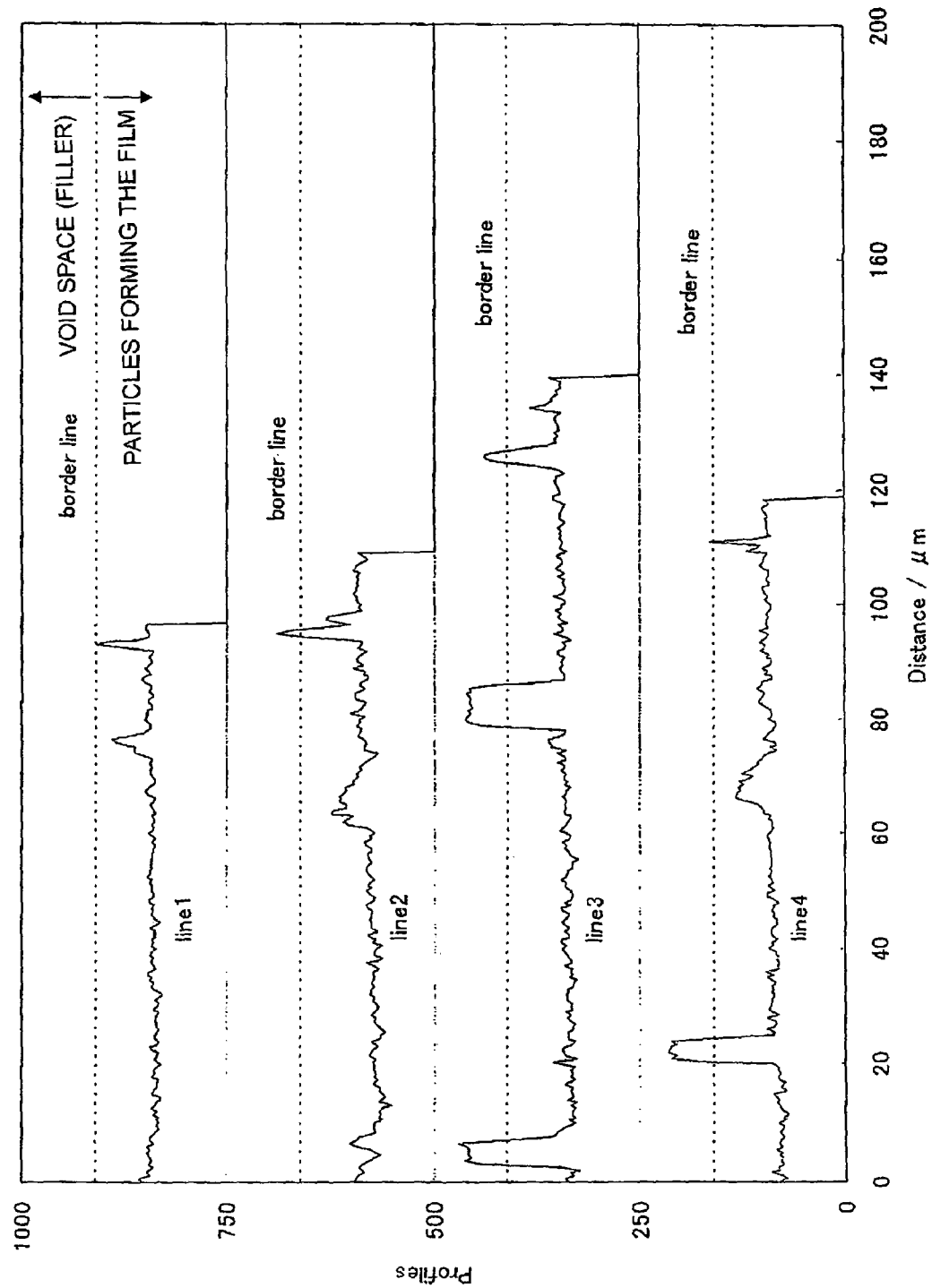
FIG. 33 is a graph showing the proportion of a dense colored part of the measurement line on the photograph shown in FIG. 32.

Sectional aspect was evaluated, in the way described below, firstly, on the metal oxide thin film formed on an end portion of the above-mentioned 400-mesh honeycomb cordierite base material by the method described in Example 1. In the electron micrograph, shown in FIG. 32, of a section of the metal oxide thin film obtained in Example 1, four measurement lines (lines 1 to 4), of 465.5 μm in total, were drawn on the thin film. The proportion of the length of parts where these measurement lines crossed the void spaces formed in the above-mentioned thin film was obtained. The proportion of dense parts of the four measurement lines (lines 1 to 4) on the electron micrograph to the total length of the measurement lines is shown by the graph in FIG. 33. In FIG. 33, the parts projecting over each of the border lines (the parts in dense color in the micrograph) correspond to the respective void spaces.

The results shown in FIG. 33 clearly indicate the following. In the metal oxide thin film (in the end portion of the 400-mesh base material) obtained in Example 1—obtained by mixing a colloidal solution at a high shear rate, and by applying it onto a base material followed by a rapid drying and calcining process—the proportion of the length of the parts where the above-mentioned measurement lines crossed the void spaces was 4.3%. This indicates that the metal oxide forming the thin film has a certain degree of continuity, and has few void spaces.

Figure 34:
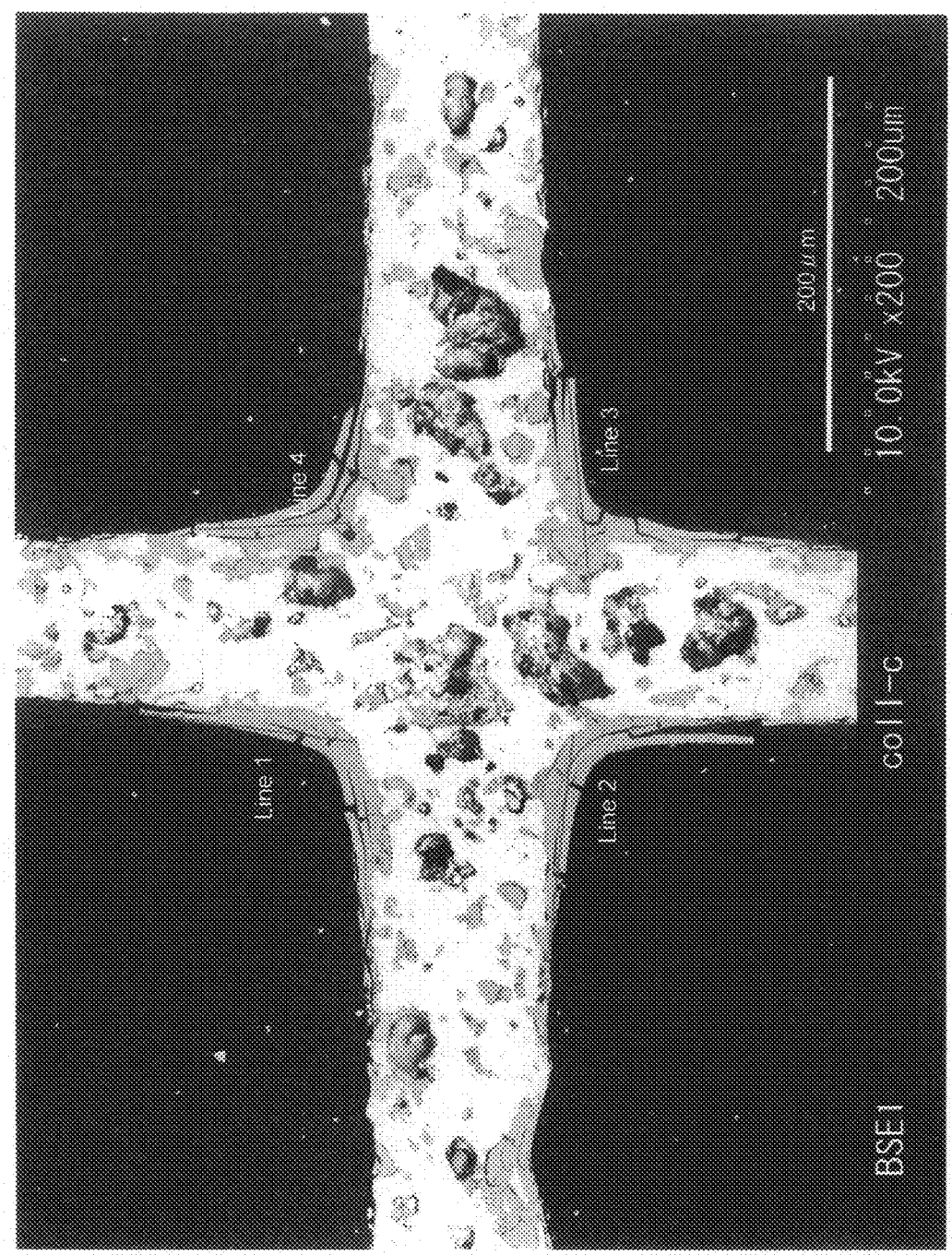
FIG. 34 is an electron micrograph showing a section (at a center portion of the 400-mesh substrate) of the metal oxide thin film obtained in Example 1.

Sectional aspect was evaluated, in a way similar to the above-mentioned one, secondly, on the metal oxide thin film formed on a center portion of the above-mentioned 400-mesh honeycomb cordierite base material by the method described in Example 1. In the electron micrograph, shown in FIG. 34, of a section of metal oxide thin film obtained in Example 1, four measurement lines (lines 1 to 4), of 405.5 μm in total, were drawn on the thin film. The proportion of the length of parts where these measurement lines crossed the void spaces formed in the above-mentioned thin film was obtained. The proportion of dense parts of the four measurement lines (lines 1 to 4) on the electron micrograph to the total length of the measurement lines is shown by the graph in FIG. 35.

Figure 35:
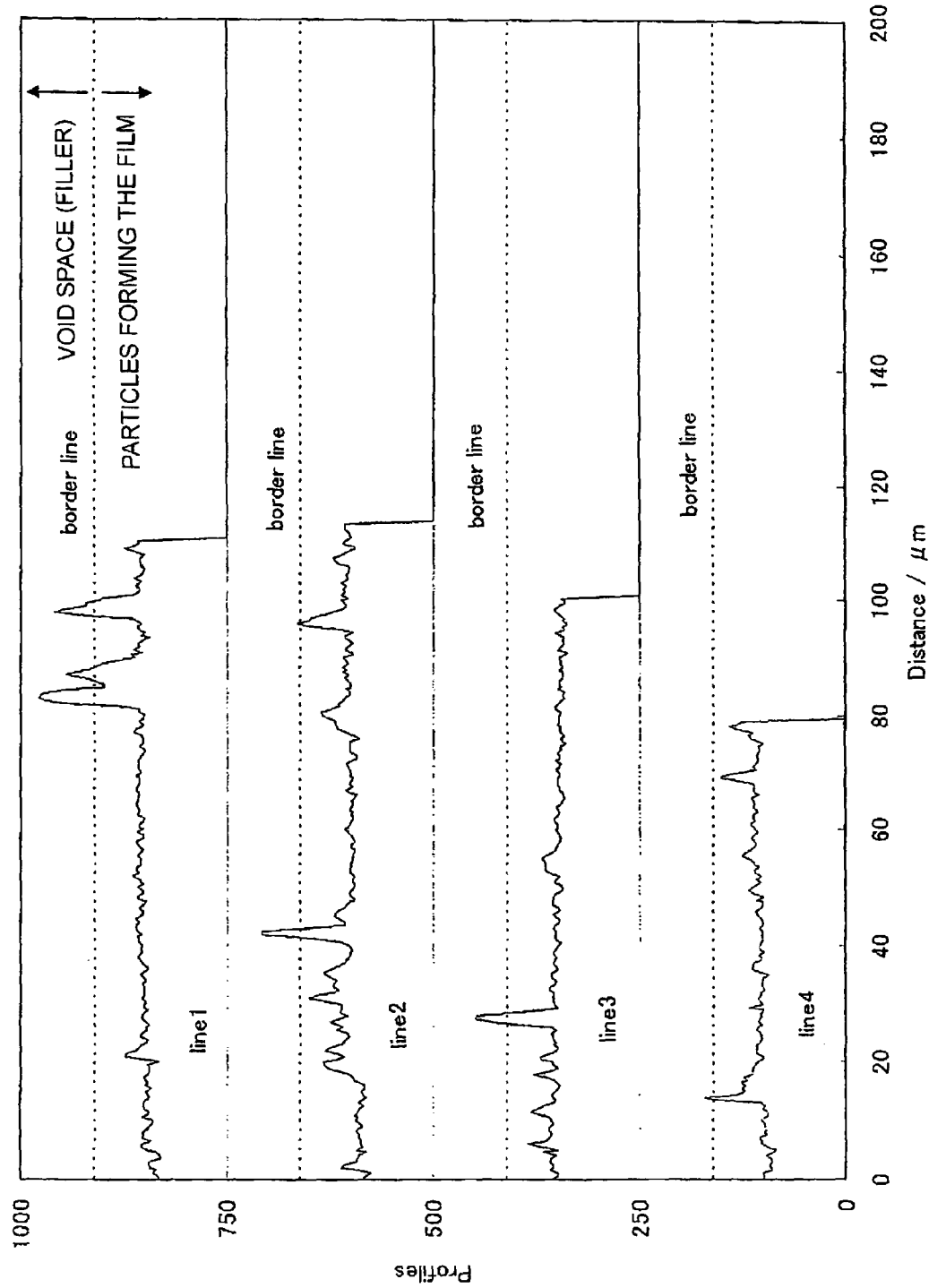
FIG. 35 is a graph showing the proportion of the dense colored part of the measurement line on the photograph shown in FIG. 34.

The results shown in FIG. 35 clearly indicate the following. In the metal oxide thin film (also in the center portion of the 400-mesh base material) obtained in Example 1, the proportion of the length of the parts where the above-mentioned measurement lines crossed the void spaces was 3.1%. This indicates that the metal oxide forming the thin film has a certain degree of continuity, and has few void spaces.

Figure 36:
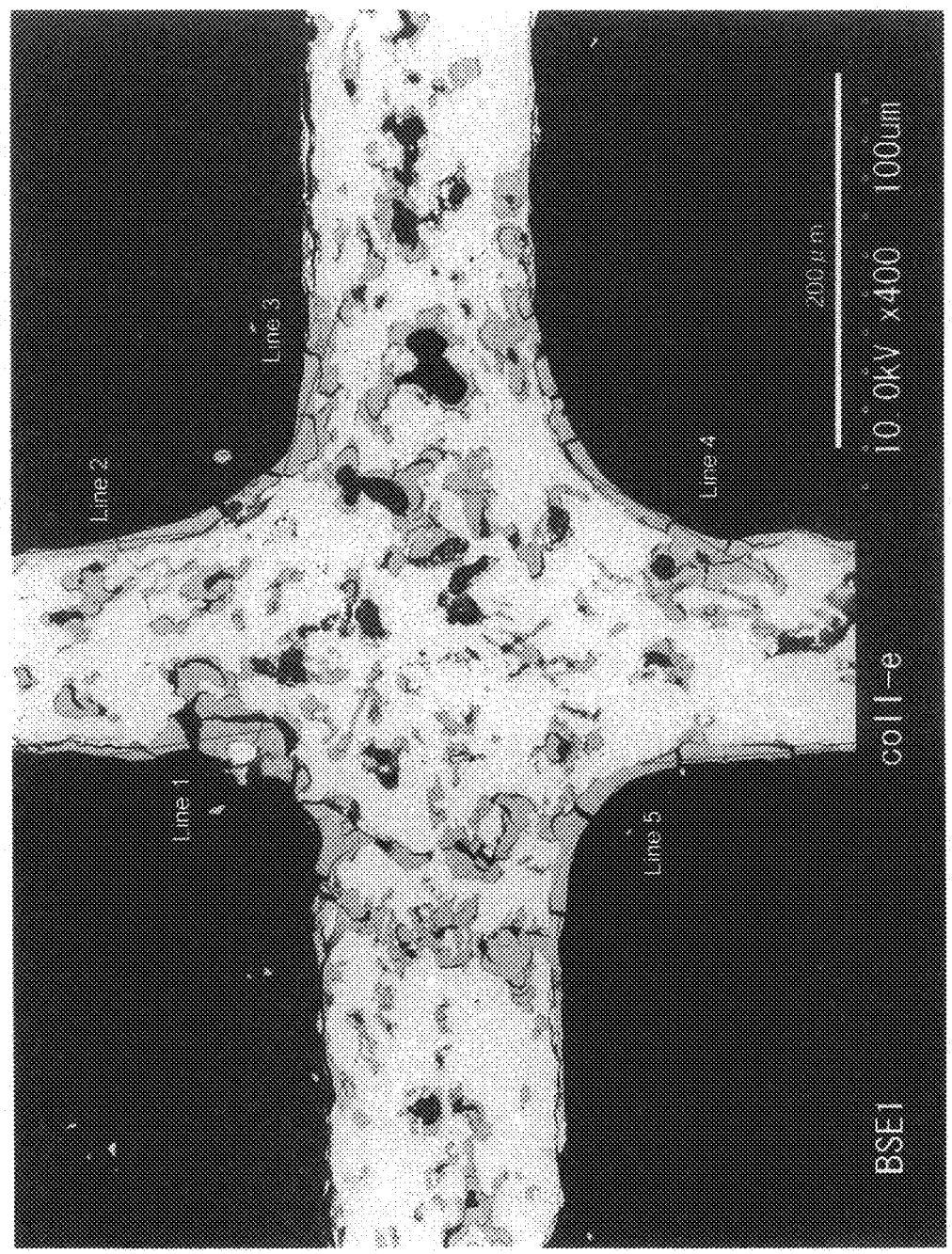
FIG. 36 is an electron micrograph showing a section (at an end portion of 1500 mesh substrate) of the metal oxide thin film obtained in Example 1.

Sectional aspect was evaluated, in a way similar to the above-mentioned one, thirdly, on the metal oxide thin film formed on an end portion of the above-mentioned 1500-mesh honeycomb cordierite base material by the methods described in Example 1. In the electron micrograph, shown in FIG. 36, of a section of metal oxide thin film obtained in Example 1, five measurement lines (lines 1 to 5), of 474.5 μm in total, were drawn on the thin film. The proportion of the length of parts where these measurement lines crossed the void spaces formed in the above-mentioned thin film was obtained. The proportion of dense part of the five measurement lines (lines 1 to 5) on the electron micrograph to the total length of the measurement lines is shown by the graph in FIG. 37.

Figure 37:
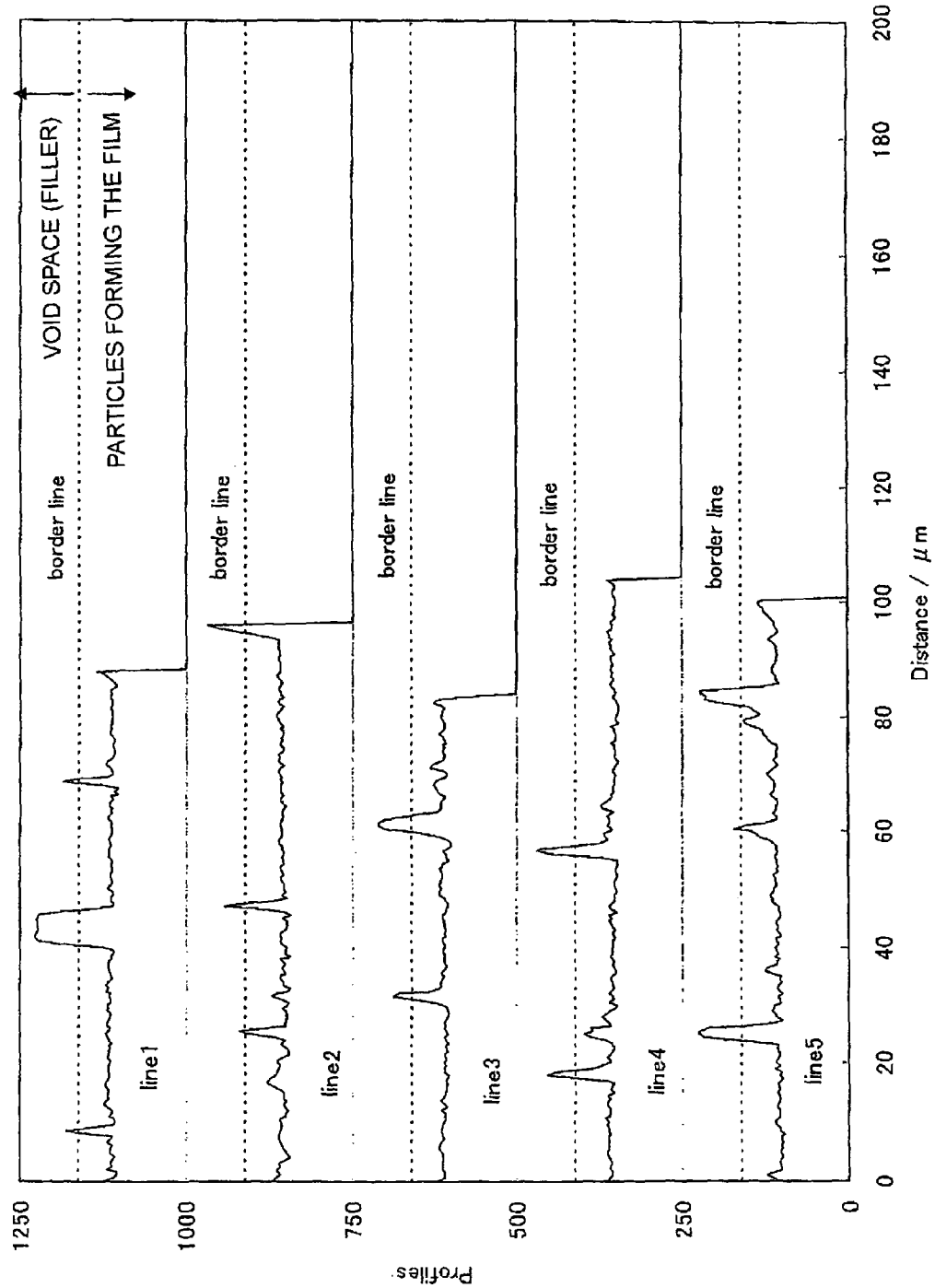
FIG. 37 is a graph showing the proportion of the dense colored part of the measurement line on the photograph shown in FIG. 36.

The results shown in FIG. 37 clearly indicate the following. In the metal oxide thin film (also in the end portion of the 1500-mesh base material) obtained in Example 1, the proportion of length of the parts where the above-mentioned measurement lines crossed the void spaces was 4.8%. This indicates that the metal oxide forming the thin film has a certain degree of continuity and has few void spaces.

Figure 38:
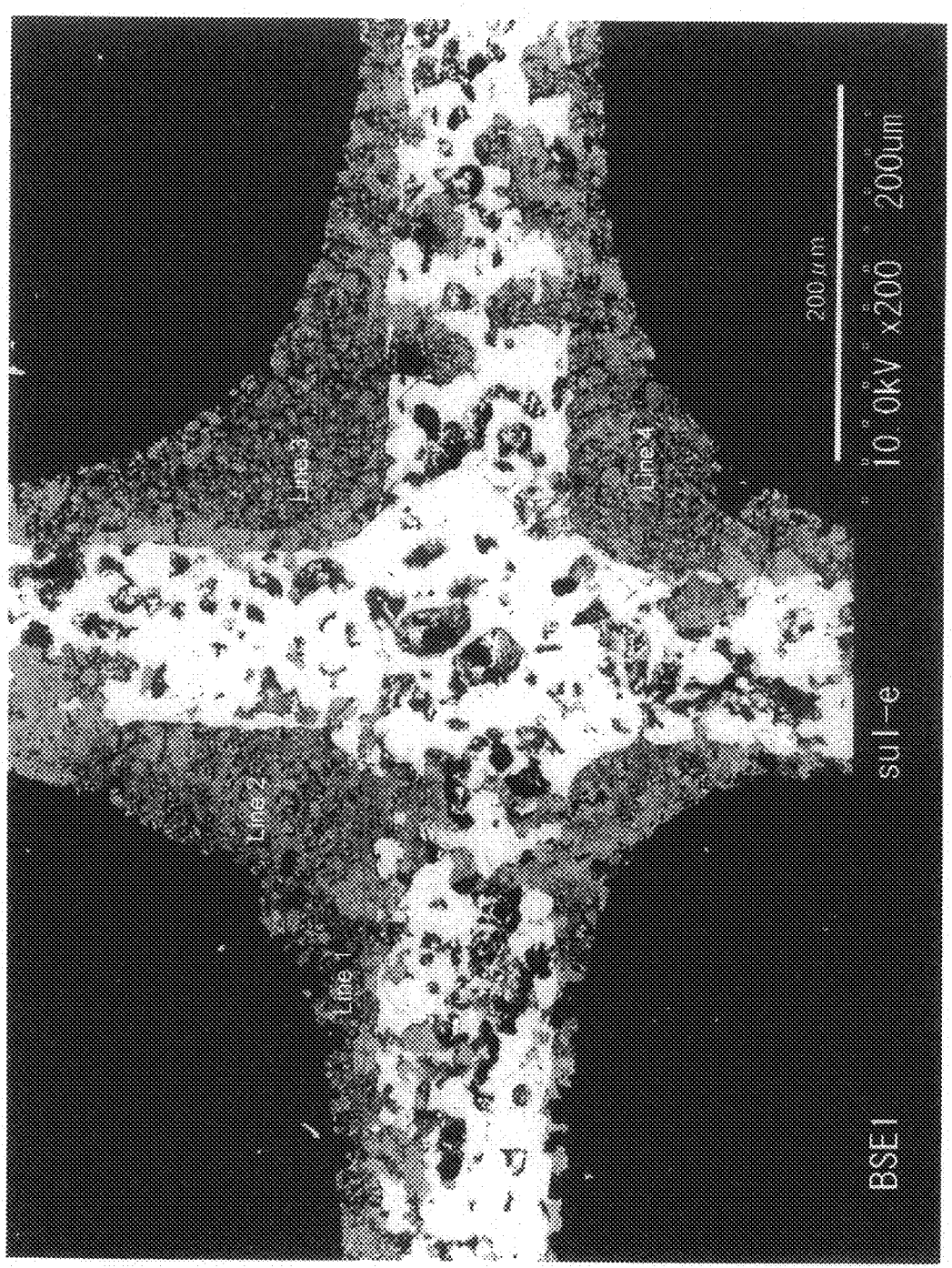
FIG. 38 is an electron micrograph showing a section (at an end portion of 400 mesh substrate) of the metal oxide thin film obtained in Comparative Example 10.

Sectional aspect was evaluated, in a way similar to the above-mentioned one, fourthly, on the metal oxide thin film formed on an end portion of the above-mentioned 400-mesh honeycomb cordierite base material by the method described in Comparative Example 10. In the electron micrograph, shown in FIG. 38, of a section of the metal oxide thin film obtained in Comparative Example 10, four measurement lines (lines 1 to 4), of 556.0 μm in total, were drawn on the thin film. The proportion of the length of parts where these measurement lines crossed the void spaces formed in the above-mentioned thin film was obtained. The proportion of dense parts of the four measurement lines (lines 1 to 4) on the electron micrograph to the total length of the measurement lines is shown by the graph in FIG. 39.

Figure 39:
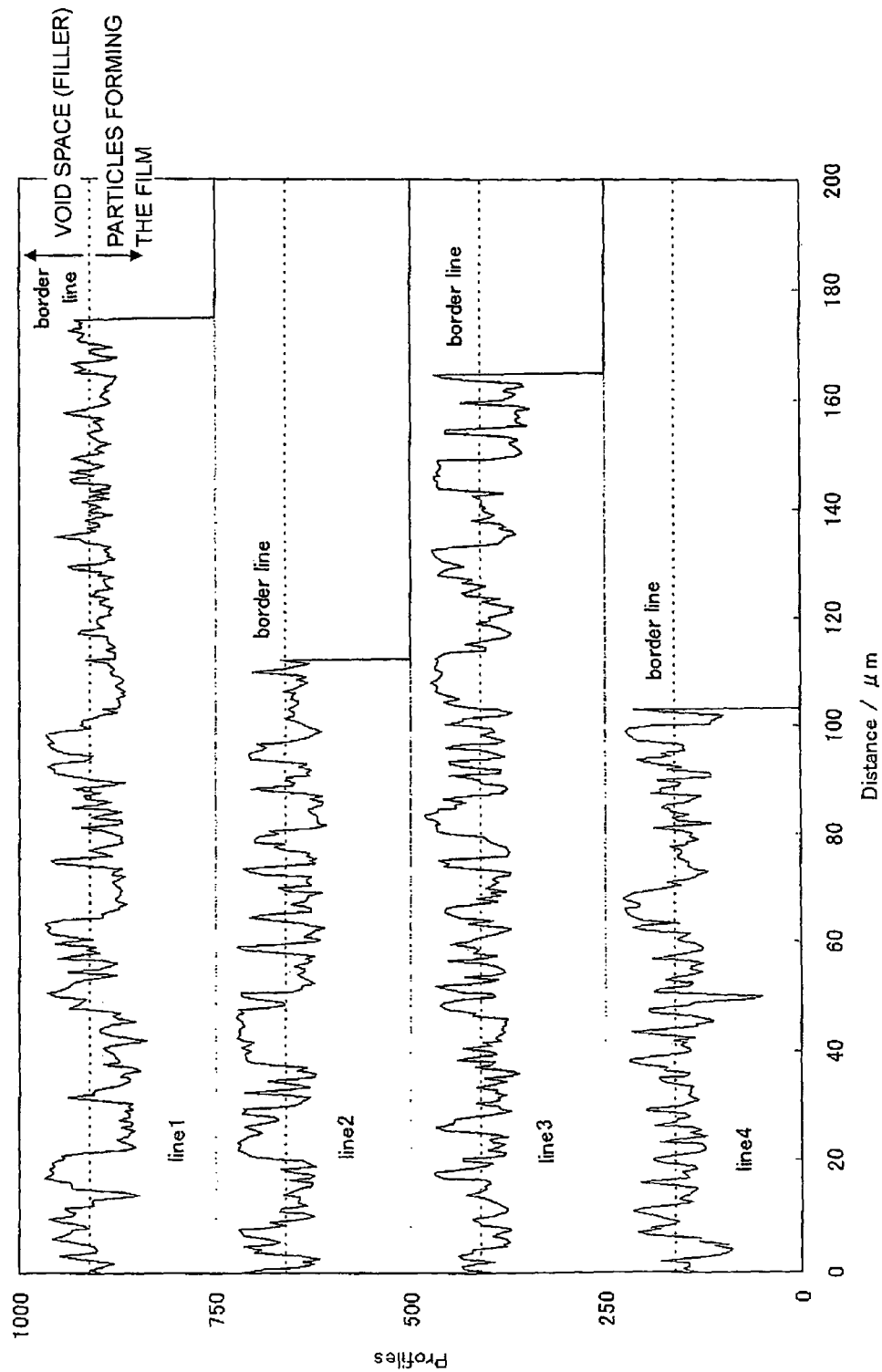
FIG. 39 is a graph showing the proportion of the dense colored part of the measurement line on the photograph shown in FIG. 39.

The results shown in FIG. 39 clearly indicate the following. In the metal oxide thin film (in the end portion of the 400-mesh base material) obtained in Comparative Example 10—obtained by using, as it was, a slurry containing a conventional alumina/ceria/zirconia compound metal oxide powder obtained by the coprecipitation method—the proportion of the length of the parts where the above-mentioned measurement lines crossed the void spaces was 42.4%. This indicates that the thin film has many void spaces.

Figure 40:
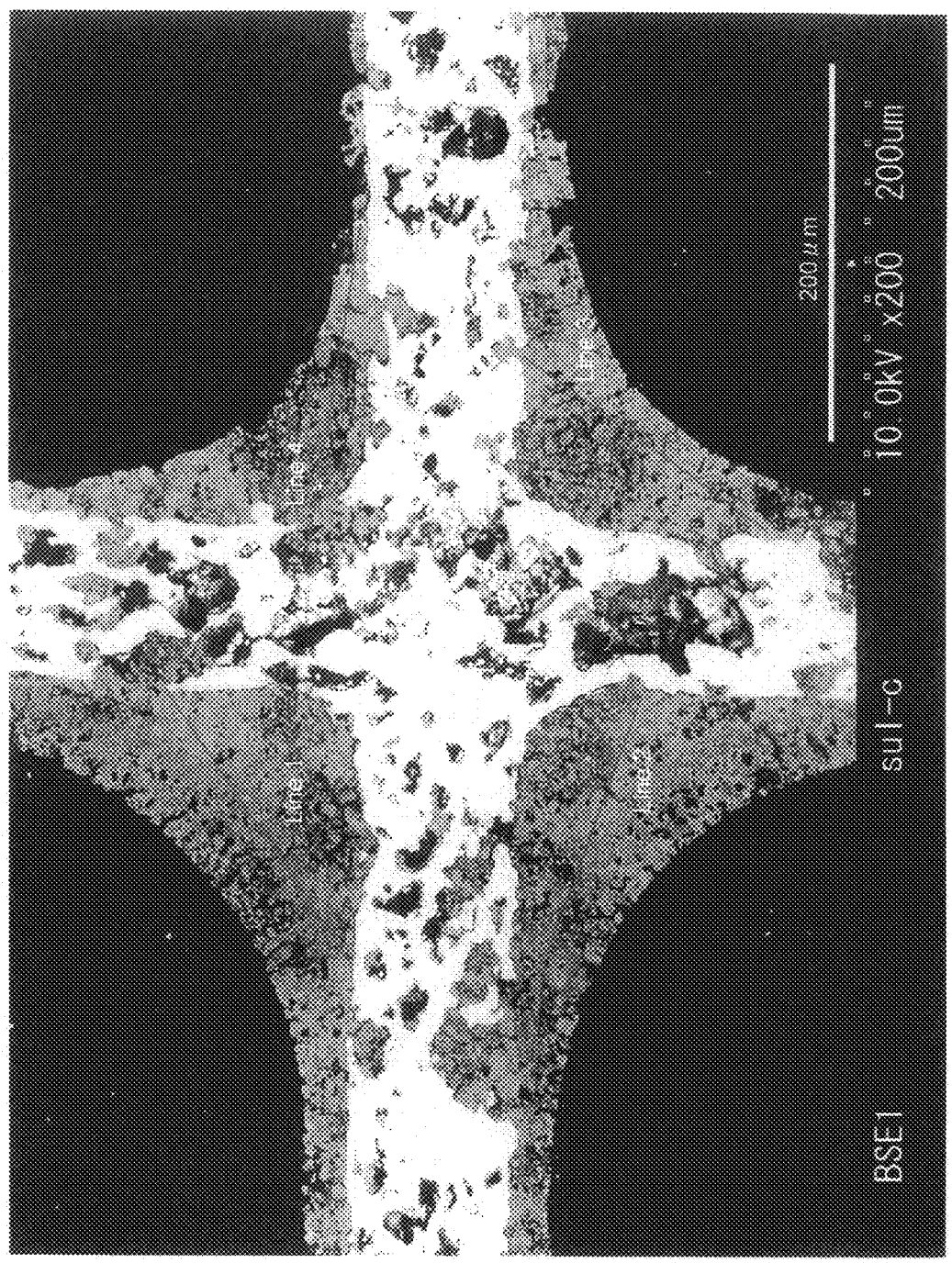
FIG. 40 is an electron micrograph showing a section (at a center portion of a 400 mesh substrate) of the metal oxide thin film obtained in Comparative Example 10.

Sectional aspect was evaluated, in a way similar to the above-mentioned one, fifthly, on the metal oxide thin film formed on a center portion of the above-mentioned 400-mesh honeycomb cordierite base material by the method described in Comparative Example 10. In the electron micrograph, shown in FIG. 40, of a section of the metal oxide thin film obtained in Comparative Example 10, four measurement lines (lines 1 to 4), of 628.5 μm in total, were drawn on the thin film. The proportion of the length of parts where these measurement lines crossed the void spaces formed in the above-mentioned thin film was obtained. The proportion of dense parts of the four measurement lines (lines 1 to 4) on the electron micrograph to the total length of the measurement lines is shown by the graph in FIG. 41.

Figure 41:
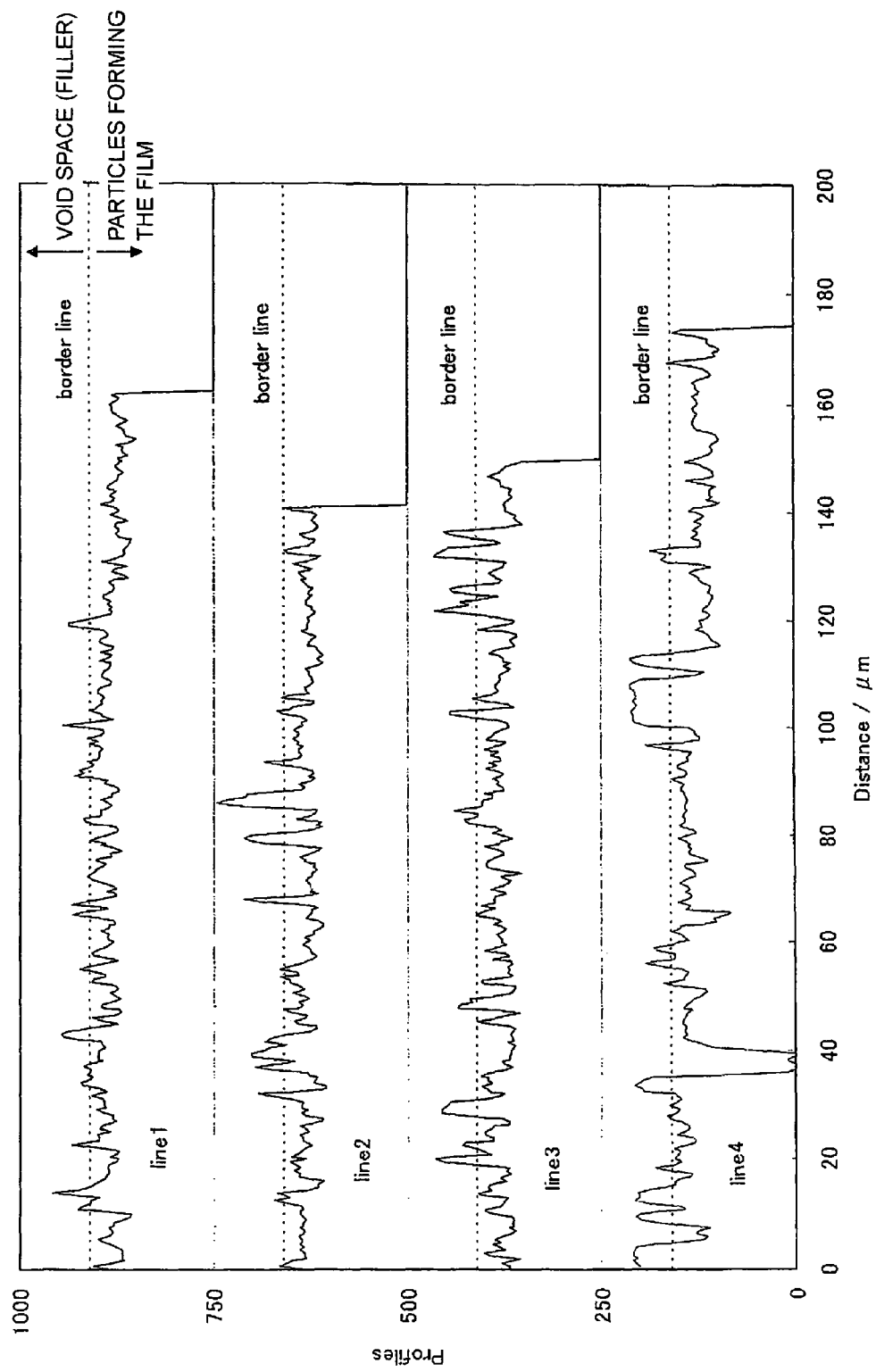
FIG. 41 is a graph showing the proportion of the dense colored part of the measurement line on the photograph shown in FIG. 40.

The results shown in FIG. 41 clearly indicate the following. In the metal oxide thin film (also in the center portion of the 400-mesh base material) obtained in Comparative Example 10, the proportion of the length of the parts where the above-mentioned measurement lines crossed the void spaces was 15.6%. This indicates that the thin film has many void spaces.

<Evaluation of Component Homogeneity 3: Condition (V)>

Figure 42:
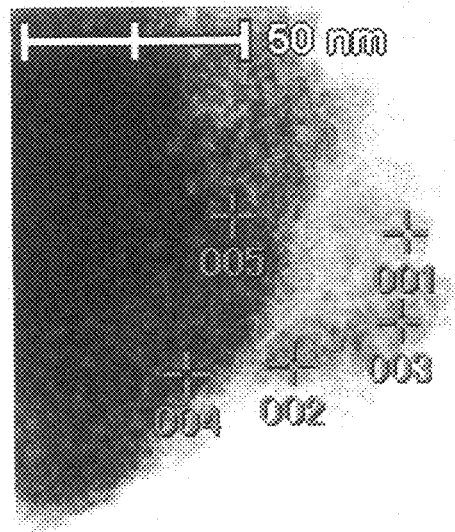
FIG. 42 is a transmission electron micrograph showing a measuring region of the metal oxide powder obtained in Example 4.
Figure 43:
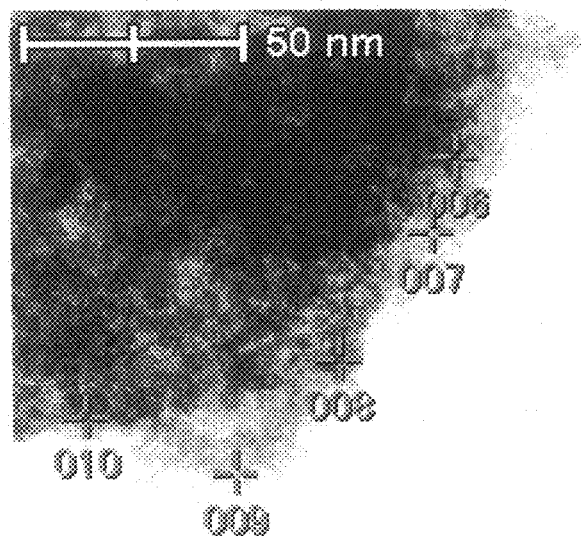
FIG. 43 is a transmission electron micrograph showing a measuring region of the metal oxide powder obtained in Example 4.

The component homogeneity was evaluated, in the way described below, firstly, on the metal oxide powder obtained by the method described in Example 4. Following the above-described measuring method, a spectrum of the metal oxide powder was obtained at each of the measuring points 001 to 010 (favorable measuring areas) in transmission electron micrographs, shown in FIGS. 42 and 43, of the metal oxide powder obtained in Example 4. It was obtained by energy dispersive X-ray spectroscopy using a transmission electron microscope (JEM-2010FEF by JEOL Ltd.) with an accelerating voltage of 200 kV and an electron beam diameter of 1.0 nm. Then, the integrated peak intensity of X-ray fluorescence was obtained for each of Al, Zr, and Ce contained in the powder. On the basis of the measurement results, the following values were calculated sequentially: X: the relative ratio of the above-described intensities; $X_m$: its mean value; $v_2$: the second moment around the mean value $X_m$; $v_2/X_m^2$: the second moment $v_2$ normalized by the mean value $X_m$ squared. Then, the sample was determined as to whether or not the sample satisfied the condition expressed by the formula (8).

Figure 44:
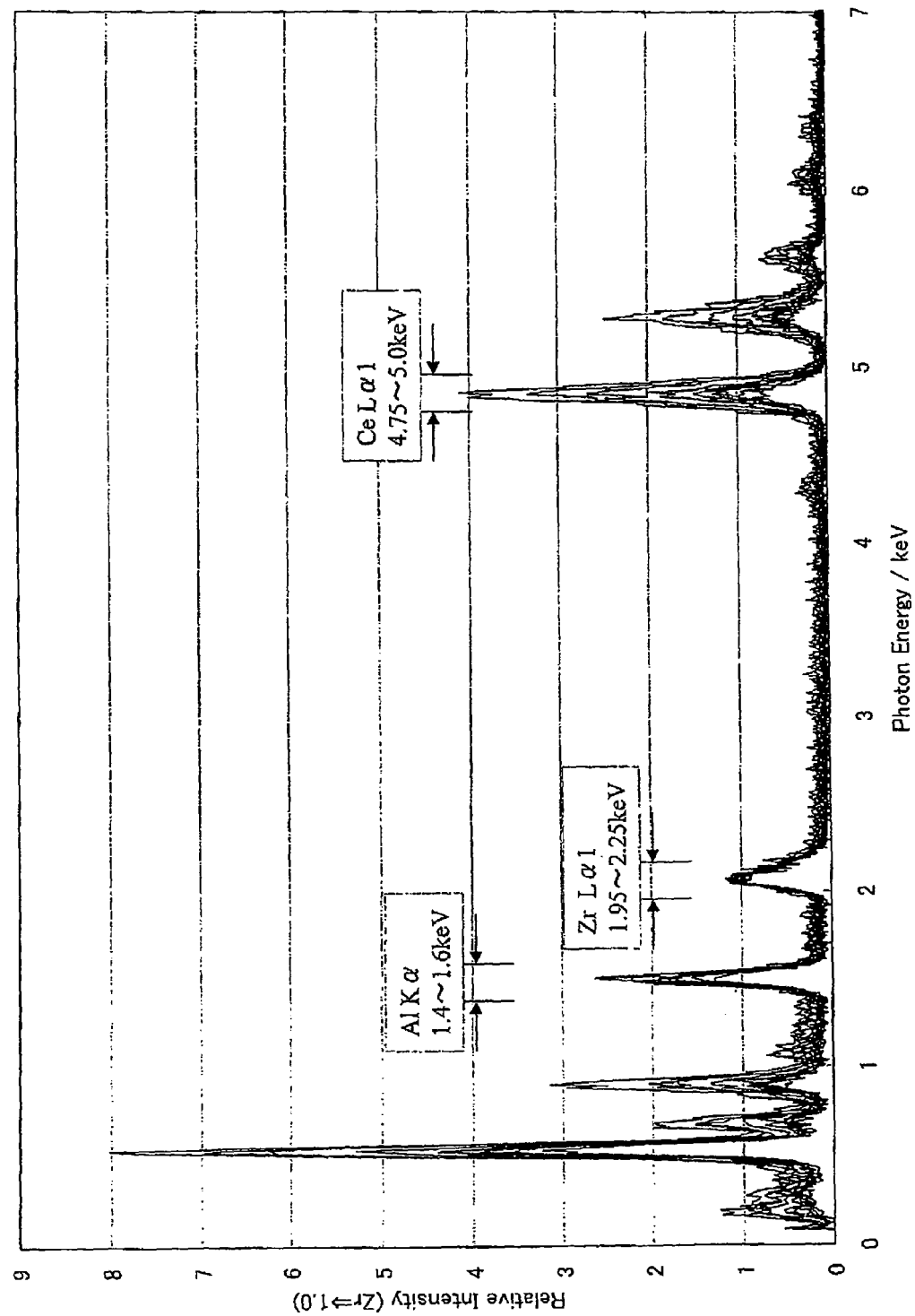
FIG. 44 is a graph showing spectra of energy dispersive X-ray fluorescence obtained for the metal oxide powder in Example 4.
Figure 45:
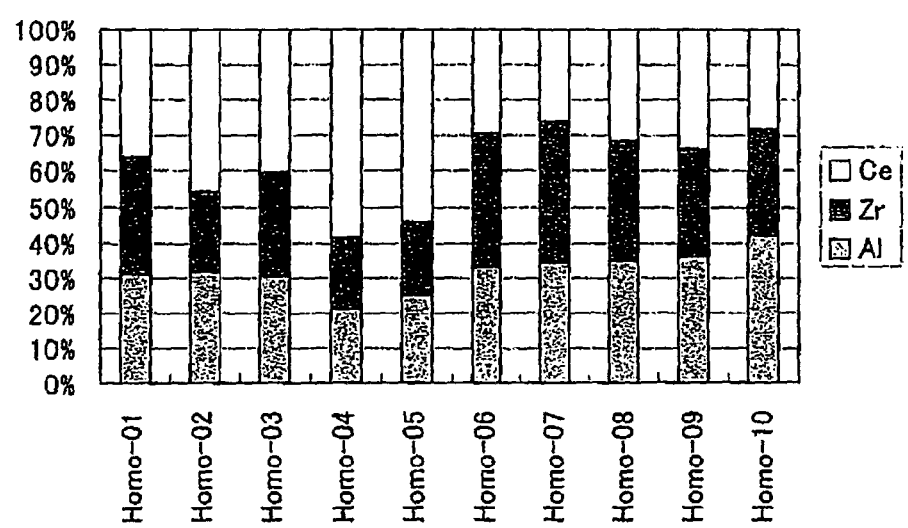
FIG. 45 is a graph showing the integrated peak intensity ratio of X-ray fluorescence obtained for the metal oxide powder in Example 4.

The spectra obtained, by the energy dispersive X-ray fluorescence spectroscopy, for the metal oxide powder of the Example 4 are shown in FIG. 44 (the measurement results at all the measurement points are superimposed on one another). The ratios of the integrated peak intensities of the X-ray fluorescence at the respective measurement points (Homo-01 to Homo-10) are shown in FIG. 45 and Table 8. The second moments normalized by the corresponding mean values $X_m$ squared, that is, $v_2/X_m^2$, are shown in Table 9.

TABLE 8

|    | Homo-01 | Homo-02 | Homo-03 | Homo-04 | Homo-05 | Homo-06 | Homo-07 | Homo-08 | Homo-09 | Homo-10 |
|----|---------|---------|---------|---------|---------|---------|---------|---------|---------|---------|
| Al | 0.311   | 0.317   | 0.306   | 0.209   | 0.246   | 0.332   | 0.340   | 0.348   | 0.359   | 0.419   |
| Zr | 0.332   | 0.226   | 0.290   | 0.207   | 0.213   | 0.375   | 0.399   | 0.339   | 0.303   | 0.299   |
| Ce | 0.357   | 0.457   | 0.404   | 0.584   | 0.541   | 0.293   | 0.261   | 0.313   | 0.338   | 0.282   |

TABLE 9

Second Moment Normalized by Square Mean Value

|  | Example 4 | Comparative Example 4 | Comparative Example 11 |
|---|---|---|---|
| Al | 0.030 | 0.427 | 0.183 |
| Zr | 0.045 | 0.426 | 0.099 |
| Ce | 0.076 | 0.239 | 0.156 |

The results shown in Table 9 clearly indicate the following fact concerning the metal oxide powder obtained in Example 4—obtained by mixing the metal salt solution at a high shear rate followed by a rapid drying and calcining process. All of the metal elements contained in the powder satisfied the condition expressed by the above-mentioned formula (8), and the metal oxides were dispersed in an extremely homogeneous manner in the powder.

The component homogeneity was evaluated, in a similar way to that described above, secondly, on the metal oxide powder obtained by the method described in Comparative Example 4. A spectrum of the metal oxide powder was obtained at each of the measuring points (15 favorable measuring areas) of the metal oxide powder obtained in Comparative Example 4. It was obtained by energy dispersive X-ray spectroscopy. Then, the integrated peak intensity of X-ray fluorescence was obtained for each of Al, Zr, and Ce contained in the powder. On the basis of the measurement results, the following values were calculated sequentially: X: the relative ratio of the above-described intensities; $X_m$: its mean value; $v_2$: the second moment around the mean value $X_m$; $v_2/X_m^2$: the second moment $v_2$ normalized by the mean value $X_m$ squared. Then, the sample was determined as to whether or not the sample satisfied the condition expressed by the formula (8).

Figure 46:
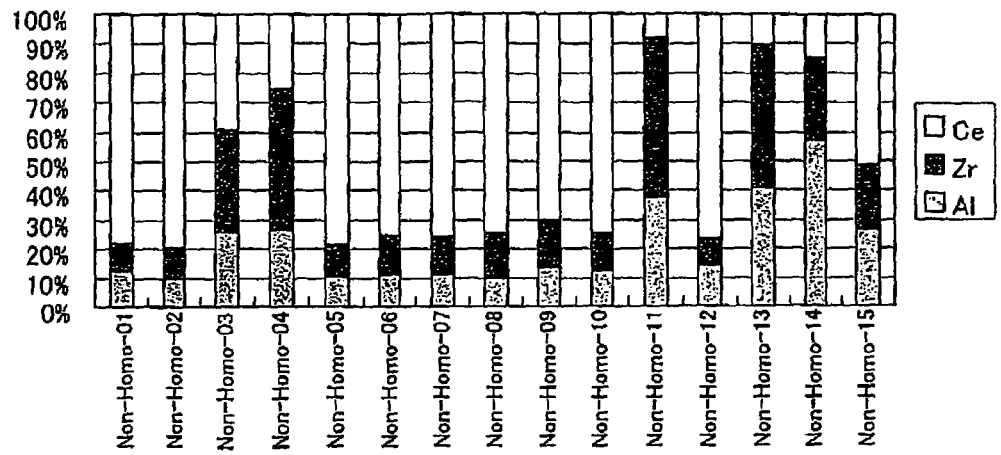
FIG. 46 is a graph showing the integrated peak intensity ratio of X-ray fluorescence obtained for the metal oxide powder in Comparative Example 4.

FIG. 46 and Table 10 show the ratios of the integrated peak intensities of the X-ray fluorescence obtained for the metal oxide powder of Comparative Example 4 at the respective measurement points (Non-Homo-01 to Non-Homo-15). Table 9 shows the second moments normalized by the respective mean values $X_m$ squared, that is, $v_2/X_m^2$.

TABLE 10

|  | Non-Homo-01 | Non-Homo-02 | Non-Homo-03 | Non-Homo-04 | Non-Homo-05 | Non-Homo-06 | Non-Homo-07 | Non-Homo-08 | Non-Homo-09 | Non-Homo-10 |
|---|---|---|---|---|---|---|---|---|---|---|
| Al | 0.121 | 0.096 | 0.258 | 0.264 | 0.105 | 0.108 | 0.113 | 0.099 | 0.133 | 0.122 |
| Zr | 0.100 | 0.109 | 0.352 | 0.482 | 0.110 | 0.140 | 0.129 | 0.154 | 0.166 | 0.132 |
| Ce | 0.779 | 0.795 | 0.390 | 0.254 | 0.785 | 0.752 | 0.758 | 0.747 | 0.700 | 0.747 |

|  | Non-Homo-11 | Non-Homo-12 | Non-Homo-13 | Non-Homo-14 | Non-Homo-15 |
|---|---|---|---|---|---|
| Al | 0.379 | 0.140 | 0.409 | 0.570 | 0.266 |
| Zr | 0.545 | 0.097 | 0.489 | 0.281 | 0.221 |
| Ce | 0.076 | 0.763 | 0.102 | 0.149 | 0.513 |

The results shown in Table 9 clearly indicate the following fact concerning the metal oxide powder obtained in Comparative Example 4 using the metal salt solution as it was. None of the metal elements contained in the powder satisfied the condition expressed by the above-mentioned formula (8).

The component homogeneity was evaluated, in the similar way to that described above, thirdly, on the metal oxide powder obtained by the method described in Comparative Example 11. A spectrum of the metal oxide powder was obtained at each of the measuring points (15 favorable measuring areas) of the metal oxide powder obtained in Comparative Example 11. It was obtained by energy dispersive X-ray spectroscopy. Then, the integrated peak intensity of X-ray fluorescence was obtained for each of Al, Zr, and Ce contained in the powder. On the basis of the measurement results, the following values were calculated sequentially: X: the relative ratio of the above-described intensities; $X_m$: its mean value; $v_2$: the second moment around the mean value $X_m$; $v_2/X_m^2$: the second moment $v_2$ normalized by the mean value $X_m$ squared. Then, the sample was determined as to whether or not the sample satisfied the condition expressed by the formula (8).

Figure 47:
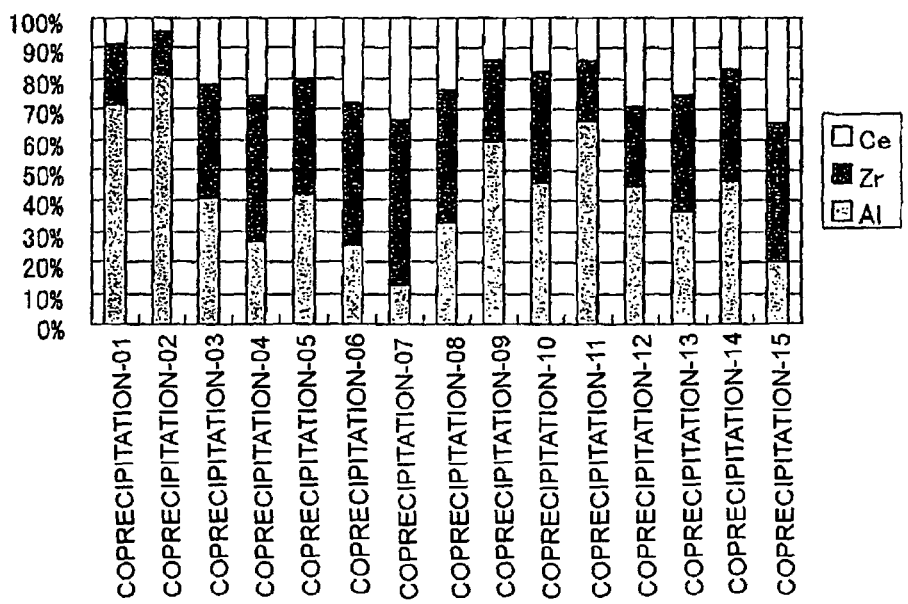
FIG. 47 is a graph showing the integrated peak intensity ratio of X-ray fluorescence obtained for the metal oxide powder in Comparative Example 11.
Figure 48:
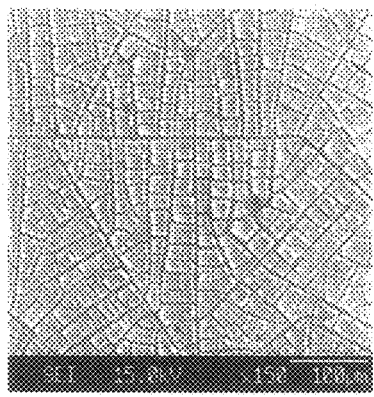
FIG. 48 is an optical micrograph showing the surface state of the metal oxide thin film obtained in Example 11.
Figure 49:
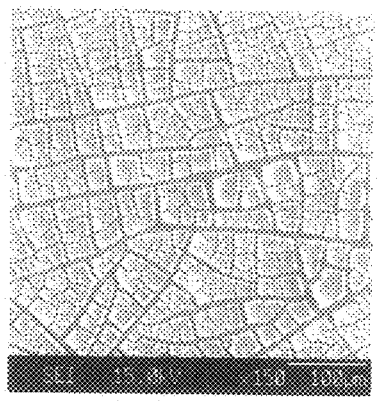
FIG. 49 is an optical micrograph showing the surface state of the metal oxide thin film obtained in Example 12.
Figure 50:
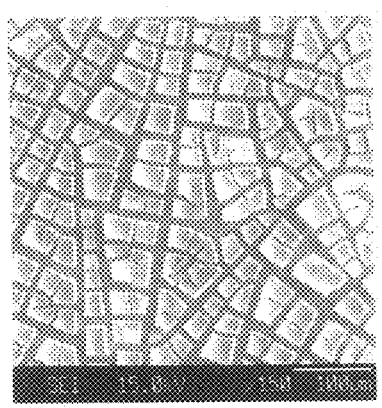
FIG. 50 is an optical micrograph showing the surface state of the metal oxide thin film obtained in Example 13.
Figure 51:
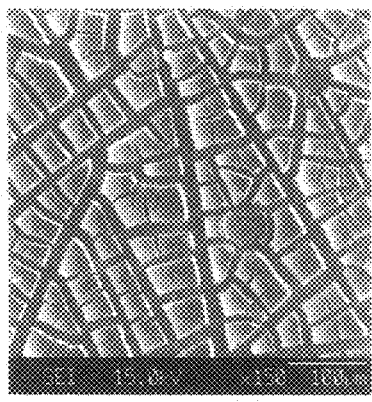
FIG. 51 is an optical micrograph showing the surface state of the metal oxide thin film obtained in Comparative Example 9.

FIG. 47 and Table 11 show the ratios of the integrated peak intensities of the X-ray fluorescence obtained for the metal oxide powder of the Comparative Example 11 at the respective measurement points (Coprecipitation-01 to Coprecipitation-15). Table 9 shows the second moments normalized by the respective mean values $X_m$ squared, that is, $v_2/X_m^2$.

TABLE 11

| | Co-precipitation-01 | Co-precipitation-02 | Co-precipitation-03 | Co-precipitation-04 | Co-precipitation-05 | Co-precipitation-06 | Co-precipitation-07 | Co-precipitation-08 |
|---|---|---|---|---|---|---|---|---|
| Al | 0.712 | 0.814 | 0.409 | 0.268 | 0.418 | 0.257 | 0.130 | 0.332 |
| Zr | 0.203 | 0.141 | 0.372 | 0.477 | 0.380 | 0.464 | 0.536 | 0.428 |
| Ce | 0.086 | 0.045 | 0.219 | 0.255 | 0.203 | 0.279 | 0.334 | 0.241 |

| | Co-precipitation-09 | Co-precipitation-10 | Co-precipitation-11 | Co-precipitation-12 | Co-precipitation-13 | Co-precipitation-14 | Co-precipitation-15 |
|---|---|---|---|---|---|---|---|
| Al | 0.592 | 0.460 | 0.656 | 0.447 | 0.363 | 0.462 | 0.204 |
| Zr | 0.265 | 0.364 | 0.203 | 0.260 | 0.383 | 0.366 | 0.448 |
| Ce | 0.143 | 0.176 | 0.141 | 0.293 | 0.253 | 0.172 | 0.349 |

The results shown in Table 9 clearly indicate the following fact concerning the metal oxide powder obtained in Comparative Example 11 using the conventional alumina/ceria/zirconia composite oxide powder obtained with the coprecipitation method. Few metal elements contained in the powder satisfied the condition expressed by the above-mentioned formula (8).

<Evaluation of Component Homogeneity 4>

The component homogeneity was evaluated, in the way described below, on each of the metal oxide thin films formed on the surfaces of the metal plates by the respective methods described in Examples 11 to 13 and Comparative Example 9. A measurement line with a length of 0.5 mm was arbitrarily drawn on the surface of each of the metal oxide thin films. The optical microscopic photographs shown in FIGS. 48 to 51 are respectively of the surfaces of the metal oxide thin films of Examples 11 to 13, and Comparative Example 9. Using an X-ray microanalyzer (JXA-8200 by JEOL Ltd.), with an accelerating voltage of 15 kV and an electron beam diameter of 1 μm, line analyses were carried out at measurement points on the measurement lines with respect to Al, Zr and Ce contained in the thin film and Fe contained in the base material. The value of K (K-value) at each measurement point, the mean value ($K_m$) of all the K-values at all the measurement points, and the value $\{|K-K_m|/K_m\}$ at each of the measuring points were obtained. Note that the parts corresponding to the cracks were determined by whether or not Fe contained in the base material was detected. The obtained results are shown in Table 12 and FIG. 52.

TABLE 12

| | Shear Rate | Proportion (%) of $|K - K_m|/K_m \leq 0.1$ | | | Mean Value $K_m$ (%) | | |
|---|---|---|---|---|---|---|---|
| | | Ce | Al | Zr | Ce | Al | Zr |
| Example 11 | 20000 sec$^{-1}$ | 0.935 | 0.623 | 0.636 | 20.57 | 8.27 | 18.37 |
| Example 12 | 10000 sec$^{-1}$ | 0.907 | 0.605 | 0.733 | 21.70 | 8.21 | 19.53 |
| Example 13 | 4000 sec$^{-1}$ | 0.858 | 0.292 | 0.325 | 21.60 | 8.81 | 17.87 |
| Comparative Example 9 | ≦10 sec$^{-1}$ | 0.821 | 0.200 | 0.358 | 20.07 | 7.77 | 18.08 |

Similarly, the component homogeneity was evaluated also on each of the metal oxide thin films formed on the surfaces of the metal plates by the respective methods described in Examples 14 to 16 and Comparative Example 12. The results thereof are shown in FIG. 13 and FIG. 53.

TABLE 13

| | Shear Rate | Proportion (%) of $|K - K_m|/K_m \leq 0.02$ | | | Mean Value $K_m$ (%) | | |
|---|---|---|---|---|---|---|---|
| | | Ce | Al | Zr | Ce | Al | Zr |
| Example 14 | 20000 sec$^{-1}$ | 0.877 | 0.637 | 0.911 | 25.11 | 16.00 | 16.68 |
| Example 15 | 10000 sec$^{-1}$ | 0.768 | 0.662 | 0.690 | 21.35 | 8.07 | 16.20 |
| Example 16 | 4000 sec$^{-1}$ | 0.796 | 0.502 | 0.632 | 21.17 | 8.12 | 16.09 |
| Comparative Example 12 | ≦10 sec$^{-1}$ | 0.770 | 0.548 | 0.746 | 21.03 | 8.02 | 16.15 |

Figure 52:
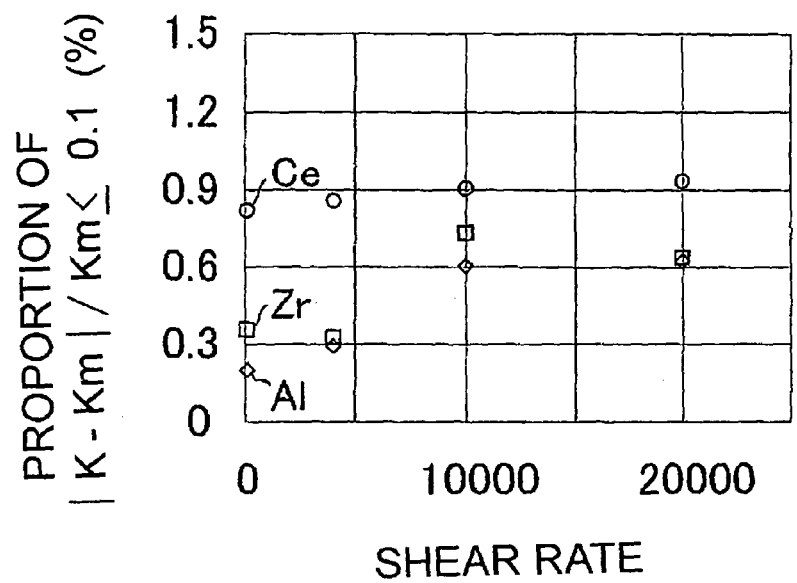
FIG. 52 is a graph showing the relationship between a shear rate and homogeneous dispersibility of the metal oxides in the mixing step.
Figure 53:
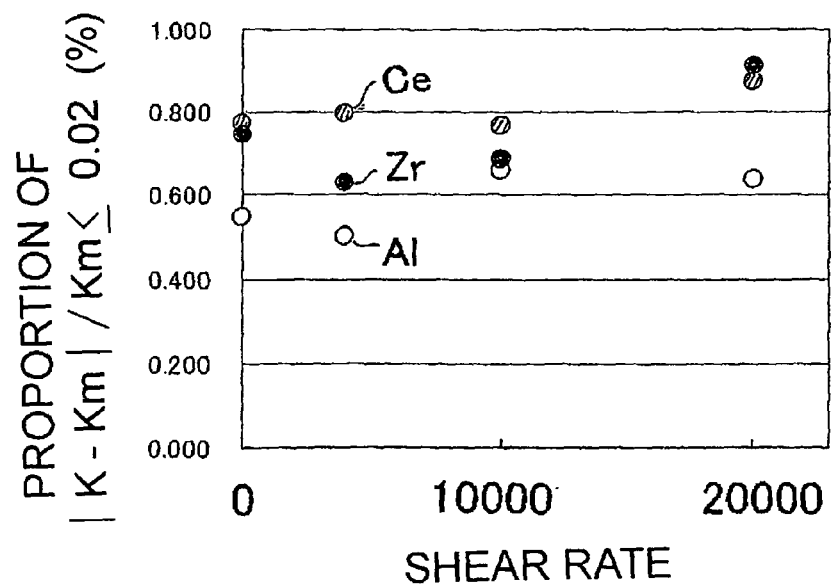
FIG. 53 is a graph showing the relationship between the shear rate and the homogeneous dispersibility of the metal oxides in the mixing step.

The results shown in Tables 12 and 13, and in FIGS. 52 and 53 clearly indicate that an increase in shear rate at the time of mixing source fluid composition made the metal oxide more homogeneously dispersed in the obtained metal oxide thin film. Especially, the metal oxides were prominently more dispersed with a shear rate of 10000 sec$^{-1}$ or faster.

<Evaluation of Component Homogeneity 5: Condition (I)>

Figure 54:
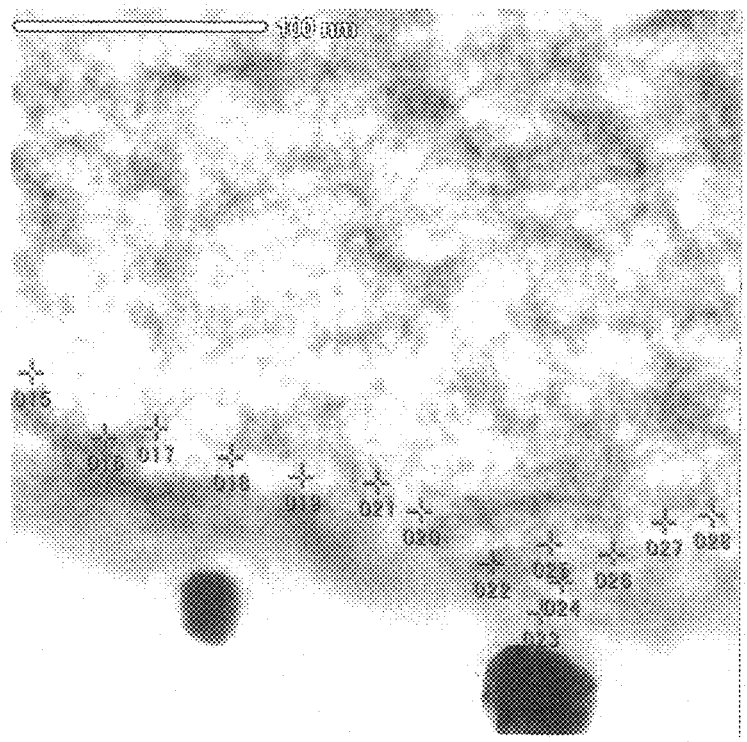
FIG. 54 is a transmission electron micrograph showing a measuring region of the metal oxide thin film obtained in Example 14.
Figure 55:
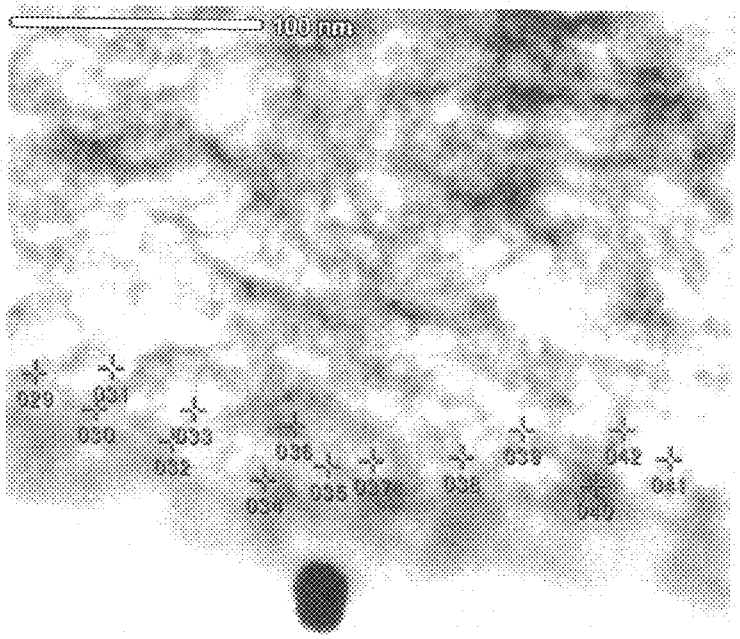
FIG. 55 is a transmission electron micrograph showing a measuring region of the metal oxide thin film obtained in Example 14.
Figure 56:
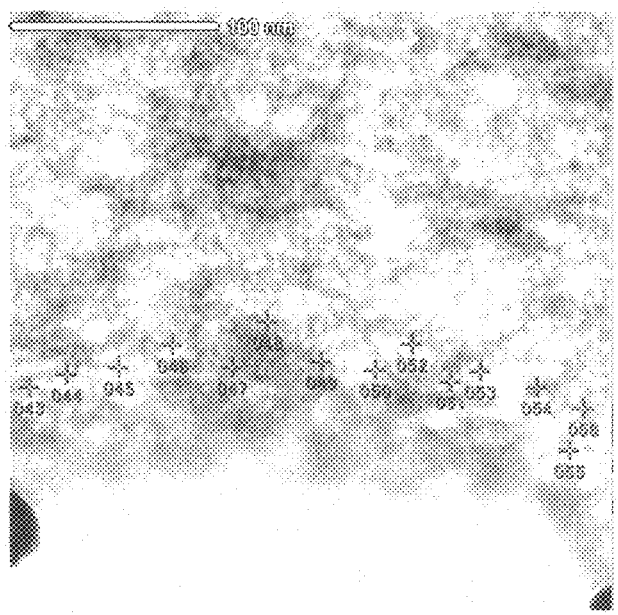
FIG. 56 is a transmission electron micrograph showing a measuring region of the metal oxide thin film obtained in Example 14.

The component homogeneity was evaluated, in the way described below, firstly, on the metal oxide thin film obtained by the method described in Example 14. Following the above-described measuring method of the condition (I), a spectrum of the metal oxide thin film was obtained at each of the measuring points satisfying the condition mentioned below (favorable measuring areas) in transmission electron microscopic photographs, shown in FIGS. 54 to 56, of the metal oxide thin film obtained in Example 14. The spectrum was obtained by energy dispersive X-ray spectroscopy using a transmission electron microscope (JEM-2010FEF, JEOL Ltd.) with an accelerating voltage of 200 kV and an electron beam diameter of 1.0 nm. Then, the integrated peak intensity of X-ray fluorescence was obtained for each of Al, Zr and Ce, all of which were contained in the thin film.

With respect to the thickness of the sample, the appropriate regions for observation by transmission electron microscope were selected as follows. Such regions of the sample to be tested had to have a thickness deemed to be approximately uniform. They were selected on the basis of the total number of X-ray counts obtained by an EDX detector, and the regions of 10000 counts to 60000 counts were selected as the regions appropriate for the measurement.

On the basis of the measurement results, the following values were calculated sequentially: X: the relative ratio of the above-described intensities; $X_m$: its mean value; $v_2$: the second moment around the mean value $X_m$; $v_2/X_m^2$: the second moment $v_2$ normalized by the mean value $X_m$ squared. Then, the sample was determined as to whether or not the sample satisfied the condition expressed by the formula (1).

Figure 57:
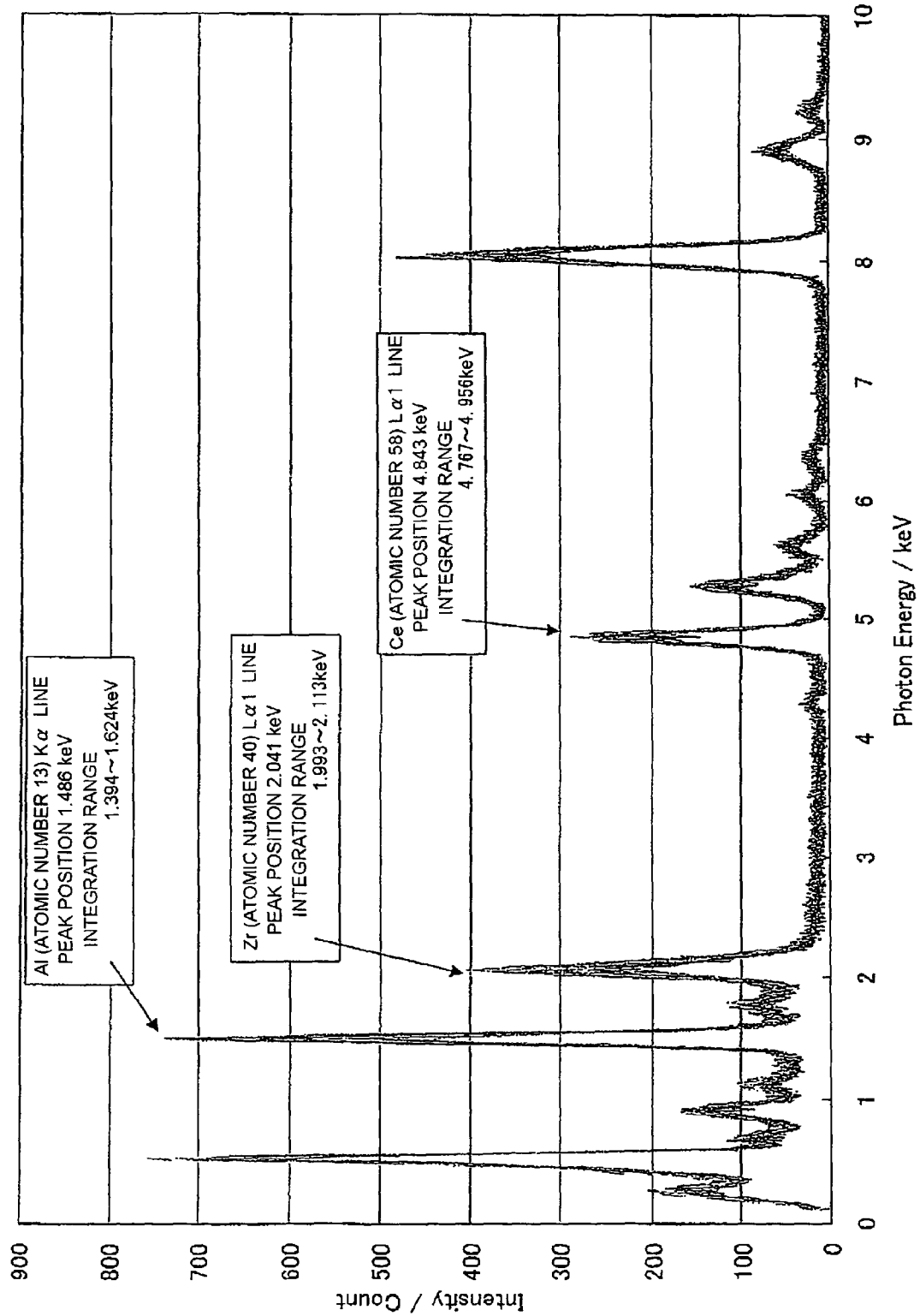
FIG. 57 is a graph showing spectra of energy dispersive X-ray fluorescence obtained for the metal oxide thin film in Example 14.
Figure 58:
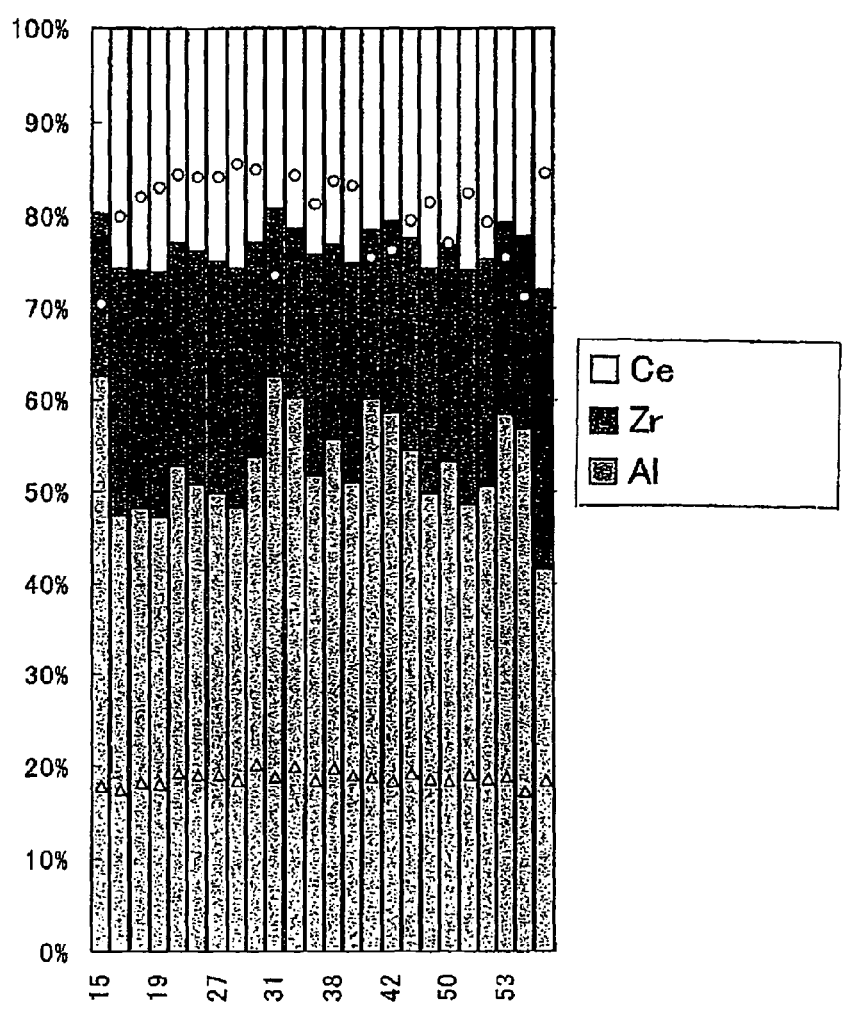
FIG. 58 is a graph showing the integrated peak intensity ratio of X-ray fluorescence obtained for the metal oxide thin film in Example 14.

The spectra obtained, by the energy dispersive X-ray fluorescence spectroscopy, for the metal oxide thin film of the Example 14 are shown in FIG. 57 (the measurement results at all the measurement points are superimposed on one another). Note that each of the limits of peak integration range is defined, in FIG. 57, as the midpoint between two peak positions of the respective elements with atomic numbers adjacent to each other.

The values of $v_2/X_m^2$—the second moment normalized by the mean value $X_m$ squared—thus obtained are shown in Table 14.

In addition, the component homogeneity was evaluated, in a similar way to that mentioned above, on each of the metal oxide thin films obtained by the respective methods described in Example 24, and Comparative Examples 12 and 20, and on each of the metal oxide powders obtained by the respective methods described in Example 17 and Comparative Example 13. The results obtained for each of them are shown in Table 14.

TABLE 14

| | Second Moment Normalized by Square Mean Value | | |
|---|---|---|---|
| | Al | Zr | Ce |
| Example 14 | 0.0099 | 0.0181 | 0.0090 |
| Comparative Example 12 | 0.0185 | 0.0373 | 0.0223 |
| Example 17 | 0.0068 | 0.0186 | 0.0192 |
| Comparative Example 13 | 0.0712 | 0.2448 | 0.4100 |
| Example 24 | 0.0110 | 0.0199 | 0.0019 |
| Comparative Example 20 | 0.1451 | 0.2668 | 0.0910 |

Moreover, the component homogeneity was evaluated, in a similar way to that mentioned above, on each of the metal oxide thin films obtained by the respective methods described in Example 18 and Comparative Example 14. The results obtained for each of them are shown in Table 15.

TABLE 15

| | Second Moment Normalized by Square Mean Value | | |
|---|---|---|---|
| | Al | Zr | La |
| Example 18 | 0.0055 | 0.0172 | 0.0180 |
| Comparative Example 14 | 0.0180 | 0.0687 | 0.0371 |

Furthermore, the component homogeneity was evaluated, in a similar way to that mentioned above, on each of the metal oxide thin films obtained by the respective methods described in Example 19 and Comparative Example 15. The results obtained for each of them are shown in Table 16.

TABLE 16

| | Second Moment Normalized by Square Mean Value | | |
|---|---|---|---|
| | Al | Zr | Y |
| Example 19 | 0.0134 | 0.0196 | 0.0167 |
| Comparative Example 15 | 0.0351 | 0.1007 | 0.0593 |

Still Furthermore, the component homogeneity was evaluated, in a similar way to that mentioned above, on each of the metal oxide thin films obtained by the respective methods described in Example 22 and Comparative Example 18. The results obtained for each of them are shown in Table 17.

TABLE 17

| | Second Moment Normalized by Square Mean Value | | |
|---|---|---|---|
| | Al | Zr | Ti |
| Example 22 | 0.0060 | 0.0189 | 0.0177 |
| Comparative Example 18 | 0.0162 | 0.0345 | 0.4099 |

The results shown in Tables 14 to 17 clearly indicate the following. In the metal oxide thin films obtained in Examples 14, 18, 19, 22 and 24, and in the metal oxide powder obtained in Example 17, in all of these cases the method of the present invention being employed, all of the metal elements contained in each metal oxide satisfied the condition expressed by the above-mentioned formula (1) and the metal oxides were dispersed in an extremely homogeneous manner. In contrast, neither in the metal oxide thin films obtained in Comparative Examples 12, 14, 15, 18 and 20, nor in the metal oxide powder obtained in the Comparative Example 13, in none of which the mixing at a high shear rate was carried out, the condition expressed by the above-mentioned formula (1) was satisfied.

<Evaluation of Component Homogeneity 6: Condition (II)>

The component homogeneity was evaluated, in a similar way to that of the above-described case of Evaluation of Component Homogeneity 2, on each of the metal oxide thin films obtained by the respective methods described in Examples 19, 21, 22 and 23, and Comparative Examples 15, 17, 18 and 19. The results obtained for each of them are shown in Tables 18 to 21.

TABLE 18

| | Proportion (%) of $|K - K_m|/K_m \leq 0.02$ | | | Mean Value $K_m$ K-value (%) | | |
|---|---|---|---|---|---|---|
| | Y | Al | Zr | Y | Al | Zr |
| Example 19 | 0.661 | 0.770 | 0.757 | 15.57 | 12.82 | 26.56 |
| Comparative Example 15 | 0.535 | 0.783 | 0.528 | 15.25 | 13.11 | 26.24 |

TABLE 19

| | Proportion (%) of $|K - K_m|/K_m \leq 0.02$ | | Mean Value $K_m$ K-value (%) | |
|---|---|---|---|---|
| | Ba | Al | Ba | Al |
| Example 21 | 0.761 | 0.845 | 20.52 | 15.92 |
| Comparative Example 17 | 0.578 | 0.254 | 24.60 | 15.05 |

TABLE 20

| | Proportion (%) of $\|K - K_m\|/K_m \leq 0.02$ | | | Mean Value $K_m$ K-value (%) | | |
|---|---|---|---|---|---|---|
| | Ti | Al | Zr | Ti | Al | Zr |
| Example 22 | 0.678 | 0.736 | 0.655 | 12.32 | 11.16 | 28.47 |
| Comparative Example 18 | 0.120 | 0.300 | 0.349 | 5.73 | 16.84 | 27.01 |

TABLE 21

| | Proportion (%) of $\|K - K_m\|/K_m \leq 0.02$ | | Mean Value $K_m$ K-value (%) | |
|---|---|---|---|---|
| | Fe | Al | Fe | Al |
| Example 23 | 0.851 | 0.753 | 23.39 | 18.03 |
| Comparative Example 19 | 0.520 | 0.594 | 23.91 | 17.14 |

The results shown in Tables 18 to 21 clearly indicate the following fact concerning the metal oxide thin films obtained in Examples 19, 21, 22 and 23—obtained by mixing the colloidal solution at a high shear rate, and by applying it to the base material, followed by a rapid drying and calcining process. All of the metal elements contained in each of the thin films satisfied the condition expressed by the above-mentioned formula (3) at 65% or higher of all the measurement points, and the metal oxides were dispersed in an extremely homogeneous manner in each of the thin films. In contrast, the results clearly indicate the following fact concerning the metal oxide thin films obtained in Comparative Examples 15, 17, 18 and 19 by using the colloidal solution as it was. At least part of the metal elements contained in each of the thin films satisfied the condition expressed by the above-mentioned formula (3) only at lower than 65% of all the measurement points.

<Heat Resistance Test 1>

Heat resistance was evaluated on each of the metal oxide thin films formed on the above-mentioned metal plates (coated materials) by the respective methods described in Examples 1 and 3, and Comparative Examples 1, 3 and 10. The evaluation was undertaken in the following way: heating each of the metal oxide thin films in an oxidizing atmosphere (in the air) up to 500° C., 900° C. or 1000° C.; maintaining it for 5 hours; and then measuring its specific surface area (BET specific surface area).

Figure 59:
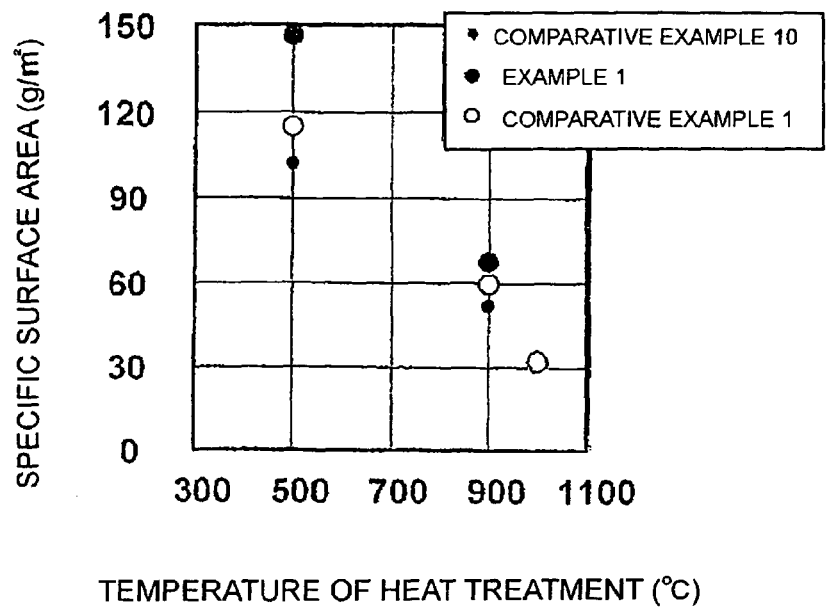
FIG. 59 is a graph showing the results of a heat resistance test (comparison among Example 1, Comparative Example 1 and Comparative Example 10).
Figure 60:
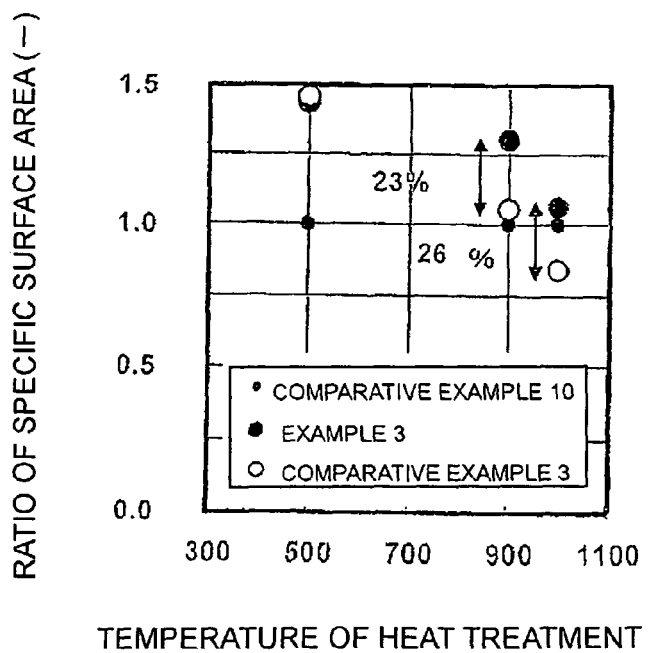
FIG. 60 is a graph showing the results of the heat resistance test (comparison among Example 3, Comparative Example 3 and Comparative Example 10).

The obtained results are shown in FIG. 59 (comparison among Example 1, and Comparative Examples 1 and 10) and in FIG. 60 (comparison among Example 3, and Comparative Examples 3 and 10). Note that the results shown in FIG. 60 are in relative terms, taking each of the specific surface areas of the metal oxide thin films obtained in Comparative Example 10 as one. The results shown in FIGS. 59 and 60 clearly indicate that there was a significant improvement in heat resistance of each of the metal oxide thin films of the present invention, obtained by mixing the colloidal solutions at a high shear rate, and by applying it to the base material, followed by a rapid drying and calcining process.

<Heat Resistance Test 2>

Heat resistance was evaluated on each of the metal oxide powders obtained by the respective methods described in Examples 4 and 5, and Comparative Examples 4 and 5. The evaluation was undertaken in the following way: heating each of the metal oxide powders in an oxidizing atmosphere (in the air) up to 900° C.; maintaining it for 5 hours; and then measuring its specific surface area (BET specific surface area). The obtained results are as follows.

Example 4: BET specific surface area=67.8 m$^2$/g;
Comparative Example 4: BET specific surface area 54.9 m$^2$/g;
Example 5: BET specific surface area=54.7 m$^2$/g; and
Comparative Example 5: BET specific surface area=54.0 m$^2$/g.

The above results indicate that, at 900° C., there was a significant improvement in heat resistance of each of the metal oxide powders of the present invention obtained by mixing the metal salt solutions at a high shear rate, followed by a rapid drying and calcining process. In addition, the comparison between the results of Example 4 and the results of Example 5 indicate that a mixing of the metal salt solutions at a high shear rate followed by a rapid drying and calcining process improved significantly the heat resistance of the obtained metal oxide powder.

<Heat Resistance Test 3>

Heat resistance was evaluated on each of the metal oxide powders obtained by the respective methods described in Examples 4 and 8, and Comparative Example 11. The evaluation was undertaken in the following way: heating each of the metal oxide powders in an oxidizing atmosphere (in the air) up to 500° C., 900° C. or 1000° C.; maintaining it for 5 hours; and then measuring its specific surface area (BET specific surface area). The obtained results are shown in FIG. 61 (comparison among Example 4, and Comparative Example 11) and in FIG. 62 (comparison between Example 8 and Comparative Example 11).

Figure 61:
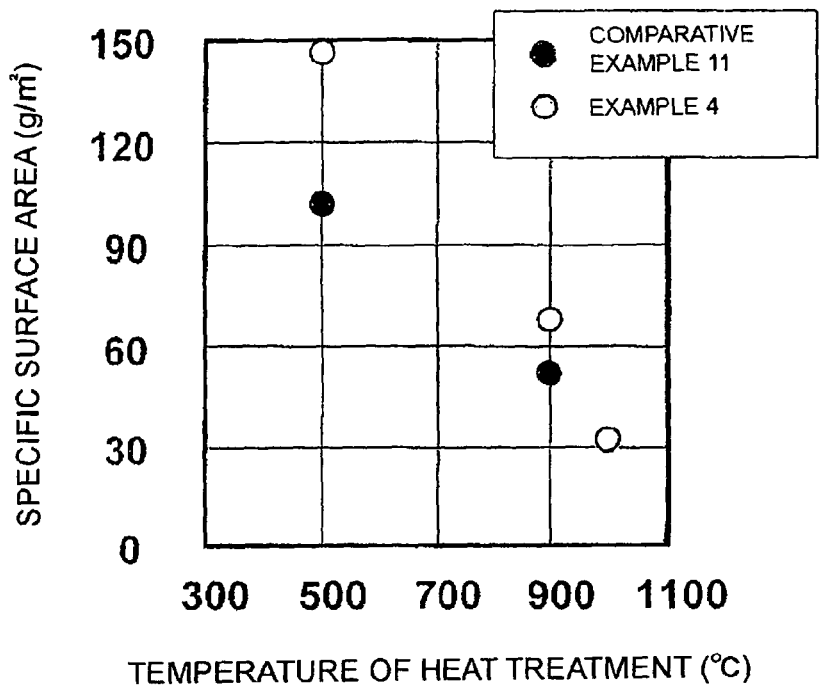
FIG. 61 is a graph showing the results of the heat resistance test (comparison between Example 4 and Comparative Example 11).
Figure 62:
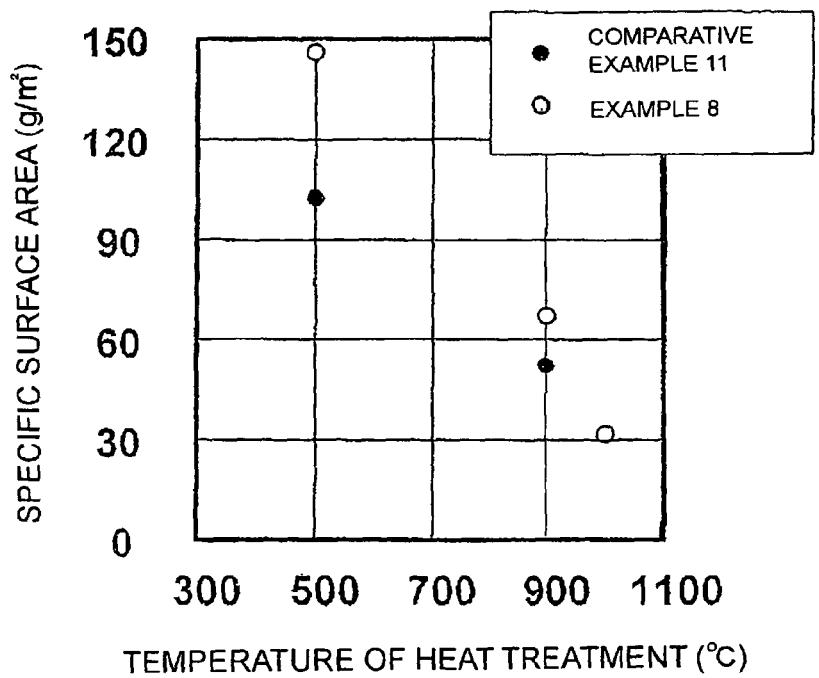
FIG. 62 is a graph showing the results of the heat resistance test (comparison between Example 8 and Comparative Example 11).

The results shown in FIGS. 61 and 62 clearly indicate that there was a significant improvement in heat resistance, especially at 500° C. and 900° C., of each of the metal oxide powders of the present invention, obtained by mixing the metal salt solutions at a high shear rate, followed by a rapid drying and calcining process.

<Heat Resistance Test 4>

Heat resistance was evaluated on each of the metal oxide powders obtained by the respective methods described in Examples 8 and 9, and Comparative Examples 7 and 8. The evaluation was undertaken in the following way: heating each of the metal oxide powders in an oxidizing atmosphere (in the air) up to 900° C.; maintaining it for 5 hours; and then measuring its specific surface area (BET specific surface area). The obtained results are as follows.

Example 8: BET specific surface area=67.9 m$^2$/g;
Comparative Example 7: BET specific surface area=55.0 m$^2$/g;
Example 9: BET specific surface area=54.8 m$^2$/g; and
Comparative Example 8: BET specific surface area=54.1 m$^2$/g.

The above results indicate that, at 900° C., there was a significant improvement in heat resistance of each of the metal oxide powders of the present invention, obtained by mixing the metal salt solutions at a high shear rate, followed by a rapid drying and calcining process. In addition, the comparison between the results of Example 8 and the results of Example 9 indicate that a mixing of the metal salt solutions at a high shear rate followed by a rapid drying and calcining process improved significantly the heat resistance of the obtained metal oxide powder.

<Reforming Activity Maintenance Test>

Reforming Activity Maintenance was evaluated, in a way described below, on each of the metal oxide thin films formed on the above-mentioned metal high-density honeycomb by the respective methods described in Example 1 and Comparative Example 2. Firstly, each metal high-density honeycomb made to support an metal oxide thin film was dipped in a Rh solution for an hour. The metal high-density honeycombs were taken out, and then the excess solution was removed from the surface of each of the honeycombs with gravity and by shaking. The metal high-density honeycombs were placed horizontally, and then dried gently at room temperature for 5 minutes to 10 minutes. Another drying process followed, using hot air (at 60° C. to 100° C.) which blew at 2 m/s to 5 m/s for 5 minutes to 10 minutes. Furthermore, calcination was carried out in the air atmosphere at 300° C. for approximately 60 minutes, followed by a cooling process with a room-temperature wind blowing at 2 m/s to 5 m/s for 5 minutes to 10 minutes. These processes, being repeated three times, made 0.1 g rhodium to be supported by each of the metal high-density honeycombs, by which a metal oxide thin film was supported.

Subsequently, each metal high-density honeycomb was heated in an infrared image furnace. As the reformed fuel, isooctane was used. The activity maintenance in reforming was tested under the condition of space velocity at 25000 $h^{-1}$, steam/carbon=2 and oxide/carbon=0.1. As the temperature condition, the outlet temperature was set at 600° C. As the measuring item, outlet gas components ($H_2$, CO, $CO_2$, $N_2$, $CH_4$, HC and $H_2O$) are measured. Based on the concentration of each component in outlet gas, the conversion ratio is calculated according to the formula below.

Conversion ratio (%)=(carbon in CO, $CO_2$ and $CH_4$)/(carbon in isooctane)

Figure 63:
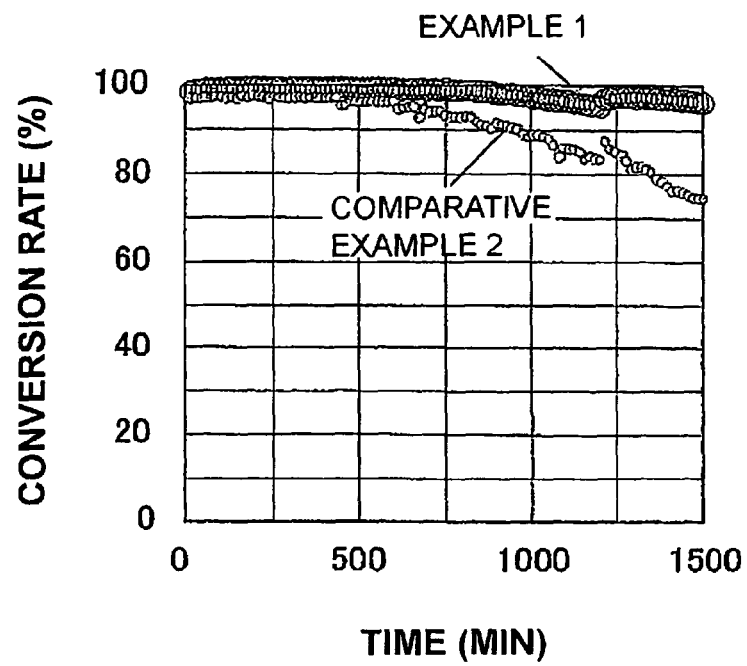
FIG. 63 is a graph showing the results of the reforming activity maintenance test.

The obtained results are shown in FIG. 63. The results shown in FIG. 63 clearly indicate that there was a significant improvement in reforming activity maintenance of the metal oxide thin film of the present invention, obtained by mixing the colloidal solutions at a high shear rate, and by applying it to the base material, followed by a rapid drying and calcining process.

<Adhesion Test>

Adhesion was evaluated, in a way described below, on each of the metal oxide thin films (coating) formed on the above-mentioned metal plates by the respective methods described in Examples 1 and 10, and Comparative Example 2. Each base plate with the metal oxide thin film formed on the surface thereof was subjected to ultrasonic vibration in an ultrasonic cleaner. Each vibration process lasted for 30 minutes and the process was carried out four times. At each interval, the ratio (by weight) of remaining thin film was measured.

Figure 64:
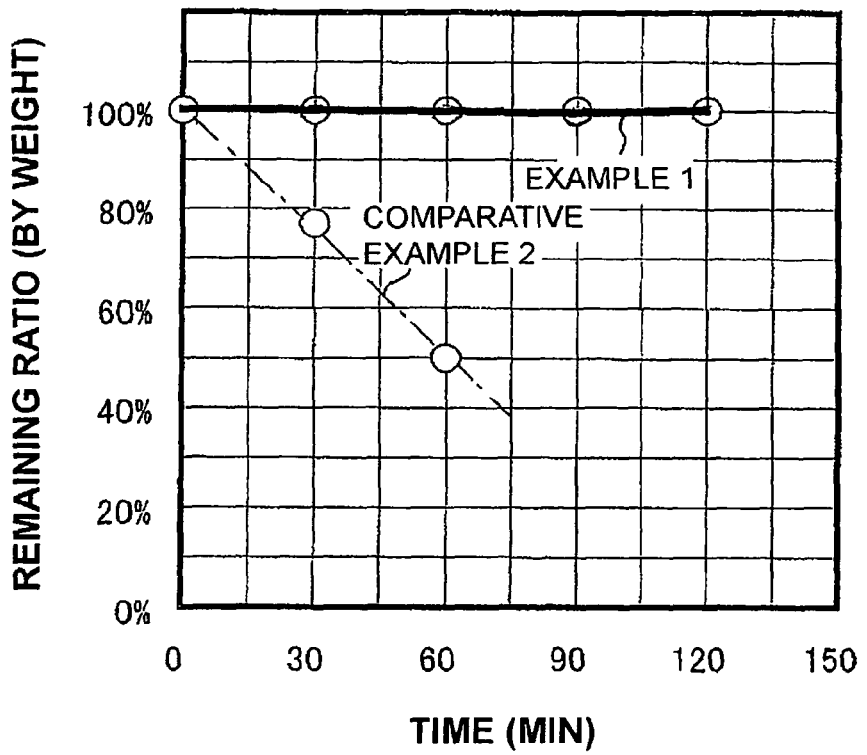
FIG. 64 is a graph showing the results of the adhesion test (comparison between Example 1 and Comparative Example 2).
Figure 65:
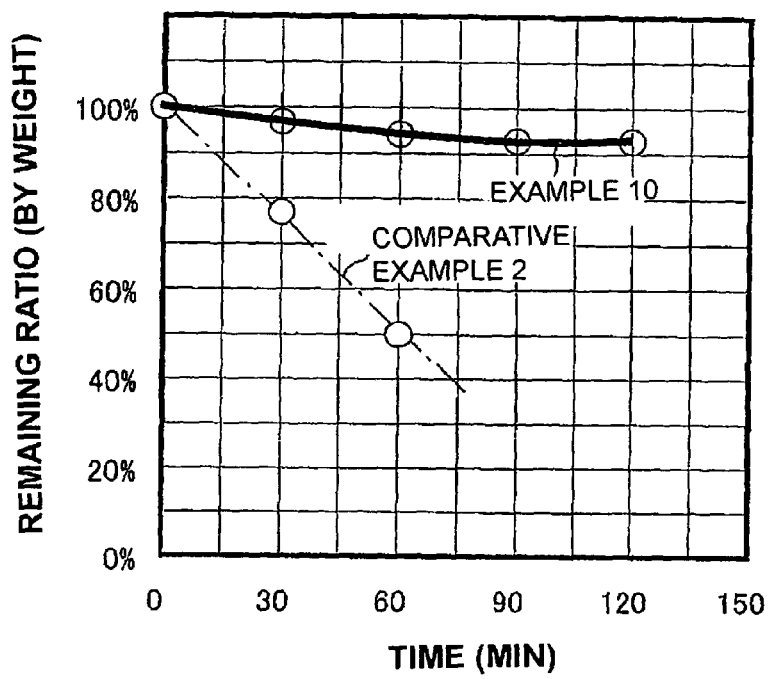
FIG. 65 is a graph showing the results of the adhesion test (comparison between Example 10 and Comparative Example 2).

The obtained results are shown in FIG. 64 (comparison between Example 1 and Comparative Example 2), and in FIG. 65 (comparison between Example 10 and Comparative Example 2). The results shown in FIGS. 64 and 65 clearly indicate that there was a significant improvement in adhesion of the metal oxide thin film of the present invention, obtained by mixing the source fluid composition at a high shear rate, and by applying it to the base material, followed by a rapid drying and calcining process.

In addition, adhesion was evaluated, in a similar way to the above-mentioned one, also on each of the metal oxide thin films (coating) formed on the above-mentioned metal plates by the respective methods described in Examples 14 to 16, and Comparative Example 12. The obtained results (the remaining ratio (by weight) after two hours) are shown in Table 22.

TABLE 22

| | Shear Rate | Remaining Ratio after 2 Hours (%) |
|---|---|---|
| Example 14 | 20000 $sec^{-1}$ | 93 |
| Example 15 | 10000 $sec^{-1}$ | 85 |
| Example 16 | 4000 $sec^{-1}$ | 61 |
| Comparative Example 12 | 10 $sec^{-1}$ or slower | 15 |

The results shown in Table 22 clearly indicate that the faster the source fluid composite was mixed, the higher the adhesion of the obtained metal oxide thin film to the base material became. Especially, a shear rate of 10000 $sec^{-1}$ or faster improved prominently the adhesion.

Furthermore, adhesion was evaluated, in a similar way to the above-mentioned one, also on each of the metal oxide thin films (coating) formed on the above-mentioned metal plates by the respective methods described in Examples 14 and 18 to 23, and Comparative Example 12 and 14 to 19. The obtained results (the remaining ratio (by weight) after two hours) are shown in Table 23.

TABLE 23

| | Remaining ratio after 2 Hours (%) | |
|---|---|---|
| Composition: wt % | With Shear (20000 $sec^{-1}$) | Without Shear (10 $sec^{-1}$ or slower) |
| Al—Zr—Ce (40/40/20) | 90 (Example 14) | 18 (Comparative Example 12) |
| Al—Zr—La (40/40/20) | 78 (Example 18) | 18 (Comparative Example 14) |
| Al—Zr—Y (40/40/20) | 70 (Example 19) | 15 (Comparative Example 15) |
| Al—K (60/40) | 48 (Example 20) | 20 (Comparative Example 16) |
| Al—Ba (60/40) | 56 (Example 21) | 24 (Comparative Example 17) |
| Al—Zr—Ti (40/40/20) | 80 (Example 22) | 18 (Comparative Example 18) |
| Al—Fe (60/40) | 65 (Example 23) | 20 (Comparative Example 19) |

The results shown in Table 23 clearly indicate that there was a significant improvement in adhesion of the metal oxide thin film of the present invention, obtained by mixing the source fluid composition at a high shear rate, and by applying it to the base material, followed by a rapid drying and calcining process. Such an improvement was attained regardless of the composition of the metal oxide thin film.

<Evaluation of Nanopores>

Existence of nanopores was examined, on the metal oxide thin film obtained by the method described in Example 1 and on the metal oxide powder obtained by the method described in Example 17. It was examined by the nitrogen adsorption method and by the X-ray small angle scattering method, respectively in the following manners.

Figure 66:
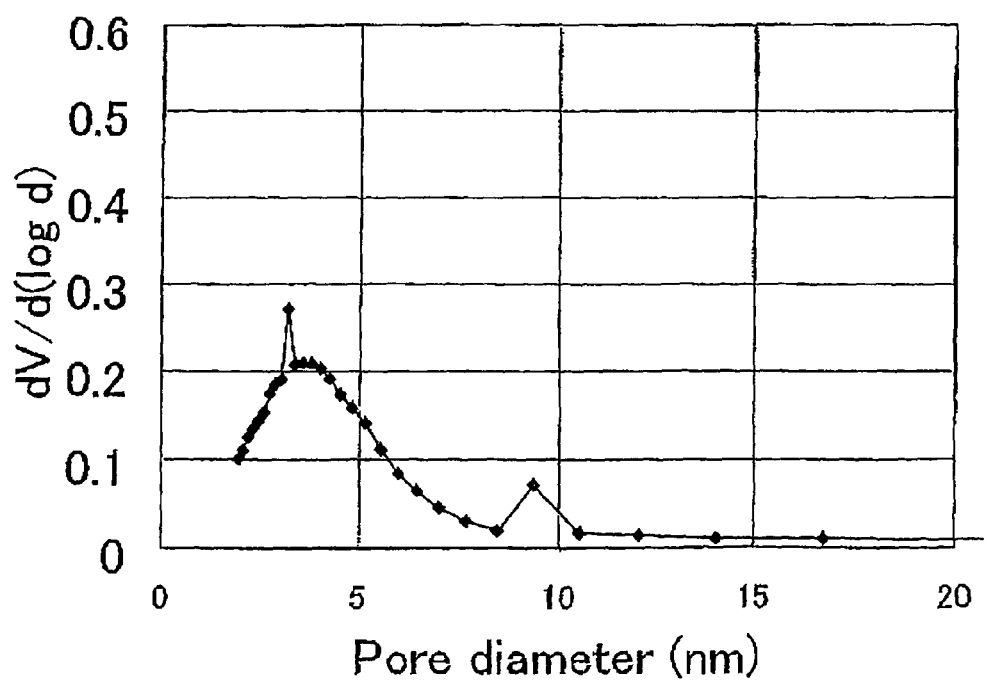
FIG. 66 is a graph showing the distribution of pore sizes of the metal oxide porous material obtained by the nitrogen adsorption method.

The nitrogen adsorption method is a method of measuring, by the static volumetric method, the amount of gas adsorbed to, or the amount of gas desorbed from, the surface of a solid at an equilibrium vapor pressure. Isotherm data are obtained by introducing a known amount of adsorption gas to, or removed a known amount of adsorption gas from, the sample cell containing a sample solid which is kept constantly at the critical temperature of the adsorbate. The amount of gas adsorbed or desorbed at an equilibrium pressure corresponds to the difference between the amount of gas introduced or removed, and the amount of gas needed to fill the void spaces around the sample. At this measurement, an automated gas adsorption measuring apparatus (Autosorb-1-MP/LP by QUANTACHROME INSTRUMENTS) was used. Using samples of 0.05 g to 0.15 g, at a measurement temperature of −196° C., the nitrogen adsorption measurement was carried out at a range of the relative pressure to the atmospheric pressure $P/P_0$ between 0.00001 and 1, and the nitrogen desorption measurement was successively carried out at a range of $P/P_0$ between 0.01 and 1. By plotting the amount of adsorbed nitrogen gas, the adsorption isotherm was obtained, and then, by an analytical method called BJH method, the distribution of pore sizes was obtained. Note that the BJH method is the most effective model for the calculation of mesopore distribution, and assumes that each of the pores is in a cylindrical shape. The measurement results of the metal oxide porous material obtained by the method described in Example 1 are shown in FIG. 66.

Figure 67:
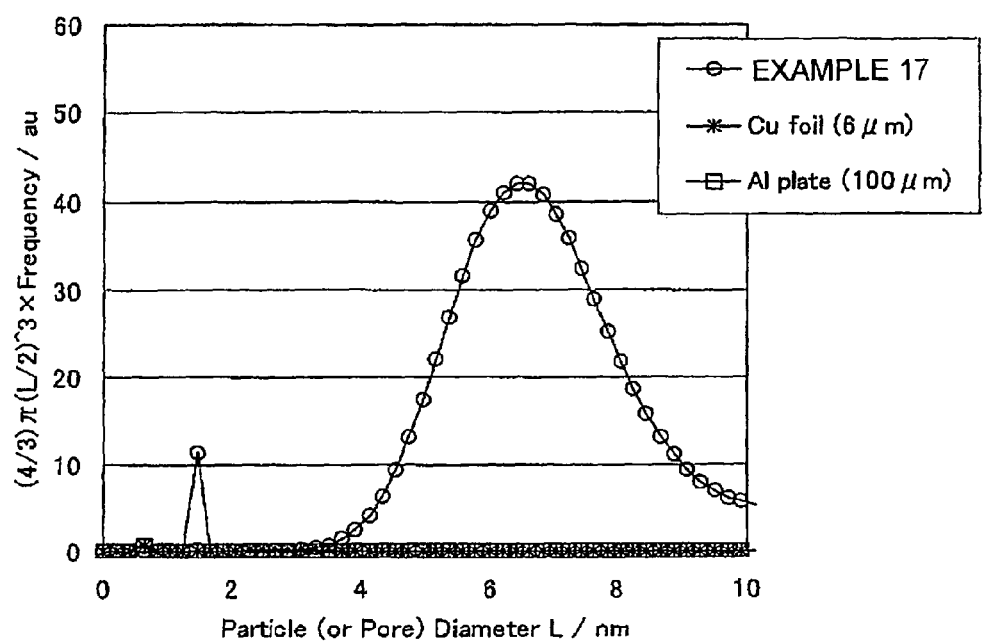
FIG. 67 is a graph showing the distribution of the pore sizes of the metal oxide porous material obtained by the small angle X-ray scattering method.

In the X-ray small angle scattering method, an X-ray undulator beamline in a radiant light facility, excellent in parallelism and energy density, was used. The X-ray energy was set at 10 keV (wavelength of 0.124 nm), and by a four-quadrant slit, the X-ray bean was narrowed down to approximately 0.04 mm□ to be the starting point of the beam of the small angle scattering method. At approximately 65 cm downstream of the starting point, a pin-hole with a diameter of 0.5 mm was placed to block excess scattering light, and the sample was placed at immediately downstream from, and very close to, the pinhole. Note that the green compact sample was fabricated according to the appropriate thickness of the sample obtained by calculating the adsorbed amount so that the X-ray intensity after passing the sample would be 1/e (e is the base of natural logarithm) An imaging plate was placed at exactly 50 cm downstream from the sample (at 115 cm downstream from the starting point), and the scattering X-ray was recorded. An attenuator, made of sheets of cover glass superposed with each other, was placed in the position of the transmitted X-ray. The purpose was to prevent the imaging plate from being damaged, and to make the intensity of transmitted X-ray adequate when its position was recorded on the imaging plate. When the record was analyzed, the mean value of intensities of X-ray was obtained for each group of X-rays recorded on each of the concentric circles about the position of the transmitted X-ray on the imaging plate. Using the mean values together with the radii of the concentric circles converted into angles, a graph was plotted showing the relations between the scattering angle and the intensity. Spherical scatterers existing in the sample was assumed. By changing moderately the distribution of the radii of the scatterers, an appropriate distribution, with which the graph showing the relations between the scattering angle and the intensity can be explained, was obtained. FIG. 67 shows the measurement results of the metal oxide porous material obtained in the method described in Example 17. For the comparative purpose, the measurement results of copper foil (thickness: 6 μm) and aluminum foil (thickness: 100 μm) which are bulk materials are also shown in FIG. 67.

The results shown in these figures, especially in FIG. 67, clearly indicate that extremely small nanopores, each with a diameter of 2 nm or smaller, were formed in the metal oxide nanoporous material of the present invention, which was obtained by the method of the present invention

INDUSTRIAL APPLICABILITY

As has been described so far, in the present invention, a source fluid composition containing source materials of metal oxide is mixed at a high shear rate, and then is subjected to heat treatment without substantially allowing coprecipitation to occur. This makes it possible to obtain a novel metal oxide nanoporous material that is distinct from the conventional ones in the following points. The material has nanopores each with a diameter of 10 nm or smaller, and the metal oxides are dispersed homogeneously in the wall that forms the nanopores.

The metal oxide nanoporous material of the present invention brings about improvements in heat resistance and in adhesion to various base materials such as a honeycomb filter. In addition, the coating can be formed on each of the base materials as a thin film.

Accordingly, the present invention is a very useful technology for obtaining a catalyst for purification of exhaust gas and the like, in which a coating is formed on each of various base materials, including a metal honeycomb filter and a high-density honeycomb, with excellent heat resistance and a high-level adhesion to each base material.

The invention claimed is:

1. A metal oxide nanoporous material which comprises two or more kinds of first metal oxides selected from the group consisting of alumina, zirconia, titania, iron oxide, rare-earth oxides, alkali metal oxides and alkaline-earth metal oxides, the metal oxide nanoporous material having nanopores, each with a diameter of 10 nm or smaller, and the metal oxides being dispersed homogeneously in a wall forming the nanopores, wherein, when a spectrum of a tested sample of the nanoporous material is measured at measurement points located in regions where the tested sample has an approximately equal thickness by energy dispersive X-ray spectroscopy using a transmission electron microscope with a 200 kV accelerating voltage and a 1.0 nm diameter of electron beam, and when a relative intensity ratio X, a mean value $X_m$ and a second moment $v_2$ around the mean value $X_m$ are calculated for every one of metal elements of the metal oxides contained in the nanoporous material in an amount not lower than 10 at %, the relative intensity ratio being calculated by converting an integrated intensity of the peaks of X-ray fluorescence for each metal element in measured spectra into a relative ratio, the calculated $X_m$ and $v_2$ for every one of the metal elements of the metal oxides contained in the nanoporous material in not lower than 10 at %, will satisfy a condition expressed in the following formula (1):

$$v_2/X_m^2 \leq 0.02 \tag{1}$$

wherein, in the formula (1), $X_m$ is a mean value of the relative intensity ratios X, expressed as $X_m=(\Sigma X)/N$ (N being a number of the measurement points); $v_2$ is the second moment around the mean value $X_m$, expressed as $v_2=\{\Sigma(X-X_m)^2\}/N$; and $v_2/X_m^2$ is the second moment normalized by the mean value $X_m$ squared.

2. The metal oxide nanoporous material according to claim 1, wherein the nanoporous material has nanopores each with a diameter of not more than 5 nm.

3. The metal oxide nanoporous material according to claim 1, wherein the nanoporous material has nanopores each with a diameter of not more than 2 nm.

4. The metal oxide nanoporous material according to claim 1, wherein, when a K-value expressed in the following formula (2) is calculated through a line analysis performed, in an arbitrary range of not shorter than 0.5 mm, on every one of the metal elements of metal oxides contained in the nanoporous material in not lower than 10 at %, using an X-ray microanalyzer with a 15 kV accelerating voltage and a 1 μm diameter of electron beam:

$$K\text{-value (\%)}=(\text{X-ray intensity measured from the nanoporous material})/(\text{X-ray intensity to be obtained on a pure element}), \quad (2)$$

the K-values of the metal elements of the metal oxides contained in the nanoporous material in not lower than 10 at % satisfy, at not lower than 65% of all of the measurement points, the condition expressed in the following formula (3):

$$\frac{|K - K_m|}{K_m} \leq 0.02 \quad (3)$$

wherein, in formula (3), K is the K-value (%) at each of the measurement points; and $K_m$ is the mean value of K-values of all of the measurement points, while portions corresponding to cracks formed in the nanoporous material are excluded from the measurement points.

5. The metal oxide nanoporous material according to claim 1, wherein,
when height images on the surface of the nanoporous material are measured by a tapping mode, using a scanning probe microscope with a tip of a 5 nm radius of curvature, arbitrarily, at intervals of not less than 3 nm but not more than 4 nm;
when a height image H(L) obtained as a function of a scanning length L of not shorter than 2 μm in total satisfies, at not less than 80% of the measurement points, the condition expressed in the following formula (4):

$$H(L) \leq 20 \text{ nm} \quad (4)$$

wherein in formula (4), H(L) is the height image (nm) at each of the measurement points (scanning length=L), while a mean value of height images H at all of the measurement points is zero; and
the second derivative H"(L) obtained by the following formulas (5) and (6):

$$H'(L) = \frac{dH}{dL} = \frac{H(L+\Delta L) - H(L)}{\Delta L} \quad (5)$$

$$H''(L) = \frac{d^2 H}{dL^2} = \frac{H'(L+\Delta L) - H'(L)}{\Delta L} \quad (6)$$

wherein in formulas (5) and (6), H(L) is the height image (nm) at a measurement point where the scanning length = L; H(L+ΔL) is the height image (nm) at a measurement point where the scanning length =L+ΔL; ΔL is the interval (nm) between measurement points; H'(L) is the first derivative of a height image H(L); H'(L+ΔL) is the first derivative of a height image H(L+ΔL); and H"(L) is the second derivative of the height image H(L), while ΔL is determined to be 4 nm by linear interpolation between measurement points,
in a case where the above-mentioned condition expressed in the formula (4) being satisfied, the second derivative H"(L) obtained satisfies, at not more than 60% of the measurement points, the condition expressed in the following formula (7):

$$-0.05 \text{ nm}^{-1} \leq H''(L) \leq 0.05 \text{ nm}^{-1}. \quad (7)$$

6. The metal oxide nanoporous material according to claim 1, wherein, when measurement lines of 400 μm or longer in total length are arbitrarily drawn on the nanoporous material in an electron micrograph of a section of the nanoporous material, the length of parts where the measurement lines cross void spaces formed in the nanoporous material is equal to, or shorter than, 10% of the total length of the measurement lines.

7. The metal oxide nanoporous material according to claim 1, wherein,
when a spectrum is obtained by energy dispersive X-ray spectroscopy using a transmission electron microscope with a 200 kV accelerating voltage and a 1.0 nm diameter of electron beam, at 10 or more measurement points arbitrarily chosen; and
when, for every one of the metal elements of metal oxides contained in the nanoporous material in not lower than 10 at %, the relative intensity ratio X and its mean value $X_m$, and the second moment $v_2$ around the mean value $X_m$ are calculated, the relative intensity ratio being calculated by converting the integrated intensity of the peaks of X-ray fluorescence for each metal element in the obtained spectra into a relative ratio,
for every one of the metal elements of metal oxides contained in the nanoporous material in not lower than 10 at %, the obtained $X_m$ and $v_2$ satisfy the condition expressed in the following formula (8):

$$v_2/X_m^2 \leq 0.1 \quad (8)$$

wherein in the formula (8), $X_m$ is the mean value of the relative intensity ratios X, expressed as $X_m = (\Sigma X)/N$ (N is the number of measurement points); $v_2$ is the second moment around the mean value $X_m$, expressed as $v_2 = \{\Sigma (X-X_m)^2\}/N$; and $v_2/X_m^2$ is the second moment normalized by the mean value $X_m$ squared.

8. The metal oxide nanoporous material according to claim 1, wherein the nanoporous material further comprises a noble metal supported on the surface of the nanoporous material.

9. The metal oxide nanoporous material according to claim 1, wherein the nanoporous material further comprises a second-metal-oxide powder with a mean particle size of 0.01 μm to 50 μm, the second-metal-oxide powder being contained in the nanoporous material.

10. The metal oxide nanoporous material according to claim 9, wherein the nanoporous material further comprises a noble metal supported on the surface of the second-metal-oxide powder.

11. The metal oxide nanoporous material according to claim 1, wherein the metal oxide nanoporous material is a thin-film nanoporous material.

12. The metal oxide nanoporous material according to claim 1, wherein the metal oxide nanoporous material is a nanoporous material in powder.

13. A method of manufacturing a metal oxide nanoporous material, which is a method of manufacturing a metal oxide nanoporous material according to claim 1, the method comprising:
preparing a source fluid composition containing a source material of the two or more kinds of first metal oxides; and
obtaining the metal oxide nanoporous material which has nanoporous, each with a diameter of 10 nm or smaller, and in which the metal oxides are dispersed homogeneously in a wall forming the nanopores, by mixing the source fluid composition at a shear rate of 1000 sec$^{-1}$ or faster, followed by a heat treatment without substantially allowing coprecipitation to occur.

14. The method of manufacturing a metal oxides nanoporous material according to claim 13, wherein the source material of the first metal oxides is at least one kind selected from the group consisting of colloidal particles of alumina, those of zirconia, those of titania, those of iron oxide, those of rare-earth oxides, those of alkali metal oxides and those of alkaline-earth metal oxides, and a salt of aluminum, that of zirconium, that of titanium, that of iron, that of rare-earth elements, that of alkali metals and that of alkaline-earth metals.

15. The method of manufacturing a metal oxides nanoporous material according to claim 13, wherein the source fluid composition is a colloidal solution containing at least one kind of colloidal particles selected from the group consisting of colloidal particles of alumina, those of zirconia, those of titania, those of iron oxide, those of rare-earth oxides, those of alkali metal oxides and those of alkaline-earth metal oxides.

16. The method of manufacturing a metal oxides nanoporous material according to claim 13, wherein the source fluid composition is a metal salt solution containing at least one kind of salt selected from the group consisting of a salt of aluminum, that of zirconium, that of titanium, that of iron, that of rare-earth elements, that of alkali metals and that of alkaline-earth metals.

17. The method of manufacturing a metal oxides nanoporous material according to claim 13, wherein the source fluid composition is mixed at a shear rate of 10000 sec$^{-1}$ or faster.

18. The method of manufacturing a metal oxides nanoporous material according to claim 13, wherein a thin-film of the metal oxide nanoporous material is obtained by mixing the source fluid composition at 1000 sec$^{-1}$ or faster, and then by applying the resultant mixture onto a base material without substantially allowing coprecipitation to occur, followed by a heat treatment.

19. The method of manufacturing a metal oxides nanoporous material according to claim 13, wherein the metal oxide nanoporous material in powder is obtained by mixing the source fluid composition at 1000 sec$^{-1}$ or faster, followed by a heat treatment and powdering without substantially allowing coprecipitation to occur.

20. The method of manufacturing a metal oxides nanoporous material according to claim 13, wherein the method further comprises a step of making a noble metal supported on the surface of the nanoporous material.

21. The method of manufacturing a metal oxides nanoporous material according to claim 13, wherein the source fluid composition further contains a second-metal-oxide powder with a mean particle size of 0.01 μm to 50 μm.

22. The method of manufacturing a metal oxides nanoporous material according to claim 21, wherein the method further comprises a step of making a noble metal supported on the surface of the second-metal-oxide powder.

23. The method of manufacturing a metal oxides nanoporous material according to claim 21, wherein the method further comprises:
preparing a source fluid composition containing a source material of the second metal oxide; and
obtaining the second-metal-oxide powder by mixing the source fluid composition at a shear rate of 1000 sec$^{-1}$ or faster, followed by a heat treatment without substantially allow coprecipitation to occur.

24. A coating composition to obtain a metal oxide nanoporous material according to claim 1, the coating composition being obtained by mixing a source fluid composition containing a source material of the two or more kinds of first metal oxides at a shear rate of 1000 sec$^{-1}$ or faster.

25. The coating composition according to claim 24, wherein the source material of the first metal oxides is at least one kind selected from the group consisting of colloidal particles of alumina, those of zirconia, those of titania, those of iron oxide, those of rare-earth oxides, those of alkali metal oxides and those of alkaline-earth metal oxides, and a salt of aluminum, that of zirconium, that of titanium, that of iron, that of rare-earth elements, that of alkali metals and that of alkaline-earth metals.

26. The coating composition according to claim 24, wherein the source fluid composition is a colloidal solution containing at least one kind of colloidal particles selected from the group consisting of colloidal particles of alumina, those of zirconia, those of titania, those of iron oxide, those of rare-earth oxides, those of alkali metal oxides and those of alkaline-earth metal oxides.

27. The coating composition according to claim 24, wherein the source fluid composition is a metal salt solution containing at least one kind of salt selected from the group consisting of a salt of aluminum, that of zirconium, that of titanium, that of iron, that of rare-earth elements, that of alkali metals and that of alkaline-earth metals.

28. The coating composition according to claim 24, wherein the coating composition is obtained by mixing the source fluid composition at a shear rate of 10000 sec$^{-1}$ or faster.

29. The coating composition according to claim 24, wherein the source fluid composition further contains a second-metal-oxide powder with a mean particle size of 0.01 μm to 50 μm.

30. The coating composition according to claim 29, wherein a noble metal is supported on the surface of the second-metal-oxide powder.

31. A method of manufacturing a coating composition to obtain a metal oxide nanoporous material according to claim 24, the method comprising:
preparing a source fluid composition containing a source material of the two or more kinds of first metal oxides; and
obtaining the coating composition by mixing the source fluid composition at a shear rate of 1000 sec$^{-1}$ or faster.

32. The method of manufacturing a coating composition according to claim 31, wherein the source material of the first metal oxides is at least one kind selected from the group consisting of colloidal particles of alumina, those of zirconia, those of titania, those of iron oxide, those of rare-earth oxides, those of alkali metal oxides and those of alkaline-earth metal oxides, and a salt of aluminum, that of zirconium, that of titanium, that of iron, that of rare-earth elements, that of alkali metals and that of alkaline-earth metals.

33. The method of manufacturing a coating composition according to claim 31, wherein the source fluid composition is a colloidal solution containing at least one kind of colloidal particles selected from the group consisting of colloidal particles of alumina, those of zirconia, those of titania, those of iron oxide, those of rare-earth oxides, those of alkali metal oxides and those of alkaline-earth metal oxides.

34. The method of manufacturing a coating composition according to claim 31, wherein the source fluid composition is a metal salt solution containing at least one kind of salt selected from the group consisting of a salt of aluminum, that of zirconium, that of titanium, that of iron, that of rare-earth elements, that of alkali metals and that of alkaline-earth metals.

35. The method of manufacturing a coating composition according to claim 31, wherein the source fluid composition is mixed at a shear rate of 10000 sec$^{-1}$ or faster.

36. The method of manufacturing a coating composition according to claim 31, wherein the source fluid composition further contains a second-metal-oxide powder with a mean particle size of 0.01 μm to 50 μm.

37. The method of manufacturing a coating composition according to claim 36, wherein the method further comprises a step of making a noble metal supported on the surface of the second-metal-oxide powder.

* * * * *

UNITED STATES PATENT AND TRADEMARK OFFICE
CERTIFICATE OF CORRECTION

| | | |
|---|---|---|
| PATENT NO. | : 7,935,653 B2 | |
| APPLICATION NO. | : 11/628493 | |
| DATED | : May 3, 2011 | |
| INVENTOR(S) | : Takashi Shimazu et al. | |

It is certified that error appears in the above-identified patent and that said Letters Patent is hereby corrected as shown below:

In column 58, line 62, change "nanoporous" to "nanopores"

In column 59, line 62, change "allow" to "allowing"

Signed and Sealed this
Twenty-first Day of June, 2011

David J. Kappos
*Director of the United States Patent and Trademark Office*